US009688242B2

(12) United States Patent
Nakayama et al.

(10) Patent No.: US 9,688,242 B2
(45) Date of Patent: Jun. 27, 2017

(54) SEATBELT RETRACTOR

(71) Applicant: ASHIMORI INDUSTRY CO., LTD., Osaka-shi, Osaka (JP)

(72) Inventors: Tomoe Nakayama, Settsu (JP); Masataka Tanaka, Minamikawachi-gun (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 190 days.

(21) Appl. No.: 14/405,264

(22) PCT Filed: Jun. 24, 2013

(86) PCT No.: PCT/JP2013/067207
§ 371 (c)(1),
(2) Date: Dec. 3, 2014

(87) PCT Pub. No.: WO2014/007092
PCT Pub. Date: Jan. 9, 2014

(65) Prior Publication Data
US 2015/0144727 A1    May 28, 2015

(30) Foreign Application Priority Data

Jul. 2, 2012  (JP) ................................. 2012-148277
Jul. 2, 2012  (JP) ................................. 2012-148278

(51) Int. Cl.
*B60R 22/34*      (2006.01)
*B60R 22/46*      (2006.01)

(52) U.S. Cl.
CPC .......... *B60R 22/4633* (2013.01); *B60R 22/34* (2013.01); *B60R 2022/3402* (2013.01); *B60R 2022/468* (2013.01)

(58) Field of Classification Search
CPC ............ B60R 22/3402; B60R 22/4633; B60R 22/468; B60R 22/34
See application file for complete search history.

(56) References Cited

U.S. PATENT DOCUMENTS 5,794,876 A * 8/1998 Morizane ............ B60R 22/4633
                                                              242/374
7,681,825 B2 * 3/2010 Sumiyashiki ......... B60R 22/405
                                                              242/383.1

(Continued)

FOREIGN PATENT DOCUMENTS

JP      A-5-319209        12/1993
JP      A-2012-20605       2/2012
JP      A-2012-35644       2/2012

OTHER PUBLICATIONS

International Search Report issued in International Patent Application No. PCT/JP2013/067207 dated Oct. 1, 2013.

*Primary Examiner* — Sang Kim
(74) *Attorney, Agent, or Firm* — Oliff PLC

(57) ABSTRACT

A seatbelt retractor has: a holding plate arranged at a housing outer side and including a shaft receiving hole which rotatably supports a cylindrical shaped boss portion formed at a take-up drum side end of the driven body; and a restricting member arranged at take-up drum side of the holding plate to restrict movement of the boss portion in radial direction so that the boss portion projecting from the hole is positioned co-axial with the take-up drum. The boss portion which faces an inner peripheral surface of the hole includes a pair of radially projecting portions provided on both sides with reference to rotation axis direction projecting radially outward at full periphery of the boss portion. The pair of radially projecting portions project radially outward over the (Continued)

hole so at least a peripheral edge portion of the hole is inserted in clearance defined by the pair of radially projecting portions.

18 Claims, 30 Drawing Sheets

(56) References Cited

U.S. PATENT DOCUMENTS

| | | |
|---|---|---|
| 2009/0218803 A1 | 9/2009 | Friedsmann et al. |
| 2011/0049284 A1* | 3/2011 | Kaneko ............... B60R 22/4628 242/374 |
| 2011/0291396 A1* | 12/2011 | Tanaka ................ B60R 22/4633 280/806 |
| 2012/0006927 A1* | 1/2012 | Nagata ................ B60R 22/4628 242/374 |
| 2012/0032017 A1 | 2/2012 | Yanagawa et al. |
| 2014/0145021 A1* | 5/2014 | Yanagawa ........... B60R 22/4633 242/374 |

* cited by examiner

SEATBELT RETRACTOR

TECHNICAL FIELD

The present invention relates to a seatbelt retractor which removes the slack of webbing in case of an emergency such as vehicle collision or the like.

BACKGROUND ART

There have conventionally been proposed various seatbelt retractors which remove slack of webbing in case of an emergency such as vehicle collision or the like.

For instance, US Laid-open Patent Application Publication No. 2009/0218803 discloses a seatbelt retractor which includes a tensioning drive configured to rotate a seatbelt spindle in a seatbelt-wind-up direction at the time of vehicle collision and a supply pipe provided for the tensioning drive and mounted on a C-shaped carrier which houses the seatbelt spindle there inside in a rotatable manner. When a gas generator provided at front end of the supply pipe generates gas in response to vehicle collision, the gas pressure causes the tensioning drive to push and drive a plurality of thrust elements housed in the supply pipe.

The thus activated plurality of thrust elements makes an advance inside the supply pipe so as to get engaged with a drive wheel and rotate the drive wheel. Thereby, the rotation of the drive wheel consequently rotates the seatbelt spindle in the seatbelt-wind-up direction via an inertia coupling. Further, regarding the drive wheel constituting the tensioning drive, both ends of the drive wheel are rotatably supported by a retaining plate and a retaining cap mounted on the retaining plate and rotatably held between them with respect to rotation axis direction.

DISCLOSURE OF THE INVENTION

Problem to be Solved by the Invention

However, for efficiently rotating the seatbelt spindle in the seatbelt-wind-up direction, the above described conventional seatbelt retractor has had necessity to avoid dislocation of the retaining cap toward outside with reference to rotation axis of the drive wheel which is rotated and driven by the thrust elements. Therefore, there has been necessity to enhance mechanical strength of the retaining cap as well as coupling strength of the retaining cap and the retaining plate, which has been obstacle to low-profile and weight saving design of the retaining cap.

The above conventional seatbelt retractor has had more necessity to prepare the retaining plate and the retaining cap to be mounted on the retaining plate in overlapping manner so as to rotatably support the drive wheel, which results in increase of the number of mechanical members. The retaining cap coupled with the retaining plate is mounted on the C-shaped carrier with the drive wheel being housed inside, which complicates assemblage of the tensioning drive.

The present invention has been made to resolve the above described problem and the object of the invention is to provide a seatbelt retractor capable of avoiding movement of a driven body of a pretensioner mechanism in end directions with respect to rotation axis when the driven body is rotated and driven, by adopting simple mechanical configuration. Further, object of the present invention is to provide a seatbelt retractor capable of reducing in the number of mechanical parts for the pretensioner mechanism and simplifying assemblage of the seatbelt retractor.

Means for Solving the Problem

To achieve the object of the present invention, there is provided a seatbelt retractor comprising: a housing; a take-up drum rotatably housed in the housing and configured to take-up and store a webbing; and a pretensioner mechanism configured to rotate the take-up drum in a webbing-take-up direction for taking up the webbing when vehicle collision occurs, wherein the pretensioner mechanism includes: a driven body configured to rotate co-axially with a rotation axis of the take-up drum when vehicle collision occurs; a driving device configured to rotate the driven body in the webbing-take-up direction; a holding plate arranged at an outer side of the housing with reference to the rotation axis of the take-up drum, the holding plate including a shaft receiving hole which rotatably supports a boss portion shaped in a cylindrical shape and formed at a take-up drum side end of the driven body with reference to the rotation axis of the take-up drum; and a restricting member arranged at a take-up drum side holding plate and configured to restrict movement of the boss portion in a radial direction so that the boss portion projecting from the shaft receiving hole is positioned co-axial with the take-up drum, wherein the boss portion which faces an inner peripheral surface of the shaft receiving hole includes a pair of radially projecting portions provided on its both sides with reference to the rotation axis direction and configured to project radially outward at full periphery of the boss portion, and wherein, position of the boss portion is restricted so as to be co-axial with the take-up drum by the restricting member, the pair of radially projecting portions of the boss portion project radially outward over the shaft receiving hole so that at least a peripheral edge portion of the shaft receiving hole is inserted in a clearance defined by the pair of radially projecting portions projecting radially outward over the shaft receiving hole to avoid movement of a driven body in the rotation axis direction.

In the above seatbelt retractor, the boss portion in a cylindrical shape is formed at the take-up drum side end of the driven body with reference to the rotation axis of the take-up drum. When the position of the boss portion is restricted so as to be co-axial with the take-up drum by the restricting member, a peripheral edge portion of the shaft receiving hole is inserted in a clearance defined by the pair of radially projecting portions provided on both sides of the boss portion which faces an inner peripheral surface of the shaft receiving hole, and the pair of radially projecting portions configured to project radially outward at full periphery of the boss portion.

Thereby, the peripheral edge portion of the shaft receiving hole inserted in the clearance defined by the pair of radially projecting portions formed on the boss portion of the driven body can serve to avoid dislocation of the driven body in the rotation axis direction by adopting simple configuration. Further, radial directional movement of the boss portion projecting from the shaft receiving hole is restricted by the restricting member and position of the boss portion is restricted so as to be co-axial with the take-up drum. Thereby, by adopting the simple configuration, the driven body can be arranged to be co-axial with the take-up drum without dislocation of the driven body in radially outward direction.

In the seatbelt retractor, the pair of radially projecting portions may be formed such that distance between the pair of radially projecting portions with reference to the rotation axis direction is approximate to thickness of the peripheral edge portion of the shaft receiving hole.

In the above seatbelt retractor, since the pair of radially projecting portions may be formed such that distance between the pair of radially projecting portions with reference to the rotation axis direction is approximate to thickness of the peripheral edge portion of the shaft receiving hole, dislocation and slip of the driven body in the rotation axis direction can be avoided reliably.

In the seatbelt retractor, the pair of radially projecting portions may be formed by integral molding.

In the above seatbelt retractor, since the pair of radially projecting portions are integrally molded for the driven body, this configuration means no necessity in preparing the pair of radially projecting portions as separate parts, and the reduction in the number of mechanical parts and hours for assemblage can be realized.

In the seatbelt retractor, the pair of radially projecting portions may be formed in a flange-like shape so as to project radially outward from the outer peripheral surface of the boss portion.

In the above seatbelt retractor, since the pair of radially projecting portions each are formed in a flange-like shape so as to project radially outward from the outer peripheral surface of the boss portion, low-profile design for each of the pair of radially projecting portions can be realized easily and axis directional dimension of the driven body can be reduced. Thereby, comprehensive configuration of the driven body can be simplified.

In the seatbelt retractor, the shaft receiving hole may include: a first semicircular arc hole portion formed in a substantially semicircular arc shape at a part of the inner peripheral portion whereat the boss portion is pressed when the driven body is rotated and driven by the driving device; and an enlarged hole portion formed so as to extend from the first semicircular arc hole portion and allow insertion of at least one of the pair of radially projecting portions therein. Further, the first semicircular arc hole portion may be inserted in a clearance between the pair of radially projecting portions when position of the boss portion is restricted so as to be co-axial with the take-up drum by the restricting member.

In the above seatbelt retractor, at least one of the pair of radially projecting portions of the driven body is inserted in the enlarged hole portion of the shaft receiving hole so that position of the boss portion projecting from the shaft receiving hole is restricted by the restricting member arranged at the take-up drum side of the holding plate. Thereby, the first semicircular arc hole portion of the shaft receiving hole is inserted between the pair of radially projecting portions.

Thereby, a worker can easily attach the driven body to the holding plate and operation efficiency can be improved. Further, the first semicircular arc hole portion of the shaft receiving hole is inserted between the pair of radially projecting portions. Therefore, when the driven body is rotated and driven by the driving device, the boss portion can be rotated smoothly while the boss portion can reliably get contact with the inner peripheral surface of the first semicircular arc hole portion.

In the seatbelt retractor, the shaft receiving hole may include a second semicircular arc hole portion formed in a substantially semicircular arc shape at a part of the inner peripheral portion whereat the boss portion is pressed when the driven body is pressed radially outward via the take-up drum by a load that the webbing is pulled out.

In the above seatbelt retractor, the second semicircular arc hole portion formed in a substantially semicircular arc shape is provided at a part of the inner peripheral portion of the shaft receiving hole whereat the boss portion is pressed when the driven body is pressed radially outward via the take-up drum by a load that the webbing is pulled out. Therefore, when the driven body is rotated and driven by the driving device, the boss portion can be rotated smoothly while the boss portion can reliably get contact with the inner peripheral surface of the second semicircular arc hole portion.

In the seatbelt retractor, rims of the first semicircular arc hole portion and the second semicircular arc hole portion are connected smoothly, and rims of the first semicircular arc hole portion and the enlarged hole portion are connected by an almost sharp corner, and rims of the second semicircular arc hole portion and the enlarged hole portion are connected by an almost sharp corner.

In the above seatbelt retractor, rims of the first semicircular arc hole portion and the second semicircular arc hole portion are smoothly connected. Therefore, the boss portion of the driven body can move smoothly in the respective semicircular arc hole portions while being pressed against the inner peripheral portion of the shaft receiving hole. Further, rims of the first semicircular arc hole portion and the enlarged hole portion are connected by an almost sharp corner, and rims of the second semicircular arc hole portion and the enlarged hole portion are connected by an almost sharp corner. Thereby, peripheral directional length with respect to inner peripheral portions of the first semicircular arc hole portion and the second semicircular arc hole portion can easily be made long.

In the seatbelt retractor, the restricting member may include an engaging hole coupled with the boss portion in a non-rotatable manner by allowing press-fitting of the boss portion therein and a positioning projection arranged so as to project toward the holding plate. Further, the holding plate may include a positioning hole configured to allow insertion of the positioning projection of the restricting member, wherein, when the positioning projection is inserted in the positioning hole from the take-up drum side and the restricting member is positionally set with reference to the holding plate and fixed to the holding plate, the boss portion press-fitted and coupled with the engaging hole may be positionally restricted in a state of securing a clearance with respect to the inner peripheral portion of the first semicircular arc hole portion and movement of the boss portion toward the enlarged hole portion is restricted.

In the above seatbelt retractor, movement of the boss portion toward the enlarged hole portion can be restricted in such a manner that the positioning projection arranged on the restricting member is inserted in the positioning hole of the holding plate from the take-up drum side and the boss portion is subsequently inserted in the engaging hole of the restricting member. Thereby, position of the driven body can be restricted by adopting simple configuration. Further, a clearance is secured between the boss portion and the first semicircular arc hole portion when the restricting member restricts the position of the driven member. Thereby, even when the driven body rocks, occurrence of abnormal noise can be avoided.

In the seatbelt retractor, the pretensioner mechanism may include a coupling mechanism arranged at take-up drum side of the holding plate and configured to couple the driven body and the take-up drum together when the driven body is rotated and driven by the driving device, and the coupling mechanism may include the restricting member in an integrated form.

In the above seatbelt retractor, the coupling mechanism is configured to couple the driven body and the take-up drum together when the driven body is rotated and the coupling mechanism includes the restricting member in an integrated form. The integrated form means no necessity in preparing the restricting member as separate mechanical part and the reduction in the number of mechanical parts, and hours for assemblage can be realized.

In the seatbelt retractor, the pretensioner mechanism may include a cover member arranged on outside, in a direction of rotational axis, of the take-up drum so as to hold the driven body between holding plate and the cover member. Further, the driven body may include a shaft portion arranged on an end portion thereof at outside with reference to the direction of rotational axis. Further, the cover member may include a cover side shaft receiving hole configured to rotatably support the shaft portion.

In the above seatbelt retractor, a load on the driven body with reference to the axis direction thereof and load on the driven body with reference to the radial direction thereof can be received with both the shaft receiving hole formed on the holding plate and the cover side shaft receiving hole formed on the cover member. Thereby, low-profile and weight saving design can be realized for the holding plate. Further, since the cover member can avoid dislocation of the driven body toward outside with reference to the direction of rotational axis, there can be reduced mechanical strength essential to the take-up drum side projecting portion of the driven body formed on the boss portion with reference to the rotation axis direction and low-profile and weight saving design can be realized for the driven body.

In the seatbelt retractor, the driving device may include: a gas generating member configured to generate gas; a cylinder formed in a long cylindrical shape and mounted on the holding plate with the gas generating member being attached to one end portion thereof; and a piston accommodated in the cylinder in a movable manner, pressed and driven by pressure of the gas and equipped with a rack at side surface portion thereof facing the driven body along a longitudinal direction. The driven body may include pinion gear teeth formed on an entire circumference of the outer peripheral surface thereof, configured to face the piston which moves when pushed and driven by pressure of the gas and to get engaged with the rack. One of the pair of radially projecting portions, which faces an opposite side of the holding plate with reference to the take-up drum, may be formed in a flange-like shape at one edge of the pinion gear teeth opposing the take-up drum with reference to axis direction.

In the above seatbelt retractor, one of the pair of radially projecting portions, which faces an opposite side of the holding plate with reference to the take-up drum, is formed in a flange-like shape at one edge of the pinion gear teeth opposing the take-up drum with reference to axis direction. Thereby, dislocation of the pinion gear teeth in axis direction with reference to the rack when engaging with the rack of the piston can be avoided by adopting such simple configuration and mechanical strength of the pinion gear teeth can be secured easily. Further, since one of the pair of radially projecting portions, which faces an opposite side of the holding plate with reference to the take-up drum, is formed in a flange-like shape at one edge of the pinion gear teeth opposing the take-up drum with reference to axis direction, axis directional dimension of the driven body can be reduced.

To achieve the object of the present invention, there is provided a seatbelt retractor comprising: a housing; a take-up drum rotatably housed in the housing and configured to take-up and store a webbing; and a pretensioner mechanism configured to rotate the take-up drum in a webbing-take-up direction for taking up the webbing when vehicle collision occurs, wherein the pretensioner mechanism includes: a driven body configured to rotate co-axially with a rotation axis of the take-up drum when vehicle collision occurs; a driving device configured to rotate the driven body in the webbing-take-up direction; a holding plate formed in a substantially U-shape in cross section and arranged at an outer side of the housing with reference to the rotation axis of the take-up drum, the holding plate including a first shaft receiving hole which rotatably supports a boss portion shaped in a cylindrical shape and formed at a take-up drum side end of the driven body with reference to the rotation axis of the take-up drum and a second shaft receiving hole which rotatably supports a shaft portion formed on an outer end portion of the driven body with reference to the direction of rotational axis, the first shaft receiving hole and the second shaft receiving hole being formed at each side wall portion of the holding plate formed in the substantially U-shape; and a restricting member arranged at a take-up drum side surface of the side wall portion of the holding plate in which the first shaft receiving hole is formed and configured to restrict movement of the boss portion in a radial direction so that the boss portion projecting from the first shaft receiving hole is positioned co-axial with the take-up drum, wherein the first shaft receiving hole includes: a first semicircular arc hole portion formed in a substantially semicircular arc shape at a part of the inner peripheral portion whereat the boss portion is pressed when the driven body is rotated and driven by the driving device; and a first enlarged hole portion formed so as to extend from the first semicircular arc hole portion and allow insertion of the first projecting portion therein, and wherein, position of the boss portion is restricted so as to be co-axial with the take-up drum by the restricting member, the first projecting portion projects radially outward over the first semicircular arc hole portion of the first shaft receiving hole so that the first projecting portion at least faces a peripheral edge portion of the first semicircular arc hole portion at a side opposing the second shaft receiving hole with reference to the rotation axis to avoid movement of a driven body in the rotation axis direction.

In the above seatbelt retractor, the shaft portion of the driven body is inserted from the first shaft receiving hole of the holding plate having a substantially U-shape in cross section and further inserted in the second shaft receiving hole while the first projecting portion formed on the boss portion is inserted in the first enlarged hole portion of the first shaft receiving hole. When position of the boss portion projecting from the first shaft receiving hole is restricted by the restricting member arranged at a take-up drum side surface of the side wall portion in which the first shaft receiving hole is formed, the first projecting portion projects radially outward over the first semicircular arc hole portion of the first shaft receiving hole so that the first projecting portion at least faces the peripheral edge portion of the first semicircular arc hole portion at a side opposing the second shaft receiving hole with reference to the rotation axis.

Thereby, rotation axis directional both ends of the driven body can be rotatably supported by side wall portions at both sides of the holding plate having a substantially U-shape in cross section and the number of mechanical parts can be reduced. Further, by the shaft portion of the driven body can be inserted in the second shaft receiving hole through the first shaft receiving hole of the holding plate having a substantially U-shape in cross section, assemblage of the pretensioner mechanism can be simplified.

Further, when the position of the boss portion on the driven body is restricted to be co-axial with the take-up drum, the peripheral edge portion of the first semicircular arc hole portion opposing the second shaft receiving hole and at least facing the first projecting portion, can serve to avoid dislocation of the driven body toward the take-up drum with reference to the rotation axis direction by adopting simple configuration. Further, radial directional movement of the boss portion projecting from the first shaft receiving hole is restricted by the restricting member and position of the boss portion is restricted so as to be co-axial with the take-up drum. Thereby, by adopting the simple configuration, the driven body can be arranged co-axial with the take-up drum without dislocation of the driven body in radially outward direction.

In the seatbelt retractor, the first shaft receiving hole may include a second semicircular arc hole portion formed in a substantially semicircular arc shape at a part of the inner peripheral portion of the first shaft receiving hole whereat the boss portion is pressed when the driven body is pressed radially outward via the take-up drum by a load that the webbing is pulled out.

In the above seatbelt retractor, the second semicircular arc hole portion having a substantially semicircular arc shape is provided at the inner peripheral portion of the first shaft receiving hole on which the boss portion is pressed when the driven body is pressed radially outward via the take-up drum by a load that the webbing is pulled out. Thereby, when the driven body is rotated and driven via the take-up drum, the boss portion can be rotated smoothly while the boss portion can reliably abut on the inner peripheral surface of the second semicircular arc hole portion.

In the seatbelt retractor, rims of the first semicircular arc hole portion and the second semicircular arc hole portion are connected smoothly, and rims of the first semicircular arc hole portion and the first enlarged hole portion are connected by an almost sharp corner, and rims of the second semicircular arc hole portion and the first enlarged hole portion are connected by an almost sharp corner.

In the above seatbelt retractor, rims of the first semicircular arc hole portion and the second semicircular arc hole portion are smoothly connected. Therefore, the boss portion of the driven body can move smoothly in the respective semicircular arc hole portions while being pressed against the inner peripheral portion of the first shaft receiving hole. Further, rims of the first semicircular arc hole portion and the first enlarged hole portion are connected by an almost sharp corner, and rims of the second semicircular arc hole portion and the first enlarged hole portion are connected by an almost sharp corner. Thereby, peripheral directional length with respect to inner peripheral portions of the first semicircular arc hole portion and the second semicircular arc hole portion can easily be made long.

In the seatbelt retractor, the second shaft receiving hole may include a third semicircular arc hole portion formed in a substantially semicircular arc shape at a part of the inner peripheral portion of the second shaft receiving hole whereat the shaft portion is pressed when the driven body is rotated and driven by the driving device; and a second enlarged hole portion formed so as to extend from the third semicircular arc hole portion and allow insertion of the shaft portion therein in a state of securing a clearance between the shaft portion and the third semicircular arc hole portion.

In the above seatbelt retractor, the second shaft receiving hole of the holding plate includes the third semicircular arc hole portion on which the boss portion is pressed when the driven body is rotated and driven by the driving device and the second enlarged hole portion formed so as to allow insertion of the shaft portion therein in a state of securing a clearance between the shaft portion and the third semicircular arc hole portion. Thereby, a worker can easily attach the shaft portion of the driven body in a state of being inserted in the first shaft receiving hole to the second shaft receiving hole at ease and operation efficiency can be improved. Since the shaft portion abuts on the third semicircular arc hole portion of the second shaft receiving hole when the driven body is rotated and driven by the driving device, the driven body can be rotated smoothly by the driving device.

In the seatbelt retractor, the second shaft receiving hole may include a fourth semicircular arc hole portion formed in a substantially semicircular arc shape at a part of the inner peripheral portion of the second shaft receiving hole whereat the shaft portion is pressed when the driven body is pressed radially outward via the take-up drum due to a load for pulling out the webbing.

In the above seatbelt retractor, the fourth semicircular arc hole portion having a substantially semicircular arc shape is formed in the inner peripheral portion of the second shaft receiving hole whereat the shaft portion is pressed when the driven body is pressed radially outward via the take-up drum by a load that the webbing is pulled out. Therefore, when the driven body is rotated and driven via the take-up drum, the shaft portion can be rotated smoothly while the shaft portion can reliably abut on the inner peripheral surface of the fourth semicircular arc hole portion.

In the seatbelt retractor, rims of the third semicircular arc hole portion and the fourth semicircular arc hole portion are connected smoothly, and rims of the third semicircular arc hole portion and the second enlarged hole portion are connected by an almost sharp corner, and rims of the fourth semicircular arc hole portion and the second enlarged hole portion are connected by an almost sharp corner.

In the above seatbelt retractor, rims of the third semicircular arc hole portion and the fourth semicircular arc hole portion are smoothly connected. Therefore, the boss portion of the driven body can move smoothly in the respective semicircular arc hole portions while being pressed against the inner peripheral portion of the second shaft receiving hole. Further, rims of the third semicircular arc hole portion and the second enlarged hole portion are connected by an almost sharp corner, and rims of the fourth semicircular arc hole portion and the second enlarged hole portion are connected by an almost sharp corner. Thereby, peripheral directional length with respect to inner peripheral portions of the third semicircular arc hole portion and the fourth semicircular arc hole portion can easily be made long.

In the seatbelt refractor, the restricting member may include: an engaging hole coupled with the boss portion in a non-rotatable manner by allowing press-fitting of the boss portion therein; and a positioning projection arranged so as to project toward the side wall portion having the first shaft receiving hole of the holding plate. Further, the side wall portion having the first shaft receiving hole of the holding plate may include a positioning hole configured to allow insertion of the positioning projection of the restricting member. Further, when the positioning projection is inserted in the positioning hole from the take-up drum side and the restricting member is positionally set with reference to the side wall portion having the first shaft receiving hole of the holding plate fixed thereto, the boss portion press-fitted and coupled with the engaging hole may be positionally restricted in a state of securing a clearance with respect to the inner peripheral portion of the first semicircular arc hole portion and movement of the boss portion toward the first enlarged hole portion is restricted.

In the above seatbelt retractor, movement of the boss portion toward the first enlarged hole portion can be restricted in such a manner that the positioning projection arranged on the restricting member is inserted in the positioning hole of the holding plate from the take-up drum side and the boss portion projecting from the first shaft receiving hole is subsequently inserted in the engaging hole of the restricting member. Thereby, position of the driven body can be restricted by adopting simple configuration. Further, a clearance is secured between the boss portion and the first semicircular arc hole portion when the restricting member restricts the position of the driven member. Thereby, even when the driven body rocks, occurrence of abnormal noise can be avoided.

In the seatbelt retractor, the pretensioner mechanism may include a coupling mechanism arranged at take-up drum side of the side wall portion having the first shaft receiving hole of the holding plate and configured to couple the driven body and the take-up drum together when the driven body is rotated and driven by the driving device, and the coupling mechanism may include the restricting member in an integrated form.

In the above seatbelt retractor, the coupling mechanism is arranged at the take-up drum side of the side wall portion having the first shaft receiving hole of the holding plate and configured to couple the driven body and the take-up drum together when the driven body is rotated and the coupling mechanism includes the restricting member in an integrated form. The integrated form means no necessity in preparing the restricting member as separate mechanical part and the reduction in the number of mechanical parts and hours for assemblage can be realized.

In the seatbelt retractor, the boss portion may face the inner peripheral surface of the first shaft receiving hole and includes a second projecting portion projecting radially outward along an entire periphery at one edge thereof opposing the take-up drum with reference to the rotation axis. Further, position of the boss portion may be restricted to be co-axial with the take-up drum by the restricting member and the first projecting portion and the second projecting portion may project radially outward over the first semicircular arc hole portion of the first shaft receiving hole so that at least a peripheral edge portion of the first semicircular arc hole portion is inserted in a clearance defined by the respective projecting portions.

In the above seatbelt retractor, when the position of the boss portion is restricted so as to be co-axial with the take-up drum with reference to the first shaft receiving hole by the restricting member, at least a peripheral edge portion of the first semicircular arc hole portion in the first shaft receiving hole is inserted in a clearance defined by the first projecting portion and the second projecting portion formed so as to project radially outward along the entire periphery of the boss portion.

Thereby, the peripheral edge portion of the first shaft receiving hole inserted in the clearance defined by the first and second projecting portions formed on the boss portion of the driven body can serve to avoid dislocation of the driven body in the rotation axis direction by adopting simple configuration.

In the seatbelt retractor, the driving device may include a gas generating member configured to generate gas; a cylinder formed in a long cylindrical shape and mounted on a back side of the holding plate formed in a substantially U-shape in cross section, with the gas generating member being attached to one end portion of the cylinder; and a piston accommodated in the cylinder in a movable manner, pressed and driven by pressure of the gas and configured to rotate the driven body in a webbing-pull-out direction when pressed and driven. Further, the piston may include a rack at side surface portion thereof facing the driven body along a longitudinal direction. Further, the driven body may include a pinion gear teeth formed on an entire circumference of the outer peripheral surface thereof, configured to face the piston which moves when pushed and driven so as to get engaged with the rack. Further, the restricting member may include a piston positioning pin erected toward outside with reference to the rotation axis of the take-up drum so that the piston positioning pin is inserted in the first enlarged hole portion and gets in contact with a moving directional side end surface portion of the piston when the restricting member is arranged at the take-up drum side surface of the side wall portion having the first shaft receiving hole of the holding plate. Further, the piston positioning pin may be broken when the piston is pressed and driven by pressure of the gas.

In the above seatbelt retractor, the restricting member for restricting position of the boss portion which projects from the first shaft receiving hole of the holding plate is arranged at the take-up drum side surface of the side wall portion in which the first shaft receiving hole is formed. Thereby, the piston positioning pin erected toward outside with reference to the rotation axis of the take-up drum is inserted in the first enlarged hole portion of the first shaft receiving hole in contact with the end portion to which the piston moves.

Thereby, the above configuration can reliably avoid the piston housed in the cylinder from moving with reference to longitudinal direction of the cylinder and contact of the rack of the piston and the pinion gear teeth of the driven body can be avoided when the pretensioner mechanism is in a resting state. Further, when the piston is pressed and driven by pressure of gas, the piston positioning pin is broken by the piston. Thereby, the driven body can be rotated and driven efficiently via the piston.

DETAILED DESCRIPTION OF THE PREFERRED EMBODIMENTS

Hereinafter, first and second embodiments of the seatbelt retractor according to the present invention will be described in detail while referring to the accompanying drawings.

First Embodiment

[Schematic Configuration]

Figure 1:
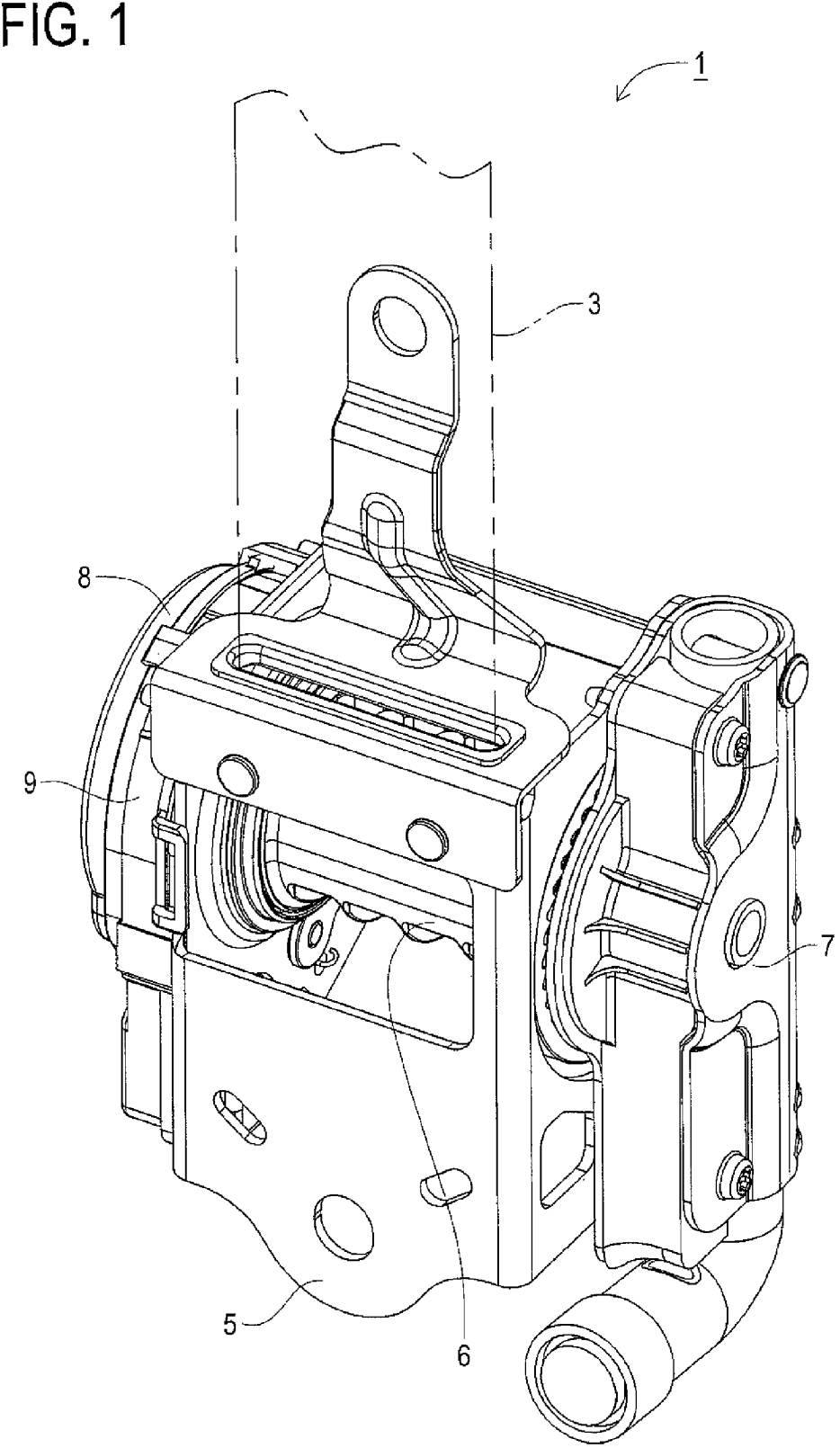
FIG. 1 is a perspective view showing an external appearance of a seatbelt retractor according to a first embodiment.
Figure 2:
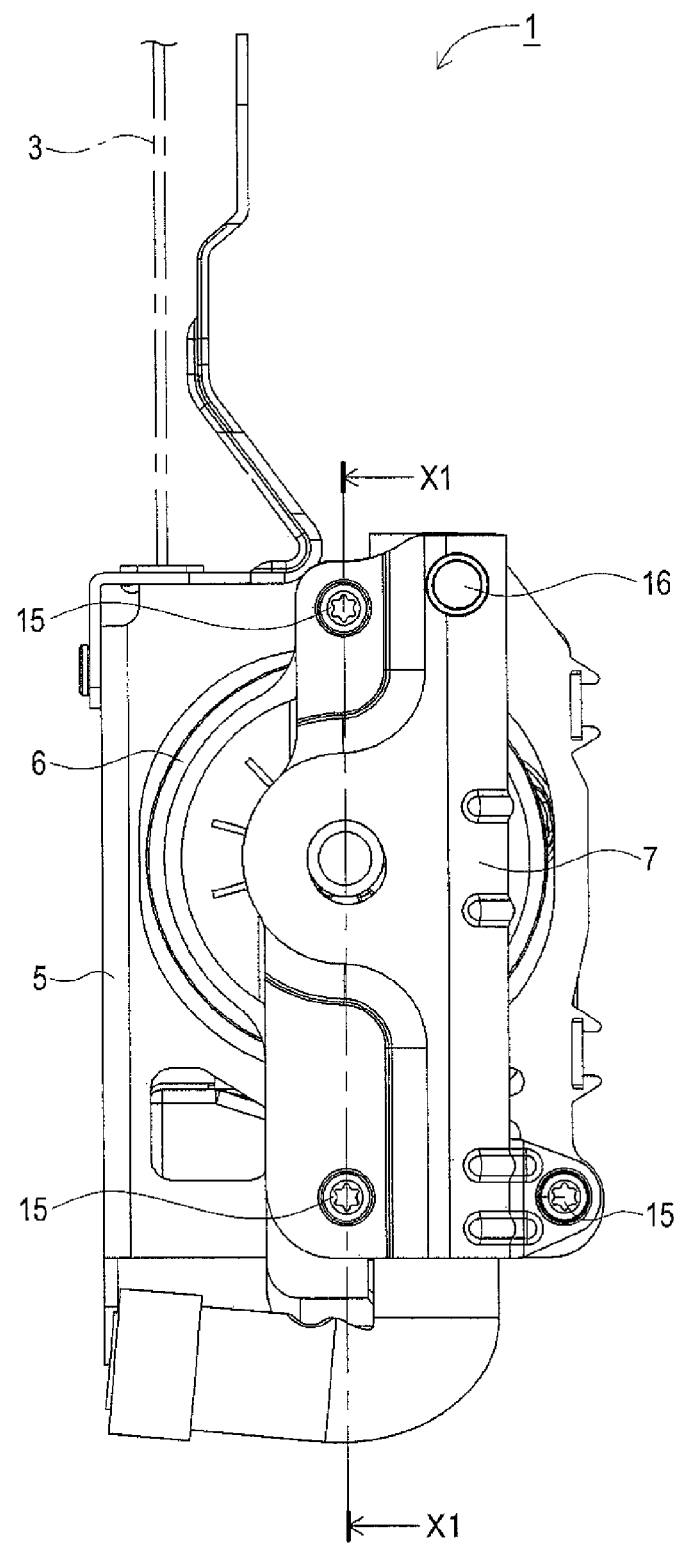
FIG. 2 is a side view of the seatbelt retractor.
Figure 3:
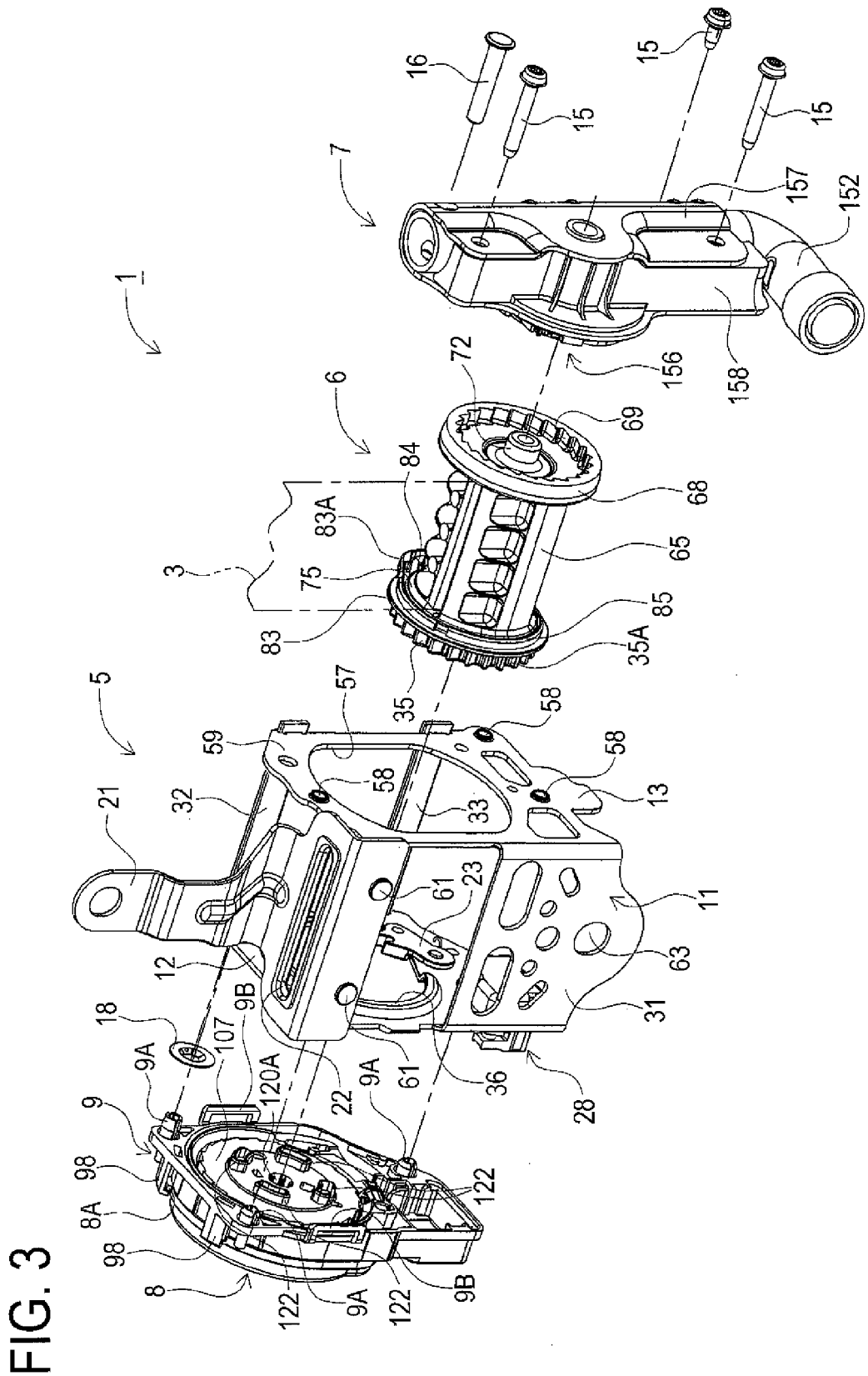
FIG. 3 is a perspective view showing respective assemblies of the seatbelt retractor in a disassembled state.
Figure 4:
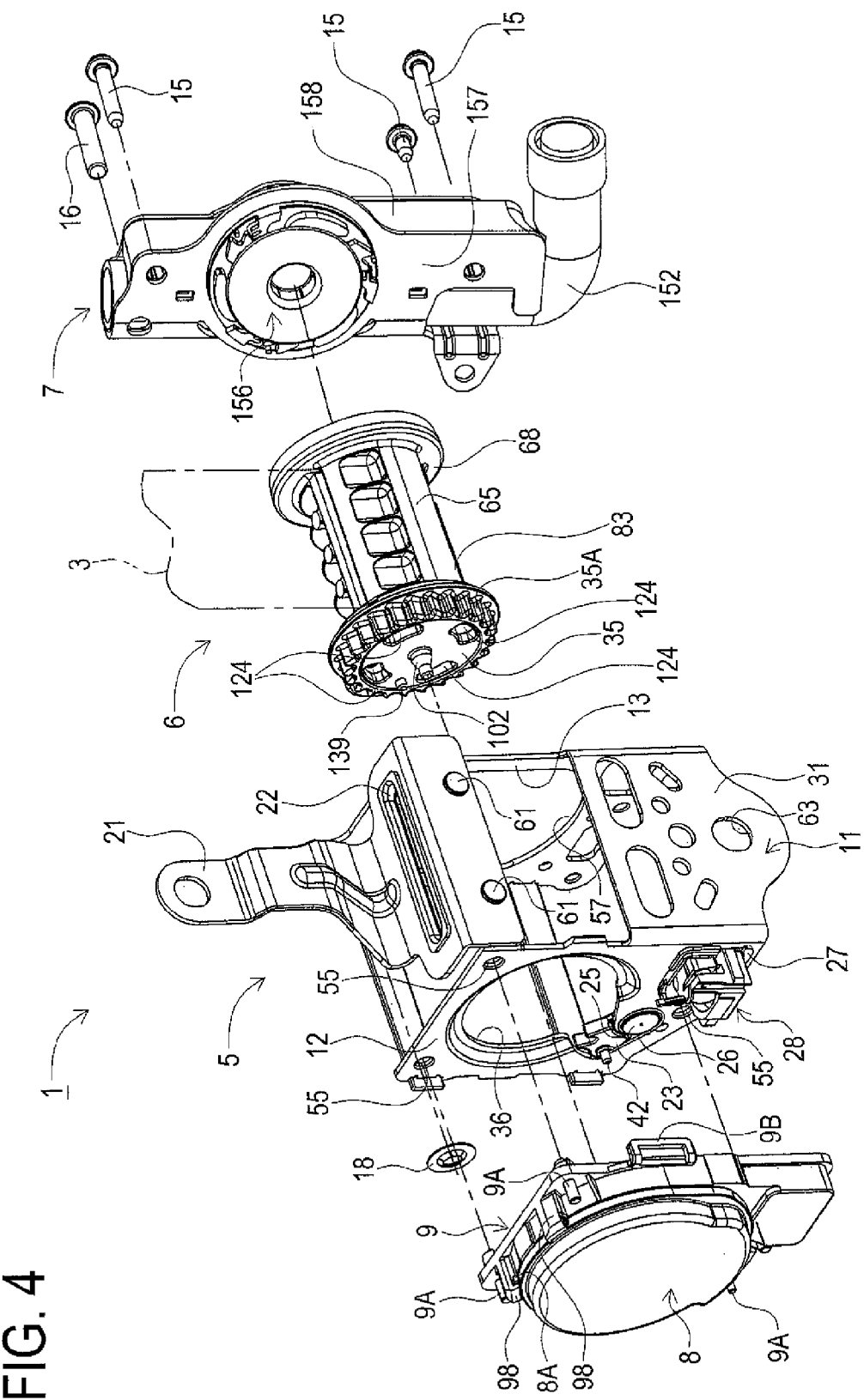
FIG. 4 is a perspective view showing respective assemblies of the seatbelt retractor in a disassembled state.

First, a schematic configuration of a seatbelt retractor 1 according to the first embodiment will be described based on FIG. 1 through FIG. 4. FIG. 1 is a perspective view showing an external appearance of a seatbelt retractor 1 according to the first embodiment. FIG. 2 is a side view of the seatbelt retractor. FIG. 3 and FIG. 4 each are a perspective view showing the respective assemblies of the seatbelt retractor 1 in a disassembled state.

As shown in FIG. 1 through FIG. 4, the seatbelt retractor 1 is a device for retracting vehicle webbing 3. The seatbelt retractor 1 has a housing unit 5, a take-up drum unit 6, a pretensioner unit 7, a take-up spring unit 8 and a locking unit 9.

The locking unit 9 has a mechanism cover 97 (refer to FIG. 8) with nylon latches 9A and locking hooks 9B integrally formed thereat. The locking unit 9 is fixed by the nylon latches 9A and the locking hooks 9B at one side wall portion 12 of a housing 11 constituting the housing unit 5. The locking unit 9 constitutes a lock mechanism that stops pull-out of the webbing 3 in response to a sudden pull-out of the webbing 3 or an abrupt change in acceleration of a vehicle, to be later described. The take-up spring unit 8 is fixed onto the outside in a direction of a rotational axis of the take-up drum unit 6 of the locking unit 9 (refer to FIG. 10), to be later described, through three tabular engagement pieces 8A (refer to FIG. 9) projecting from an outer periphery of a spring case 93 (refer to FIG. 8).

The pretensioner unit 7 is mounted to at a side wall portion 13 of the housing 11. The side wall portion 13 is located opposite to the side wall portion 12 of the housing 11 having a substantially square-bracket shape in plain view, and screwed by screws 15 inserted through from an outside, in a direction of the rotational axis of the take-up drum unit 6, of the pretensioner unit 7. The pretensioner unit 7 is pinned with a stopper pin 16 and a push nut 18. The stopper pin 16 is inserted into the side wall portion 13 from an outside of the pretensioner unit 7 in the direction of the rotational axis of the take-up drum unit 6. The push nut 18 is inserted to the stopper pin 16 from an inside in a direction of the rotational axis of the take-up drum unit 6 with regard to the side wall portion 13.

A take-up drum unit 6 onto which the webbing 3 is wound is rotatably supported between the locking unit 9 fixed to the side wall portion 12 of the housing unit 5 and the pretensioner unit 7 fixed to the side wall portion 13 of the housing unit 5. The take-up drum unit 6 is constantly urged in a take-up direction of the webbing 3 by the take-up spring unit 8 fixed on the outside of the locking unit 9.

[Schematic Configuration of Housing Unit]

Figure 5:
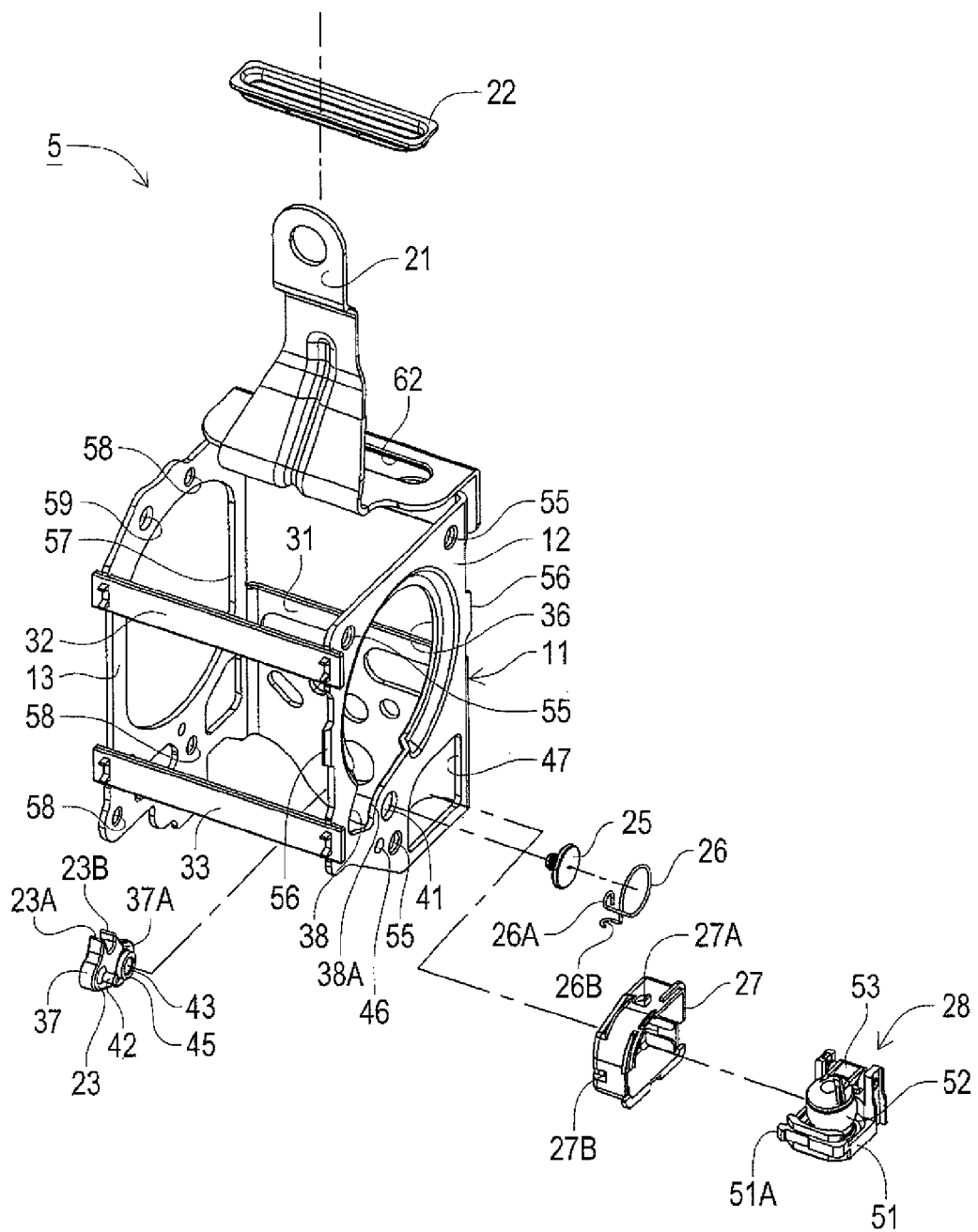
FIG. 5 is an exploded perspective view of a housing unit.

A schematic configuration of the housing unit 5 will next be described referring to FIG. 3 through FIG. 5 FIG. 5 is an exploded perspective view of the housing unit 5.

As shown in FIG. 3 through FIG. 5, the housing unit 5 includes the housing 11, the bracket 21, a protector 22, a pawl 23, a pawl rivet 25, a twisted coil spring 26, a sensor cover 27, an acceleration sensor 28, a connecting member 32, 33 and rivet 61.

The housing 11 has a back plate portion 31 to be fixed at a vehicle body and the side wall portions 12, 13 opposed to each other and extending from both side edge portions of the back plate portion 31. The housing 11 is made of a steel material or the like and is formed to have a substantially U-shape in planer view. The side wall portions 12, 13 are connected to each other with the connecting members 32, 33, each of which has a horizontally long thin plate-like shape, being long in a direction of the rotational axis of the take-up drum unit 6. An opening portion is formed in the center of the back plate portion 31, and helps reduce weight and regulates the accommodation amount of the webbing 3.

The side wall portion 12 has a through hole 36 into which a ratchet gear 35 of the take-up drum unit 6 is inserted with a predetermined clearance (for instance, a clearance of approximately 0.5 mm). The inner peripheral portion of the through hole 36 is recessed axially inward in a predetermined depth toward the take-up drum unit 6, opposed to the lock gear 35 of the take-up drum unit 6.

From an obliquely lower edge portion of the through hole 36 (at a portion obliquely lower left in FIG. 5), a notch portion 38 is notched outwardly regarding a rotation direction of the pawl 23 (in a direction away from the ratchet gear 35 of the pawl 23). The notch portion 38 is positioned opposite to a portion of a tip side of the pawl 23 including engagement teeth 23A, 23B, and is notched in a depth enough to receive a portion of the tip side. A through hole 41 is formed at a position lateral to the notch portion 38, at the side of the back plate portion 31 when the notch portion 38 and the through hole 41 are seen from front. The through hole 41 is configured to mount the pawl 23 in a rotatable manner. At a portion on the through hole 41 side on which the pawl 23 abuts, the notch portion 38 further has a guiding portion 38A shaped in a coaxial arc with the through hole 41.

Meanwhile, the pawl 23 is made of a steel material or the like and has a stepped portion 37A at a portion to abut on and move along the guiding portion 38A. The stepped portion 37A is formed at approximately the same height as the thickness of the side wall portion 12, recessed in an arc-like shape at the same radius curvature as the guiding portion 38A. The pawl 23 further has a guiding pin 42 at a tip portion on an axially outer side face (the frontward, in FIG. 5). The guiding pin 42 is inserted into a guiding hole 142 (refer to FIG. 8) of a clutch 111 that forms the locking unit 9.

Further, at an base end portion of the pawl 23, there is formed a through hole 43 into which the pawl rivet 25 is inserted. The through hole 43 has, along the periphery thereof, a boss portion 45 to be rotatably inserted in the through hole 41 of the side wall portion 12, shaped cylindrically and at a height approximately the same as the thickness of the side wall portion 12. Further, in a state where the boss portion 45 is inserted in the through hole 41 of the side wall portion 12 from the inner side of the housing 11, the pawl rivet 25 is inserted into the through hole 43 from outside of the side wall portion 12 to rotatably fix the pawl 23. Accordingly, the engagement teeth 23A, 23B of the pawl 23 and ratchet gear teeth 35A provided on the outer periphery of the ratchet gear 35 are arranged substantially on the same plane as the outer side surface of the side wall portion 12.

The head of the pawl rivet 25 is formed into a disk-like shape having a larger diameter than the through hole 41 and at a predetermined thickness (for instance, approximately 1.5 mm thick). Then, the twisted coil spring 26 that operates as an example of a return spring is arranged in a single wind to surround the periphery of the head of the pawl rivet 25, and one end side 26A thereof is attached to the guiding pin 42 of the pawl 23. Further, the wire diameter of the twisted coil spring 26 is approximately half the height of the head of the pawl rivet 25 (for instance, approximately 0.6 mm wire diameter). Accordingly, the spring height of the single wind of the twisted coil spring 26 is set to have approximately the same height of the head of the pawl rivet 25.

Further, the other end side 26B of the twisted coil spring 26 is passed at the side wall portion 12 side of the one end side 26A in such a way as to be able to slide on the side wall portion 12, then bent approximately at an right angle inward the side wall portion 12 (backside of the side wall portion 12 in FIG. 5), and inserted into a mounting hole 46 formed at the side wall portion 12. The end portion of the other end side 26B is bent into a U-shape side and abuts on the inner surface of the side wall portion 13, to form a slip-prevention portion. As a result, the pawl 23 is urged to rotate in a direction deeper into the notch portion 38 (counterclockwise in FIG. 4) by the twisted coil spring 26, and the tip portion including the engagement teeth 23A, 23B is made to abut on the innermost side of the notch portion 38. Thus, the pawl 23 is urged to rotate by the twisted coil spring 26 in a direction moving away from the ratchet gear 35.

Further, as illustrated in FIG. 3 through FIG. 5, below the through hole 36 of the side wall portion 12 (downward in FIG. 5), there is formed an opening portion 47 which is substantially square-shaped. The opening portion 47 is opened from a portion below the center axis of the through hole 36 (downward in FIG. 5) toward the back plate portion 31. The sensor cover 27 is fitted into the opening portion 47. The sensor cover 27 is shaped in a shallow box body which is substantially the same square shape as the opening portion 47, and fitted from outside (front side in FIG. 5). There, the sensor cover 27 made of resin is made to abut on the outer periphery portion of the opening portion 47 (periphery on the front side in FIG. 5) at a brim portion formed at the periphery on the opening thereof. At the same time, as a pair of fixing claws 27A projected at both end faces in the vertical direction in FIG. 5 of the sensor cover 27 (one of the fixing claws 27A on the upper end face is illustrated in FIG. 5.) is inserted inward at the both sides in the vertical direction of the opening portion 47 in FIG. 5 and elastically locked.

Further, the acceleration sensor 28 includes a sensor holder 51, an inertia mass 52 and a sensor lever 53. The sensor holder 51 is made of resin, formed in an approximately box shape, opened on the vertically upper side (upper side in FIG. 5) and has a bowl-shaped mounting portion on a bottom face. The inertia mass 52 is made of metal such as steel formed into a spherical body and movably placed on the mounting portion. The sensor lever 53 is made of resin, placed on the vertically upper side of the inertia mass 52. The sensor holder 51 supports the sensor lever 53 at an end portion opposite to the pawl 23 (right end portion in FIG. 5), in a manner allowing vertical movement (in up/down direction in FIG. 5).

The sensor holder 51 has a pair of engagement claws 51A at both side face portions opposed to both side wall portions inside the sensor cover 27 (one of the engagement claws 51A is illustrated in FIG. 5). The acceleration sensor 28 is fitted into the sensor cover 27 so that the pair of engagement claws 51A is fitted into and locked at fixing holes 27B of the sensor cover 27. As a result, the acceleration sensor 28 is mounted onto the housing 11 through the sensor cover 27.

Further, the side wall portion 12 has the mounting holes 55 into which the nylon latches 9A of the locking unit 9 are fitted, at three locations including both corners of the upper end portion (the upper end portion in FIG. 5) and the portion below the through hole 36 (the lower portion in FIG. 5). Further, engagement pieces 56 are formed at center portions (the center portions in vertical direction in FIG. 5) of right and left edge portions of the side wall portion 12, respectively. The engagement pieces 56 protrude orthogonal to the rotation axis of the take-up drum unit 6. The engagement pieces 56 are elastically engaged with locking hooks 9B of the locking unit 9, respectively.

Further, at a center in the side wall portion 13 is formed a through hole 57 into which the take-up drum unit 6 is inserted. Further, the side wall portion 13 has screw holes 58 into which the screws 15 are screwed and fixed, at three locations including the approximate center of the lower end portion (lower end portion in FIG. 3), the corner on a connecting member 33 side and the corner of the upper end portion (upper end portion in FIG. 3) and closer to the back plate portion 31. The screw holes 58 are formed by burring processing toward the pretensioner unit 7 side. The side wall portion 13 has a through hole 59 at the corner closer to a connecting member 32 of the upper end portion (upper end portion in FIG. 2). The stopper pin 16 is inserted through the through hole 59.

The bracket 21 is made of steel material or the like, and configured to be attached onto the upper end portion of the back plate portion 31 (the upper end portion in FIG. 3) by the rivets 61. The bracket 21 has a horizontally-long through hole 62, long in a width direction of the back plate portion 31, from which the webbing 3 is drawn out. The through hole 62 is formed in an extension portion extending approximately at a right angle from the upper end portion of the back plate portion 31 toward the connecting member 32. The horizontally long frame-like protector 22 made of synthetic resin such as nylon is fitted inside the through hole 62. A bolt insertion hole 63 is formed at the lower end portion of the back plate portion 31 (the lower end portion in FIG. 3). A bolt is inserted through the bolt insertion hole 63 when mounted onto a fastening piece of a vehicle (not shown).

[Schematic Configuration of Take-Up Drum Unit]

Figure 6:
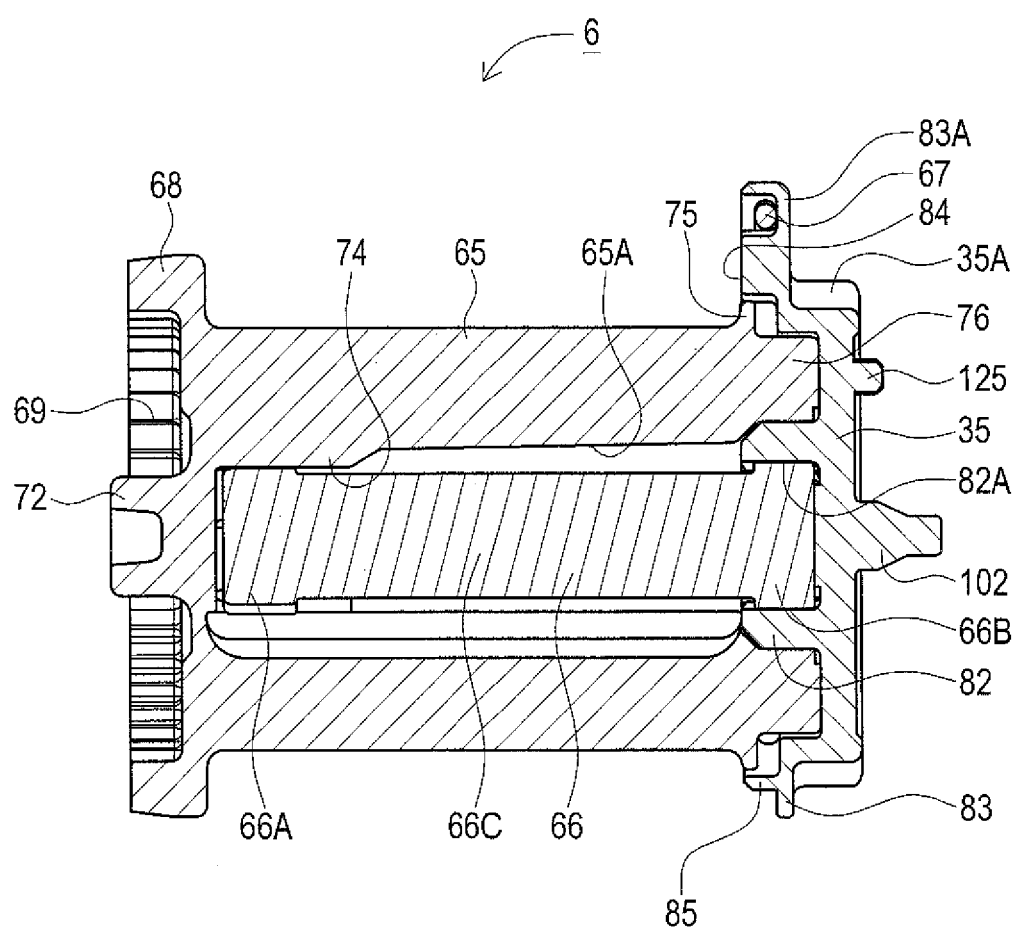
FIG. 6 is a cross sectional view of a take-up drum unit including an axial center thereof.
Figure 7:
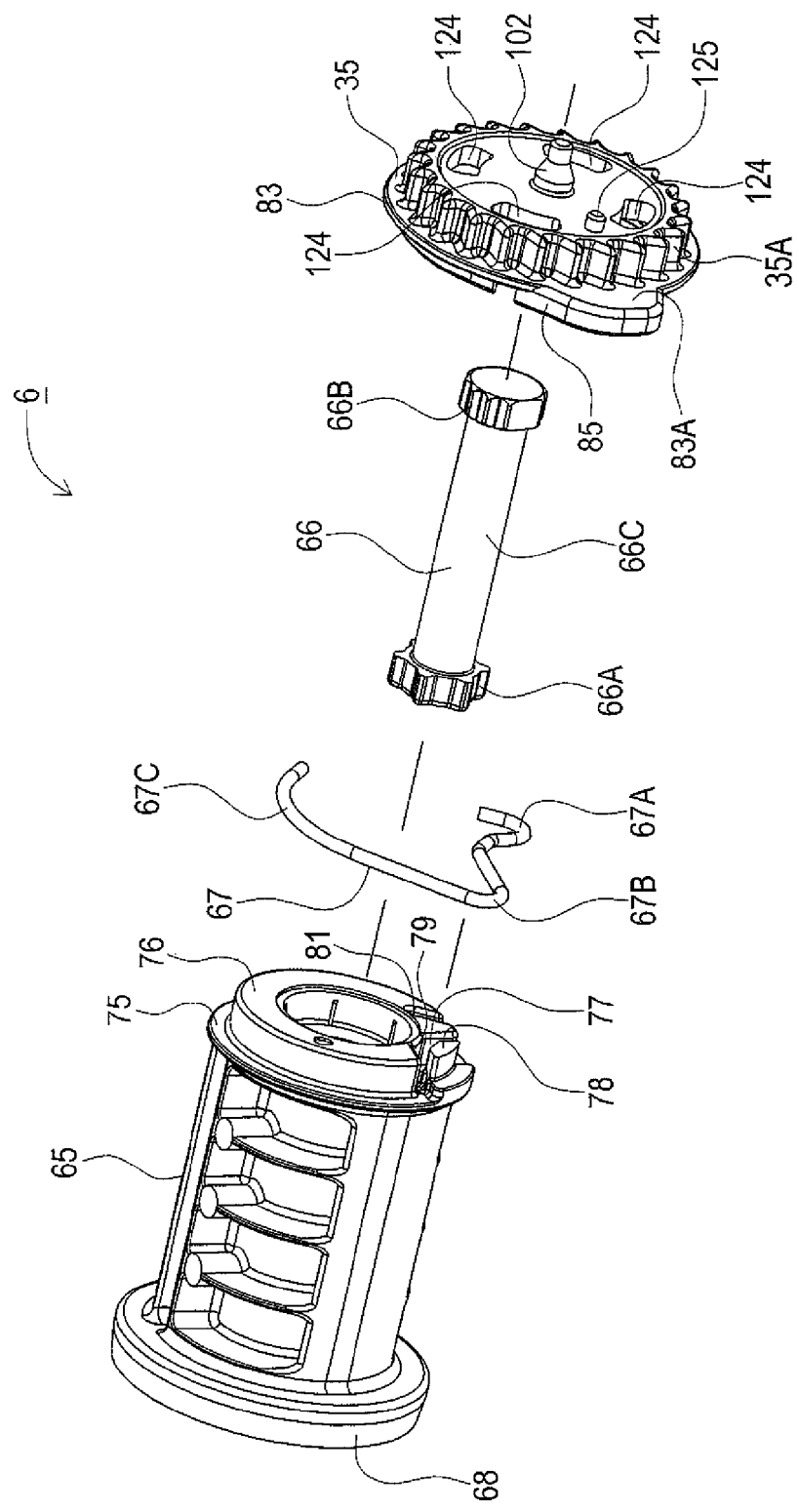
FIG. 7 is an exploded perspective view of the take-up drum unit.

Next, a schematic configuration of the take-up drum unit 6 will be described based on FIG. 3, FIG. 4, FIG. 6 and FIG. 7. FIG. 6 is a cross sectional view of a take-up drum unit 6 including an axial center thereof. FIG. 7 is an exploded perspective view of the take-up drum unit 6.

As illustrated in FIG. 6 and FIG. 7, the take-up drum unit includes the take-up drum 65, a torsion bar 66, a wire 67 and the ratchet gear 35.

As illustrated in FIG. 3, FIG. 4, FIG. 6 and FIG. 7, the take-up drum 65 is made by aluminum die-casting, zinc die-casting or the like and is formed in a substantially cylindrical shape, with an end face on the side of the pretensioner unit 7 being walled and closed. On an edge portion of the take-up drum 65 at the side of the pretensioner unit 7 with respect to axial direction of the take-up drum 65, there is formed a flange portion 68 extending radially and outwardly at substantially right angles (leftward in FIG. 6) from an outer peripheral portion thereof. Further, on the inner circumferential surface of the flange portion 68, as later described, there is formed an internal gear 69 which engages with clutch pawls 167 (refer to FIG. 12) at vehicle collision to transmit the rotation of a pinion gear 155 (refer to FIG. 12).

A cylindrical boss 72 is erected on the center position of the end face portion on the pretensioner unit 7 side of the take-up drum 65. The boss 72 is fitted into a bearing 169 (refer to FIG. 12 and FIG. 14) formed of synthetic resin material such as polyacetal to be later described, and the base end portion of the boss 72 abuts on the bearing 169. Accordingly, one side of the take-up drum unit 6 is rotatably supported, via the bearing 169, at the boss portion 155D of the pinion gear 155 making up the pretensioner unit 7 (refer to FIG. 13 and FIG. 14).

The take-up drum 65 has a shaft hole 65A inside thereof. The shaft hole 65A has a draft angle in a manner to be tapered along a center axis. A spline groove 66A is formed at the flange portion 68 side end of the shaft hole 65A, so as to allow press-fitting of the spline 66A provided one end of the torsion bar 66 made of steel or the like.

The torsion bar 66 is made of a steel material or the like, and includes a shaft portion 66C of a stick-like shape and circular in cross section, and splines 66A, 66B formed on both ends of the shaft portion 66C. The torsion bar 66 is relatively non-rotatably press-fitted inside the take-up drum 65, through pushing and putting the spline 66A side of the torsion bar 66 into the shaft hole 65A of the take-up drum 65 until abutting on the flange portion 68.

Further, at an end portion of the take-up drum 65 axially on the side of the locking unit 9, there is formed a flange portion 75 having substantially circular shape in front view, radially extended on the slightly axially inner circumferential surface from the end portion. Further, at a portion axially outward from the flange portion 75, a cylindrical stepped portion 76 is formed in a shape with slightly narrower outer diameter. The stepped portion 76 is provided so as to surround the spline 66B on the other side of the torsion bar 66 press-fitted inside the shaft hole 65A, forming a predetermined clearance.

Further, there is integrally formed a holding-side crooked path 77 on the outer peripheral surface of the stepped portion 76 formed on the outer side surface of the flange portion 75, having approximately circular shape in front view, as a part thereof. A crooked portion 67A at one end of linear wire 67 made of a metal material such as stainless material and having circular cross section is fixedly held at the holding-side crooked path 77.

As illustrated in FIG. 7, the holding-side crooked path 77 consists of: a convex portion 78 substantially trapezoid shaped in front view so as to go narrower in an inner radial direction and configured to project axially outward from outer side surface of the flange portion 75; a concave portion 79 configured to face the convex portion 78 on the outer peripheral surface of the stepped portion 76; a groove portion 81 formed so as to extend toward obliquely inner direction slanting in counterclockwise direction from the outer peripheral surface of the stepped portion 76 slightly away from an end portion at the counterclockwise direction in front view (counterclockwise direction side in FIG. 7) of the concave portion 79; and an outer peripheral surface between the concave portion 79 and the groove portion 81 on the stepped portion 76.

Further, the ratchet gear 35 is made by aluminum die-casting, zinc die-casting or the like, has a substantially ring shape in axial cross section and has on the outer periphery thereof the ratchet gear portion 35A. A cylindrical fixation boss 82 is erected at an inner center position of the ratchet gear 35. The inner peripheral face of the fixation boss 82 has a spline groove 82A into which the spline 66B formed on the other end side of the torsion bar 66 is press-fitted. Further, the inner peripheral portion of the ratchet gear portion 35A is configured to have an inner diameter enough to allow insertion of the stepped portion 76 of the take-up drum 65.

The ratchet gear 35 has a flange portion 83 extended radially outward in an entire periphery from the end face portion on the take-up drum 65 side of the ratchet gear portion 35A. The flange portion 83 has a ring-like shape in front view, extending radially outward over the outer diameter of the flange portion 75 of the take-up drum 65. Further, the flange portion 83 is extended radially outward from an outer circumference portion having a predetermined center angle (for instance, center angle of roughly 60 degrees) in approximately a trapezoidal shape in front view, which becomes narrower in the tip portion. Further, the outer diameter of the flange portion 83 is formed roughly the same size as the outer diameter of the flange portion 68 of the take-up drum 65.

A trapezoid-like portion 83A is extended radially outward from the flange portion 83. The trapezoid-like portion 83A is narrower at the tip portion thereof in front view and has approximately a trapezoidal shape. A convex portion 84 having approximately a conical shape in front view is formed at an approximately center portion on an inner side surface of the trapezoid-like portion 83A at the take-up-drum 65 side, and projected axially outward from the trapezoid-like portion 83A. The crooked portion 67B of the wire 67, substantially inverted U-shaped in front view, is fitted inside the convex portion 84 (refer to FIG. 9).

Further, a flange portion 85 is formed on the inner side surface of the flange portion 83 at the take-up drum 65 side. The flange portion 85 have an inner diameter slightly larger than the outer diameter of the flange portion 75 of the take-up drum 65, erected along the outer circumference portion of the trapezoid-like portion 83A, and substantially oval-shaped in front view. Further, the inner periphery of the flange portion 85 and the outer periphery of the convex portion 84 make up a deformation-giving crooked path that is substantially inverted U-shaped in front view.

The crooked portion 67A at one end of the wire 67 being bent like a substantially S-like shape is first fitted in the holding-side crooked path 77 formed on the flange portion 75 of the take-up drum 65 and the stepped portion 76. The crooked portion 67B that is substantially inverted U-shaped in front view and formed to continue to the crooked portion 67A is placed so as to project exterior to the outer periphery of the flange portion 75. Further, the crooked portion 67C that is formed to continue to the crooked portion 67B and shaped like an arc is placed along outer peripheral surface outlined of the stepped portion 76.

Subsequently, in order to attach the ratchet gear 35 onto the take-up drum 65, first, the crooked portion 67B of the wire 67 that is substantially inverted U-shaped in front view and configured to project exterior to the outer periphery of the flange portion 75 of the take-up drum 65 is fitted in the deformation-giving crooked path formed at outer peripheral portion of the convex portion 84 arranged on the trapezoid-like portion 83A of the flange portion 83 of the ratchet gear 35.

Further, at the same time, the fixation boss 82 of the ratchet gear 35 is inserted inside the stepped portion 76 of the take-up drum 65, and the spline 66B formed on the other side of the torsion bar 66 is press-fitted inside the spline groove 82A of the fixation boss 82. The wire 67 is thus arranged between the flange portion 75 of the take-up drum 65 and the flange portions 83 and 85 of the ratchet gear 35, and the ratchet gear 35 is attached on the take-up drum 65 in a non-rotatable manner.

[Schematic Configuration of Take-Up Spring Unit]

Next, a schematic configuration of the take-up spring unit 8 will be described based on FIG. 3, FIG. 4 and FIG. 8 through FIG. 11.

Figure 8:
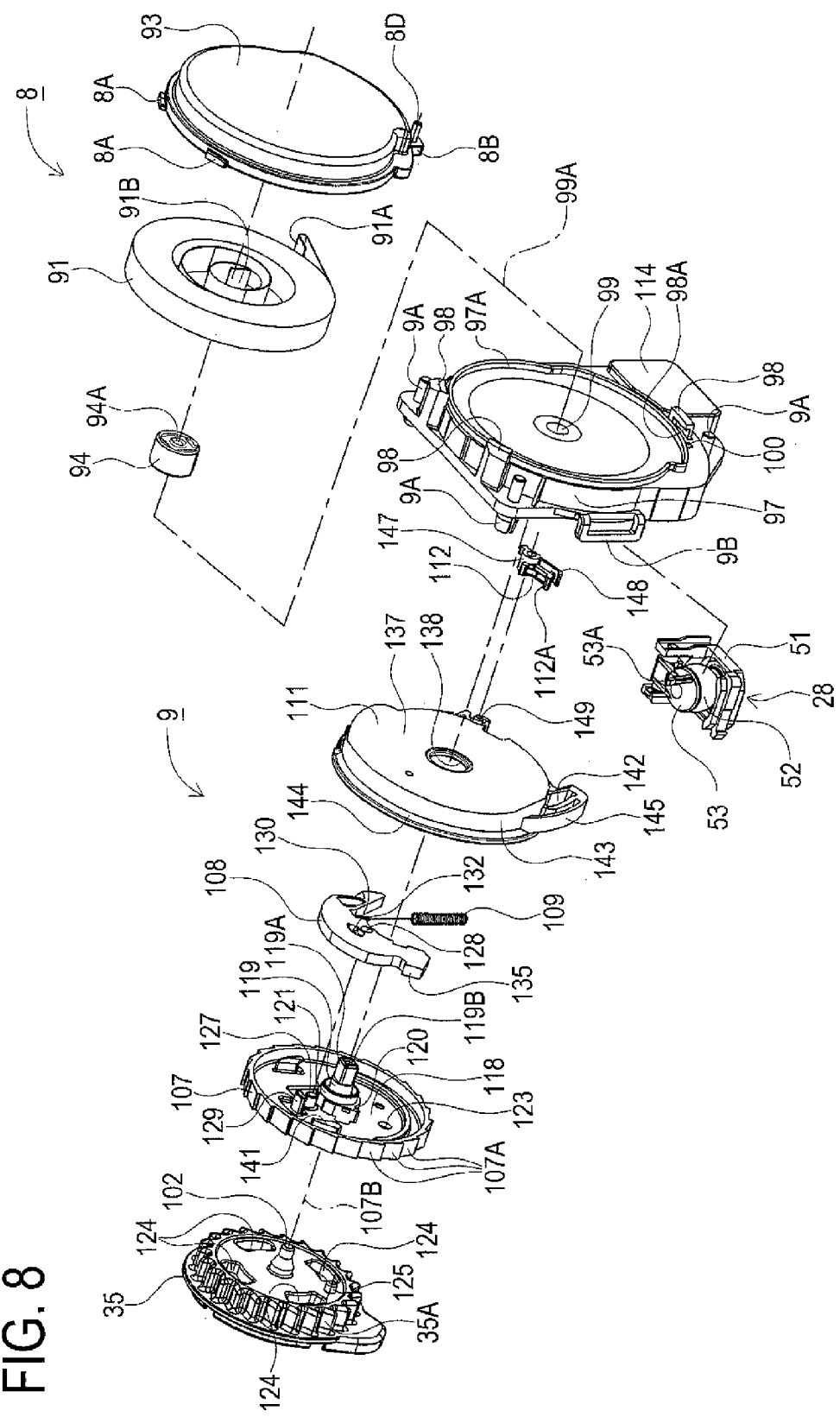
FIG. 8 is an exploded perspective view of a ratchet gear, a take-up spring unit and a locking unit.
Figure 9:
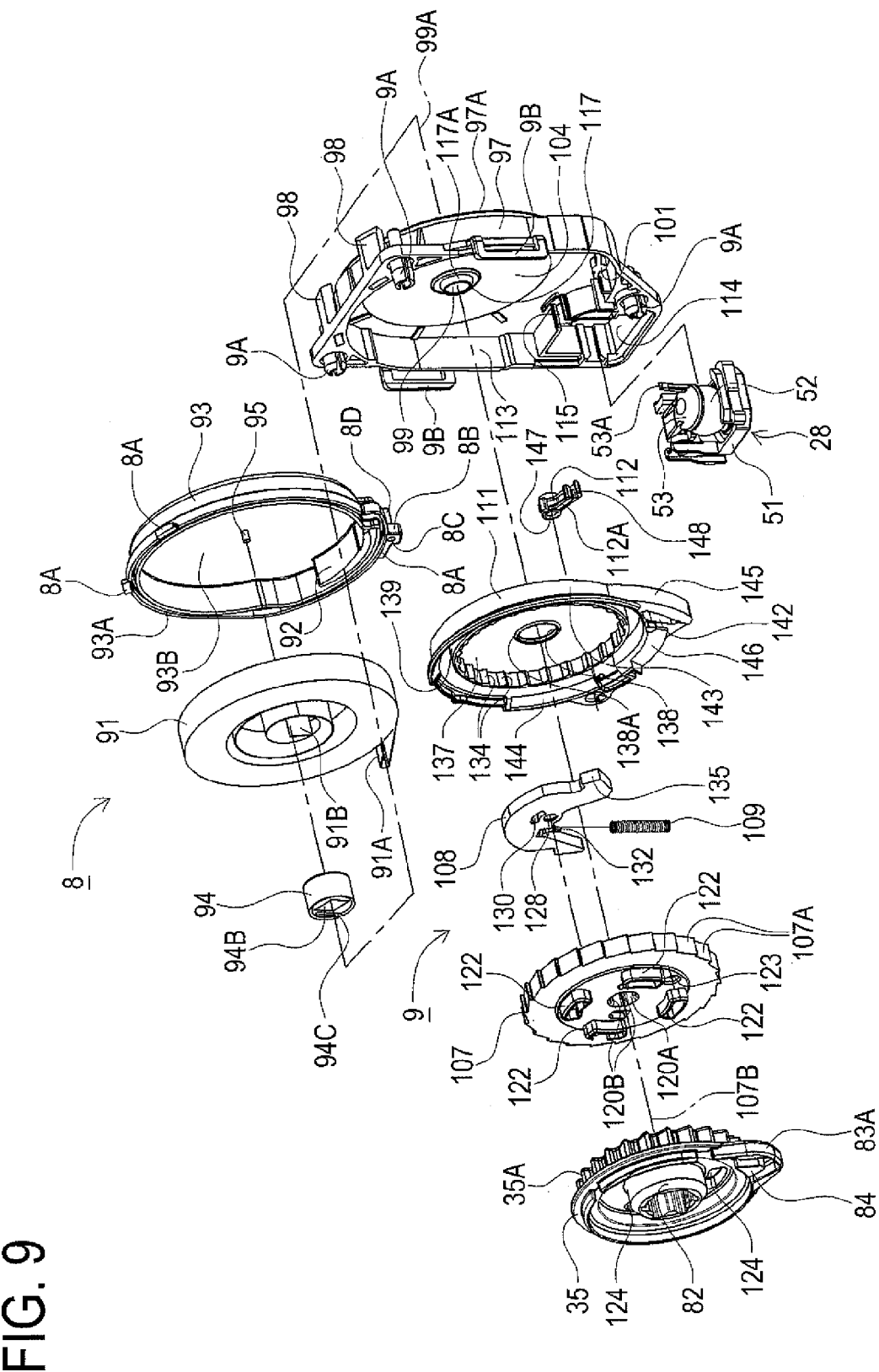
FIG. 9 is another exploded perspective view of the ratchet gear, the take-up spring unit and the locking unit.
Figure 10:
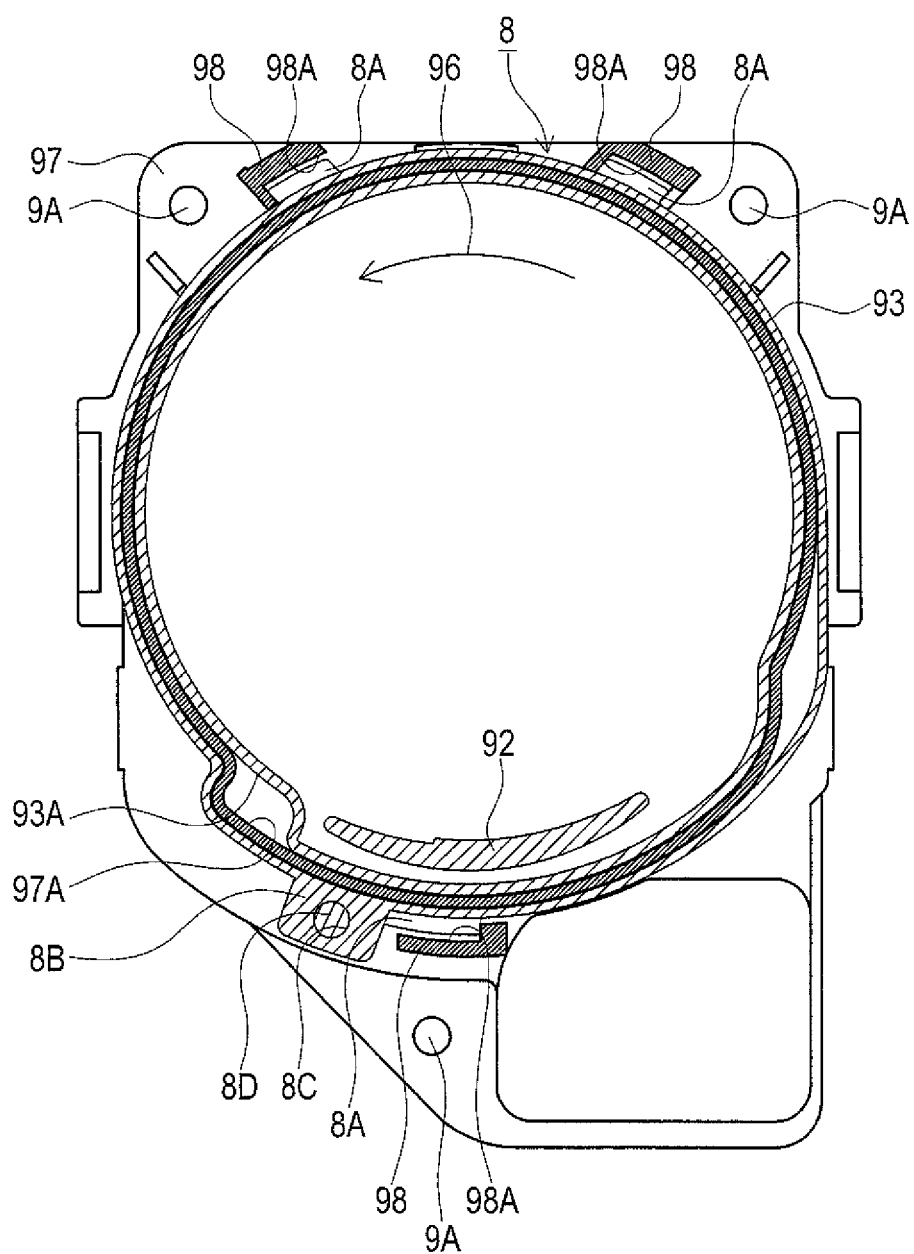
FIG. 10 is a sectional view for illustrating a mounting operation of a spring case.
Figure 11:
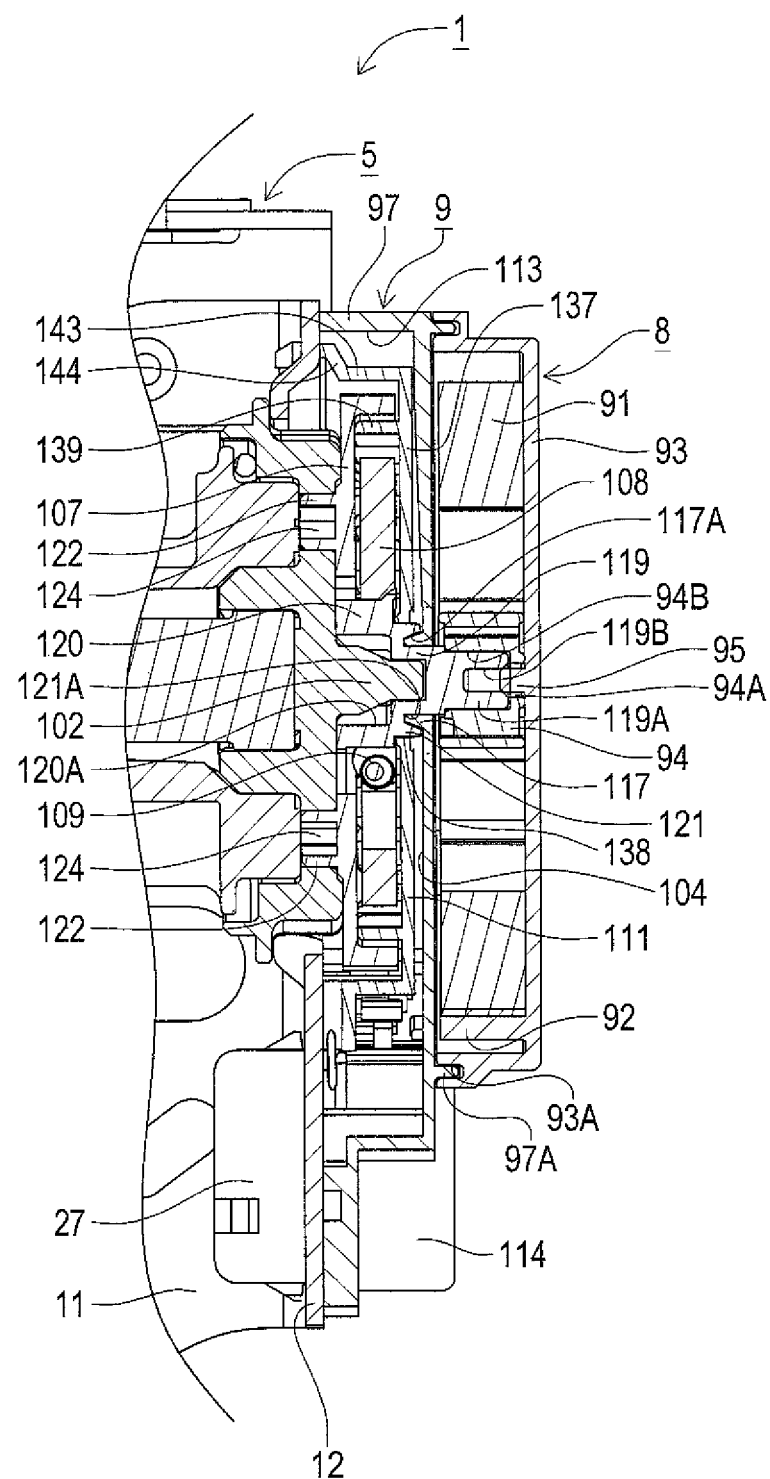
FIG. 11 is an enlarged sectional view of a principal portion including the take-up spring unit and the locking unit.

FIG. 8 and FIG. 9 each are an exploded perspective view of the take-up spring unit 8 including the ratchet gear and a locking unit 9. FIG. 10 is a cross sectional view for illustrating attachment of the spring case 93. FIG. 11 is an enlarged sectional view of a principal portion of the take-up spring unit 8 and the locking unit 9.

As shown in FIG. 2, FIG. 3, FIG. 8, FIG. 9 and FIG. 11, the take-up spring unit 8 has a spiral spring 91, the spring case 93 and the spring shaft 94. The spring case 93 accommodates the spiral spring 91 of which outer end 91 is fixed to a rib 92 projecting from the bottom face of the inner peripheral portion of the spring case 93. The spring shaft 94 is connected to the inner end 91B of the spiral spring 91 so that the spring shaft 94 is urged by the spring force. The spring case 93 includes a groove portion 93A at end portion at the side of the mechanism cover 97 constituting the locking unit 9, the groove portion 93A being formed along almost entire periphery of the spring case 93 with predetermined depth (for instance, approximately 2.5 mm deep).

Further, the tabular engagement pieces 8A substantially rectangular shaped in front view are projected at the end portion of the mechanism cover 97 side of the spring case 93, from three locations of the outer circumference portion. The engagement pieces 8A are projected concentrically with regard to an axial center 99A of a through hole 99 formed in the substantially center portion of the mechanism cover 97. Further, outer circumferential surfaces radially outward with regard to the axial center 99A of the through hole 99 of the engagement pieces 8A are formed so as to be positioned on concentric circles.

As shown in FIG. 8 and FIG. 9, a fixation portion 8B is connected to the engagement piece 8A positioned in the lower end portion of the spring case 93. The fixation portion 8B has a square cross section, and is formed continuously to an end portion on the counterclockwise direction side with regard to the axial center 99A of the through hole 99. The fixation portion 8B has: a through hole 8C parallel to the axial center 99A of the through hole 99 at the substantial center of the fixation portion 8B; and a fixation pin 8D integrally formed so as to close an end portion of the through hole 8C on the outside in the axial center 99A direction.

Further, the shaft diameter of the fixation pin 8D is substantially the same as the inner diameter of the through hole 8C. Through pushing the fixation pin 8D toward the mechanism cover 97 side at a predetermined load or higher, the fixation pin 8D can be inserted inside the through hole 8C. The length of the fixation pin 8D is designed to be larger than the thickness of the fixation portion SB.

Meanwhile, as shown in FIG. 8 through FIG. 10, the mechanism cover 97 has thick plate-like holding portions 98 projecting toward the take-up spring unit 8 side from three locations of the outer circumference portion facing the engagement pieces 8A, respectively. Each of the holding portions 98 is substantially rectangular shaped in cross section. An engagement groove portion 98A is formed at a base end portion of each of the holding portions 98. The engagement groove portion 98A is cut-off in a counterclockwise direction with regard to the axial center 99A of the through hole 99, and closed at an innermost side end portion.

Further, in each engagement groove portion 98A, a bottom face portion on the outside radially with regard to the axial center 99A of the through hole 99 is formed so as to be disposed on concentric circles with a radius slightly larger (for instance, a radius larger by approximately 0.2-0.5 mm) than that of each radially outside end portion of the engagement pieces 8A of the spring case 93. The width dimension of the axial center 99A direction of each engagement groove portion 98A is designed to be substantially the same as the thickness dimension of each engagement piece 8A. As later described, the engagement pieces 8A are configured to be inserted inside the engagement groove portions 98A, respectively (refer to FIG. 10).

The mechanism cover 97 further has a substantially ring-like rib portion 97A, projecting along a peripheral portion outside with regard to a rotational axis direction of the take-up drum unit 6, at a predetermined height (for instance, a height of approximately 2 mm). The rib portion 97A is disposed at a position corresponding to the groove portion 93A. The inner diameter and outer diameter of the rib portion 97A are set so that, when the rib portion 97A is inserted in the groove portion 93A, a predetermined clearance (for instance, a clearance of approximately 0.1-0.3 mm) is formed, to each of the inner diameter and outer diameter of the groove portion 93A.

As illustrated in FIG. 8 and FIG. 9, a fixation hole 100 is formed at a position to face the fixation pin 8D when the spring case 93 is mounted onto the mechanism cover 97, to be later described. The fixation hole 100 is circular in cross section and located in vicinity of the holding portion 98 facing the lower end portion of the rib portion 97A, on a clockwise direction side with regard to the axial center 99A.

The inner diameter of the fixation hole 100 is formed so as to be smaller by a predetermined dimension (for instance, approximately by 0.1-0.3 mm) than the outer diameter of the fixation pin 8D of the spring case 93, and designed to allow press-fitting of the fixation pin 8D. Further, a cylindrical boss 101 is formed in a periphery of the fixation hole 100, on the inner back side thereof, namely, on the side wall portion 12 side of the housing 11. An inner back end of the cylindrical boss 101 is closed. The inner diameter of the cylindrical boss 101 is formed circular in cross section, with the same diameter as the fixation hole 100, and formed coaxially with regard to the fixation hole 100.

A method for mounting the take-up spring unit 8 onto the mechanism cover 97 will be described here.

As illustrated in FIG. 9, firstly, the outer end 91A of the spiral spring 91 is inserted in the rib 92 erected inside the spring case 93, and the spiral spring 91 is housed inside the spring case 93. Then the mounting groove 94C of the spring shaft 94 is fitted to the inner end 91B of the spiral spring 91. Thereafter, as illustrated in FIG. 8 and FIG. 9, a pin 95 is erected approximately at the center position of a bottom face portion of the spring case 93. The pin 95 is inserted into a through hole 94A in the bottom face portion of the spring shaft 94, to rotatably support the spring shaft 94 at the bottom face portion side.

Further, as illustrated in FIG. 8, the engagement pieces 8A projecting radially outward from three locations on the outer circumference portion of the spring case 93 are positioned so as to face end portions on the clockwise direction side in front view of the holding portions 98 of the mechanism cover 97, respectively. Further, as illustrated in FIG. 8 and FIG. 11, a locking gear 107 has a rotational axis portion 119 including a tip portion 119A. The tip portion 119A is configured to protrude from the through hole 99 of the mechanism cover 97 and formed in a rectangular cross-sectional shape. The tip portion 119A has a shaft hole 119B formed along the axial center, and configured to receive the insertion of the pin 95.

Thereafter, as illustrated in FIG. 9 and FIG. 11, the tip portion 119A of the rotational axis portion 119 of the locking gear 107 protrudes from the through hole 99 of the mechanism cover 97, and is fitted inside a cylindrical hole 94B of the spring shaft 94. The cylindrical hole 94B is formed in a rectangular cross-sectional shape. Accordingly, the rotational axis portion 119 of the locking gear 107 is connected relatively non-rotatably with regard to the spring shaft 94. At the same time, as illustrated in FIG. 10, the rib portion 97A erected in the peripheral portion of the mechanism cover 97 is fitted inside the groove portion 93A of the spring case 93.

As illustrated in FIG. 10, the spring case 93 is rotated in the webbing pull-out direction, namely, a counterclockwise direction in front view (in the direction of arrow 96 in FIG. 10), the engagement pieces 8A of the spring case 93 are fitted inside the engagement groove portions 98A of the holding portions 98 of the mechanism cover 97, respectively, and abut on the inner back sides of the engagement groove portions 98A, respectively. Accordingly, the spring case 93 is positioned so as not to shift in radial direction or axial direction with regard to the axial center 99A of the through hole 99 of the mechanism cover 97.

Thereafter, the fixation pin 8D of the spring case 93 in this state is pushed and press-fitted inside the through hole 8C of the fixation portion 8B and the fixation hole 100 of the mechanism cover 97, so that the take-up spring unit 8 is fixed in a relatively non-rotatable manner with regard to the mechanism cover 97. Thus, the take-up spring unit 8 is installed, abutting on the outer side in the rotational axis direction of the take-up drum unit 6 of the mechanism cover 97.

As a result, the rib portion 97A erected in the peripheral portion of the mechanism cover 97 is fitted inside the groove portion 93A of the spring case 93, so that fine particles or dust can be prevented from entering inside the spring case 93. As illustrated in FIG. 11, in a state that the bottom face portion side of the mechanism cover 97 at the spring shaft 94 rotatably abuts on the peripheral portion of the pin 95, a predetermined clearance (for instance, a clearance of approximately 0.3 mm) is formed between the end portion of the spring shaft 94 on the locking unit 9 side, and the peripheral portion on the back side of the through hole 99 formed at the substantially center portion of the mechanism cover 97.

At the same time, a predetermined clearance (for instance, a clearance of approximately 0.3 mm) is also formed between the bottom surface of the cylindrical hole 94B of the spring shaft 94 and the tip portion 119A of the rotational axis portion 119 of the locking gear 107. Accordingly, the spring shaft 94 is provided movably in an axial direction of the axial center 99A by the amount of the predetermined clearance between the spring case 93 and the mechanism cover 97.

[Schematic Configuration of Locking Unit]

Next will be described a schematic configuration of the locking unit 9 composing the lock mechanism that stops the pull-out of the webbing 3 in response to the abrupt pull-out of the webbing 3 or abrupt change in acceleration of a vehicle, by referring to FIG. 8, FIG. 9 and FIG. 11.

As illustrated in FIG. 8, FIG. 9 and FIG. 11, the locking unit 9 includes the mechanism cover 97, the locking gear 107, a locking arm 108, a sensor spring 109, a clutch 111 and a pilot lever 112. In the first embodiment, the members included in the locking unit 9 are made of synthetic resin except the sensor spring 109. Thus, friction coefficient of contact between the members is quite small.

As illustrated in FIG. 8, FIG. 9 and FIG. 11, the mechanism cover 97 has a substantially box-shaped mechanism housing portion 113 having a bottom face portion 104 formed in substantially uniform thickness and circular shape and opened on the side facing the side wall portion 12 of the housing 11, to house the locking gear 107, the clutch 111, and the like. Further, the mechanism cover 97 has a sensor housing portion 114 aligned with the mechanism housing portion 113. The sensor housing portion 114 is formed in a concave shape being rectangular in cross section, at a corner portion (downward left corner in FIG. 9) facing the acceleration sensor 28 attached to the housing 11 with the sensor cover 27.

The sensor holder 51 of the acceleration sensor 28 is configured to be fitted into the sensor housing portion 114 when the mechanism cover 97 is attached to the side wall portion 12 by the nylon latches 9A and locking hooks 9B so that the sensor lever 53 is housed in a vertically movable manner (up/down direction in FIG. 9). Further, an opening portion 115 is opened to allow communication between the mechanism housing portion 113 and the sensor housing portion 114, on substantially middle of the lower end portion of the mechanism housing portion 113 of the mechanism cover 97 (substantially middle on the lower end portion in FIG. 9).

This opening portion 115 is formed to allow vertical movement (in up/down direction in FIG. 9) of the top end portion of a lock claw 53A. The lock claw 53A is projected in upward direction (upward in FIG. 9) from the tip portion of the sensor lever 53 of the acceleration sensor 28. In normal time, the tip portion of the lock claw 53A is positioned in vicinity of a receiving plate portion 148 of the pilot lever 112. When the inertia mass 52 is moved by acceleration exceeding a predetermined value to pivotally move the sensor lever 53 vertically upward, the lock claw 53A abuts on the receiving plate portion 148 of the pilot lever 112 through the opening portion 115 to pivotally move the pilot lever 112 vertically upward.

The mechanism housing portion 113 has a cylindrical supporting boss 117 projected in the center of the approximately circular-shaped bottom face portion 104. A chamfered portion 117A is formed on the whole outer periphery of the tip portion of the supporting boss 117 on the locking gear 107 side, tapered toward the top with an inclination of a predetermined angle (for instance, approximately 30 degrees inclination). Further, the locking gear 107 has a disk-like bottom face portion 115 provided with a cylindrical rotational axis portion 119 projecting from the back side facing the mechanism cover 97, at the center portion thereof. The cylindrical rotational axis portion 119 is inserted into the supporting boss 117, and held slidably and rotatably.

The locking gear 107 has locking gear teeth 107A formed on a circular ring-like projection projecting toward the clutch 111 side on the whole periphery of the disk-like bottom face portion 118. The locking gear teeth 107A is formed on the outer peripheral portion thereof, and configured to engage with the pilot lever 112. The locking gear teeth 107A are formed to engage with an engagement claw portion 112A of the pilot lever 112 only when the locking gear 107 is rotated in the webbing pull-out direction.

As illustrated in FIG. 8, FIG. 9 and FIG. 11, the center portion of the bottom face portion 118 of the locking gear 107 has a through hole, which fittingly receives the shaft portion 102 projecting at the center portion of the end face of the ratchet gear 35 on the locking gear 107 side. Further, a cylindrical pedestal portion 120 is projected at the peripheral portion of the through hole on the mechanism cover 97 side, at a height substantially similar to the height in axial direction of the locking gear teeth 107A. Further, the cylindrical rotational axis portion 119 of the locking gear 107 is co-axially extended from the edge portion of the cylindrical pedestal portion 120 on the mechanism cover 97 side, at an outer diameter smaller than the pedestal portion 120 and substantially the same diameter as the inner diameter of the supporting boss 117, toward the mechanism cover 97 side. Further, end portion of the rotational axis portion 119 on the mechanism cover 97 is closed and a front end portion 119A having a rectangular shape in cross section is co-axially extended.

Accordingly, inside the pedestal portion 120 and the rotational axis portion 119, there is formed a shaft hole portion 120A, circular shaped in cross section. The shaft hole portion 120A is opened at the end face of the locking gear 107 on the ratchet gear 35 side, and fittingly receives the shaft portion 102 projecting at the center portion of the end face of the ratchet gear 35 on the mechanism cover 97 side. Further, on the inner periphery of the shaft hole portion 120A, a plurality of ribs 120B are projected along the axial direction at radially the same height, and configured to abut on the outer periphery of the shaft portion 102 of the ratchet gear 35. Further, of a whole length of the shaft portion 102, an approximately half on the base end portion side is formed in a truncated cone, and the remaining approximately half on the tip portion side is shaped cylindrically, continuing to the truncated cone.

Around the base end portion of the rotational axis portion 119, a circular ring-like rib 121 is co-axially formed, at a height substantially the same as the thickness dimension of a substantially disk-like plate portion 137 of the clutch 111, and an insertion groove 95A is formed thereat. The inner circumferential wall portion of the circular ring-like rib 121 is inclined radially outward at an angle larger than the inclination of the tip portion of the supporting boss 117 (for instance, approximately 45 degrees inclination). Further, the outer diameter of the bottom face portion of the insertion groove formed inside the circular ring-like rib 121 is formed to be substantially the same as the outer diameter of the tip portion of the supporting boss 117.

Still further, the outer diameter of the circular ring-like rib 121 is formed substantially the same as the inner diameter of a through hole 138 formed at the center portion of the plate portion 137 of the clutch 111, and at the same time, smaller than the outer diameter of the pedestal portion 120. Further, a circular ring-like rib 138A is projected along whole periphery of the edge portion of the through hole 138 of the clutch 111 on the locking gear 107 side, at a predetermined height (for instance, approximately 0.5 mm high).

Accordingly, the circular ring-like rib 121 of the locking gear 107 is fittedly inserted into the through hole 138 of the clutch 111 so as to make the circular ring-like rib 138A abut on the outer peripheral side of the base end portion of the rib 121, and then the rotational axis portion 119 is inserted into the supporting boss 117 of the mechanism cover 97. Then the tip portion of the supporting boss 117 is made to abut on the bottom face portion of the insertion groove 121A formed radially inside the circular ring-like rib 121, so that the rotational axis portion 119 projecting from the backside of the locking gear 107 is attached co-axially with regard to the supporting boss 117 for substantially the whole height and is pivotally supported. Further, the circular ring-like rib 121 of the locking gear 107 is inserted into the through hole 138 slidably and rotatably, and the clutch 111 is housed between the locking gear 107 and the mechanism cover 97 in a rotatable manner within a predetermined rotation range.

As illustrated in FIG. 8, FIG. 9 and FIG. 11, the locking gear 107 has four convex portions 122 formed each projecting in a substantially rectangular pipe shape with a circumferentially long cross section, on the end face thereof on the ratchet gear 35 side. The four convex portions 122 are positioned at equal center angles, on a concentric circle with a predetermined distance away (for instance, approximately 14 mm away) from a rotational axis 107B, radially outwardly. Incidentally, a radially outward peripheral portion of one convex portion 122 is partially cut off. On a bottom portion of the locking gear 107, a positioning hole 123 having a predetermined inner diameter (for instance, inner diameter of approximately 3.5 mm) is formed at a substantially center position between one pair of convex portions 122 neighboring in circumferential direction.

Further, the ratchet gear 35 has four through holes 124 each having substantially the same shape as a convex portion 122 of the locking gear 107. The four through holes 124 each have a substantially rectangular shape with a circumferentially long cross section, on an end face portion thereof facing the locking gear 107. The four through holes 124 are positioned at equal center angles, radially outwardly a predetermined distance away (for instance, approximately 14 mm away) from a rotational axis 107B, at positions corresponding to the convex portions 122, respectively.

Further, the end face portion facing the locking gear 107 of the ratchet gear 35 has a positioning pin 125 erected at a position between one pair of through holes 124 neighboring in circumferential direction, the position opposite to the positioning hole 123. The positioning pin 125 has substantially the same outer diameter as the inner diameter of the positioning hole 123. Further, the height of the shaft portion 102 erected on the end face outside in the rotational axis of the ratchet gear 35 is designed to be substantially the same as the depth of the shaft hole portion 120A of the locking gear 107. The depth of the shaft hole portion 120A of the locking gear 107 is configured such that the top of the shaft portion 102 is located on the inner side in rotational axis direction than the top of the tip portion 119A of the rotational axis portion 119.

Accordingly, while the shaft portion 102 of the ratchet gear 35 is inserted into the shaft hole portion 120A of the locking gear 107, the positioning pin 125 of the ratchet gear 35 is fitted into the positioning hole 123 of the locking gear 107, and at the same time, each convex portion 122 of the locking gear 107 is fitted into each through hole 124 of the ratchet gear 35. As a result, with the locking gear 107 abutting on the axially outside end face of the ratchet gear 35, the locking gear 107 is co-axially mounted onto the ratchet gear 35 so as to be relatively non-rotatable. The shaft portion 102 of the ratchet gear 35 is positioned within the supporting boss 117 of the mechanism cover 97 and pivotally supported through the rotational axis portion 119 of the locking gear 107.

Further, through the tip portion 119A of the rotational axis portion 119 of the locking gear 107, the ratchet gear 35 of the take-up drum unit 6 is mounted coaxially and relatively non-rotatably on the spring shaft 94 of the take-up spring unit 8. Accordingly, the take-up drum unit 6 is constantly urged to rotate in the webbing take-up direction, through the take-up spring unit 8.

Further, as illustrated in FIG. 8, FIG. 9 and FIG. 11, a columnar supporting boss 127 is projected on the surface of the bottom face portion 118 of the locking gear 107 on the clutch 111 side. The columnar supporting boss 127 is projected adjacent to the pedestal portion 120, at a height lower than the locking gear teeth 107A. The locking arm 108 made of synthetic resin is formed into approximately an arch shape so as to surround the pedestal portion 120. In the locking arm 108, a through hole 128 is formed in the edge portion at the approximately center portion in longitudinal direction on the pedestal portion 120 side, and the supporting boss 127 is rotatably inserted into the through hole 128 so that the locking arm 108 is rotatably supported.

The bottom face portion 118 of the locking gear 107 has an elastic engagement piece 129 projected at a position in vicinity of the radially outside of the supporting boss 127, toward the mechanism cover 97. The elastic engagement piece 129 is reverse-L shaped in cross section. This elastic engagement piece 129 is inserted into a window portion 130 formed next to the through hole 128 of the locking arm 108, and engaged elastically and rotatably around the axis of the pedestal portion 120. The window portion 130 is formed in an approximately fan-like shape and has a stepped portion.

One end of the sensor spring 109 is coupled with a spring supporting pin 132 of the locking arm 108. At the same time, the other end of the sensor spring 109 is coupled with a not-shown spring supporting pin arranged at periphery of the pedestal portion 120 of the locking gear 107 so as to erect toward the webbing-pull-out direction which is orthogonal to the axis center of the pedestal portion 120. Thereby, the locking arm 108 is with a predetermined load so as to rotate toward the webbing-pull-out direction side (counterclockwise direction in FIG. 8) centering the axis of the supporting boss 127. Further, the locking arm 108 has an engagement claw 135 configured to get engaged with a clutch gear 134 of the clutch 111 and at an edge portion on the engagement claw 135 side, abuts on a not-shown stopper which projects radially outward from the pedestal portion 120 of the locking gear 107.

Meanwhile, when the locking arm 108 is rotated in webbing take-up direction (clockwise direction in FIG. 8) against the urging force of the sensor spring 109 and is engaged with the clutch gear 134, an edge portion opposite to the engagement portion of the engagement claw 135 forms a predetermined clearance (for instance, approximately 0.3 mm clearance) with a rotation restrictor 141 formed at the bottom face portion 118 of the locking gear 107. The rotation restrictor 141 is spindle-shaped in cross section.

Further, as illustrated in FIG. 8, FIG. 9 and FIG. 11, the clutch 111 is housed in a rotatable manner within a predetermined rotation range in the mechanism housing portion 113, while being held between the locking gear 107 and the mechanism cover 97. On the locking gear 107 side of the clutch 111, there is provided a circular ring-like rib portion 139. The circular ring-like rib portion 139 is co-axially formed with regard to the through hole 138, and has a slightly smaller outer diameter than the inner periphery of the circular ring-like projection of the locking gear 107 having the locking gear teeth 107A on the outer periphery portion thereof.

The rib portion 139 has the clutch gear 134 configured to engage with the engagement claw 135 of the locking arm 108, on the inner periphery thereof. The clutch gear 134 is to engage with the engagement claw 135 of the locking arm 108 only when the locking gear 107 is rotated in the webbing pull-out direction around the axis of the through hole 138.

Further, a circular ring-like outer rib portion 143 is formed at the outer peripheral portion of the substantially disk-like plate portion 137 of the clutch 111, so as to surround the rib portion 139. Further, along roughly whole periphery of the edge portion of the outer rib portion 143 on the ratchet gear 35 side, a flange portion 144 is formed, extending radially outward with respect to the central axis of the through hole 138, being slightly slanted toward the ratchet gear 35.

The outer rib portion 143 has a guiding block portion 145 extended on a corner portion opposing the pawl 23 (lower left corner portion in FIG. 8). The guiding block portion 145 is extended from the outer periphery of the outer rib portion 143 downward in vertical direction (downward in FIG. 8). The guiding block portion 145 has a long guiding hole 142 into which the guiding pin 42 formed on the side face of the tip portion including engagement teeth 23A, 23B of the pawl 23 is movably engaged from the ratchet gear 35 side.

The guiding hole 142 is formed at a corner portion opposing to the pawl 23 of the clutch 111 into a long groove-like shape substantially parallel to the webbing pull-out direction (vertical direction in FIG. 9). Accordingly, when the clutch 111 is rotated in the webbing pull-out direction (counterclockwise direction in FIG. 9), the guiding pin 42 is moved along the guiding hole 142, and the engagement teeth 23A, 23B of the pawl 23 are rotated so as to come closer to the ratchet gear portion 35A of the ratchet gear 35.

Further, the pawl 23 is rotatably urged in a direction away from the ratchet gear 35 by the twisted coil spring 26 while the guiding pin 42 of the pawl 23 movably getting engaged at the guiding hole 142 urges the clutch 111. The clutch 111 is urged by this urging force so as to achieve a rotated state where the guiding pin 42 of the pawl 23 abuts on the edge portion of the guiding hole 142 (lower edge portion of the guiding hole 142 in FIG. 9) located farthest away from the ratchet gear 35 in radial direction of the rotation of the clutch 111, so that the clutch 111 is rotatably urged in the direction opposite to the webbing pull-out direction. Thus, a clutch urging mechanism is configured by the pawl 23 and the twisted coil spring 26.

At the same time, as the guiding pin 42 of the pawl 23 is made to abut on the edge portion of the guiding hole 142 (lower edge portion of the guiding hole 142 in FIG. 9) located farthest away from the ratchet gear 35 in the radial direction of the rotation of the clutch 111 to regulate the rotation of the pawl 23 in normal occasion, the pawl 23 is held to be positioned in vicinity of the rear side of the notch portion 38 formed at the side wall portion 12.

Further, a plate-like extending portion 146 extends radially outward in approximately arc-like shape from the flange portion 144, on the lower edge portion of the outer rib portion 143 of the clutch 111 (lower edge portion in FIG. 9). The extending portion 146 extends from the end face portion of the guiding block portion 145 on the ratchet gear 35 side, to the portion facing the upper portion of the sensor housing portion 144 (upper direction in FIG. 9). Further, as illustrated in FIG. 8 and FIG. 9, in vicinity of the edge portion opposite to the guiding block portion 145, the extending portion 146 has a mounting boss 149 on the mechanism cover 97 side at substantially the same height as the outer rib portion 143. The mounting boss 149 is thin columnar shaped and to be inserted into a cylindrical sleeve portion 147 of the pilot lever 112.

[Operation of Lock Mechanism]

Next, there will be described on the operation of the lock mechanism which stops the take-up drum 6 from rotating in the webbing-pull-out direction. Here, the lock mechanism operates two types of locking mechanisms: a "webbing-sensitive lock mechanism" which is activated in response to sudden pull out of the webbing 3; and a "vehicle-body-sensitive lock mechanism" which is activated in response to acceleration caused by vehicle rocking or tilting.

[Description of Operation in Webbing-Sensitive Lock Mechanism]

First, the locking operation of the "webbing-sensitive lock mechanism" will be described. The locking arm 108 is rotatably supported by the supporting boss 127 of the locking gear 107, so that when the acceleration to pull out the webbing 3 exceeds a predetermined acceleration (for instance, approximately 2.0 G, regarding 1 G≈9.8 m/s$^2$), an inertial delay is generated in the locking arm 108, to the rotation of the locking gear 107 in the webbing pull-out direction.

As a result, the locking arm 108 abutting on the stopper of the locking gear 107 maintains the initial position against the urging force of the sensor spring 109, rotates centering the supporting boss 127 with reference to the locking gear 107, to the vicinity of the rotation restrictor 141. Accordingly, the engagement claw 135 of the locking arm 108 is rotated radially outward with regard to the rotational axis of the locking gear 107, and engaged with the clutch gear 134 of the clutch 111.

When the pull out of the webbing 3 is continued exceeding the predetermined acceleration, the locking gear 107 further rotates in the webbing pull-out direction, so that the engagement claw 135 of the locking arm 108 is rotated in the webbing pull-out direction while being engaged with clutch gear 134.

Accordingly, as the clutch gear 134 is rotated in the webbing pull-out direction by the locking arm 108, the clutch 111 is rotated in the webbing pull-out direction around the axial center of the rib 121 of the locking gear 107, namely, around the axial center of the rotational axis portion 119, against the urging force of the guiding pin 42 of the pawl 23 rotatably urged by the twisted coil spring 26 in the direction away from the lock gear 35.

If the pull out of the webbing 3 exceeding the predetermined acceleration is herewith further continued, the clutch 111 is further rotated in the webbing pull-out direction against the urging force of the guiding pin 42 of the pawl 23 rotatably urged by the twisted coil spring 26 in the direction away from the ratchet gear 35. Accordingly, the guiding pin 42 of the pawl 23 is guided by the guiding hole 142 of the clutch 111, and the pawl 23 is engaged with ratchet gear 35, against the urging force of the twisted coil spring 26. Accordingly, the rotation of the take-up drum unit 6 is locked, and thus the pull out of the webbing 3 is locked.

[Description of Operation in Vehicle-Body-Sensitive Lock Mechanism]

Next, the locking operation of the "vehicle-body-sensitive lock mechanism" will be described. The spherical inertia mass 52 of the acceleration sensor 28 is placed on a bowl-like bottom face portion of the sensor holder 51, and moves on the bottom face portion of the sensor holder 51 to pivotally move the sensor lever 53 upward in vertical direction, if the acceleration due to rocking or tilting of the vehicle body exceeds the predetermined acceleration (for instance, approximately 2.0 G).

Therefore, the lock claw 53A of the sensor lever 53 makes contact with the receiving plate portion 148 of the pilot lever 112 rotatably attached to the mounting boss 149 formed at the extending portion 146 of the clutch 111, to rotate the pilot lever 112 upward in vertical direction. Accordingly, the pilot lever 112 is rotated clockwise around the axial center of the mounting boss 149, and the engagement claw portion 112A of the pilot lever 112 gets engaged with the locking gear teeth 107A formed on outer periphery of the locking gear 107.

Then, when the webbing 3 is pulled out in a state that the pilot lever 112 is engaged with the locking gear teeth 107A of the locking gear 107, the locking gear 107 is rotated in the webbing pull-out direction. Further, the rotation of the locking gear 107 in the webbing pull-out direction is transmitted to the clutch 111 through the pilot lever 112, the mounting boss 149 and the like.

Accordingly, in response to the rotation of the locking gear 107 in the webbing pull-out direction, the clutch 111 is rotated around the axial center of the rib 121 of the locking gear 107, namely, around the axial center of the rotational axis portion 119 in the webbing pull-out direction, against the urging force by the guiding pin 42 of the pawl 23 rotatably urged by the twisted coil spring 26 in the direction away from the ratchet gear 35.

Accordingly, if the webbing 3 is continuously pulled out, the clutch 111 is further rotated in the webbing pull-out direction, against the urging force by the guiding pin 42 of the pawl 23 rotatably urged by the twisted coil spring 26 in the direction away from the lock gear 35. Thereby, the guiding pin 42 of the pawl 23 is guided by the guiding hole 142 of the clutch 111, and each of the engagement tooth 23A and 23B of the pawl 23 is engaged with a ratchet gear portion 35A of the ratchet gear 35. Thus, the rotation of the take-up drum unit 6 is locked, and thus the pull out of the webbing 3 is locked.

[Schematic Configuration of Pretensioner Unit]

Figure 12:
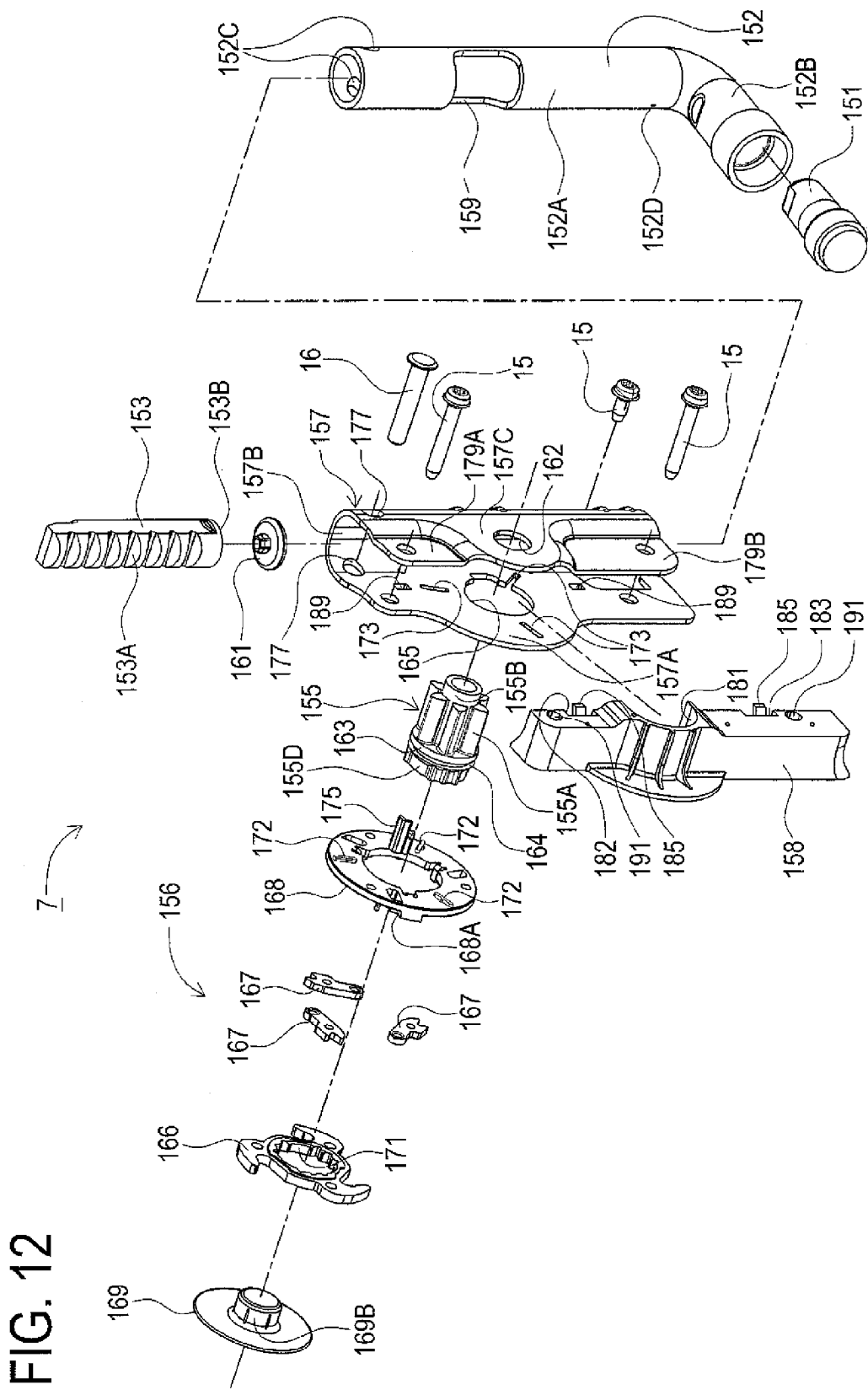
FIG. 12 is an exploded perspective view of a pretensioner unit.
Figure 13:
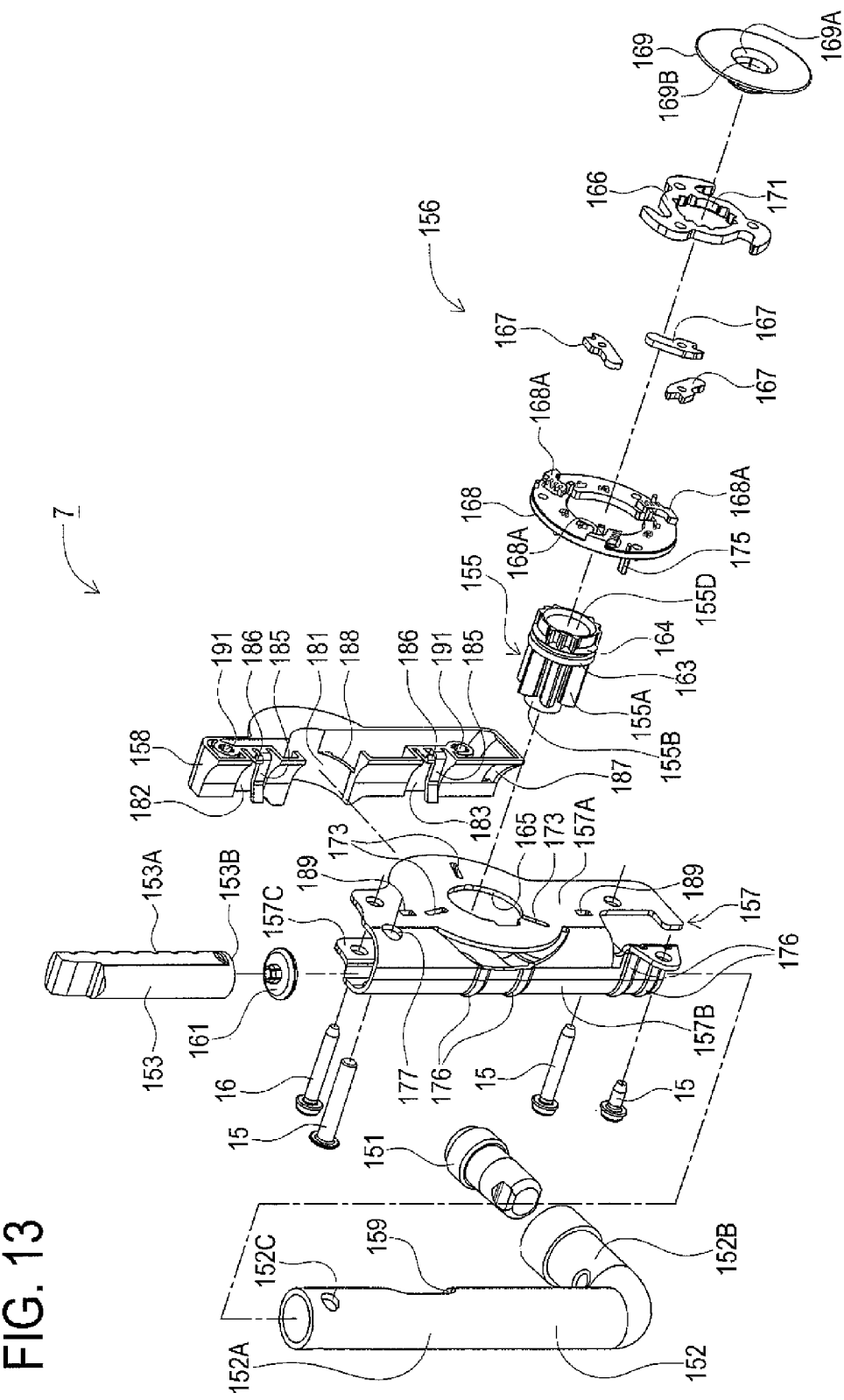
FIG. 13 is another exploded perspective view of a pretensioner unit.
Figure 14:
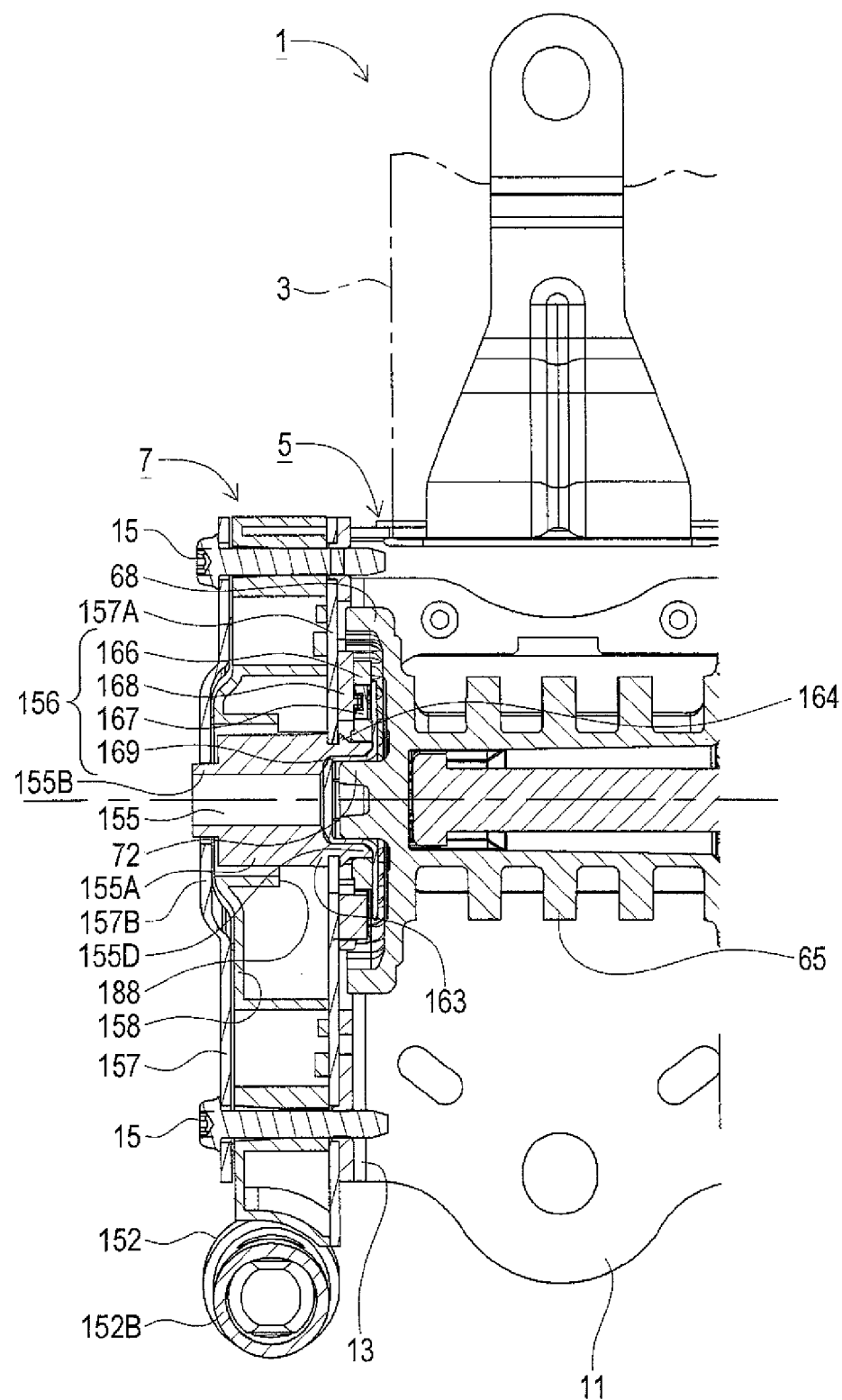
FIG. 14 is an enlarged cross sectional view taken along a line indicated by arrows X1-X1 in FIG. 2 and seen in the direction of the arrows.
Figure 15:
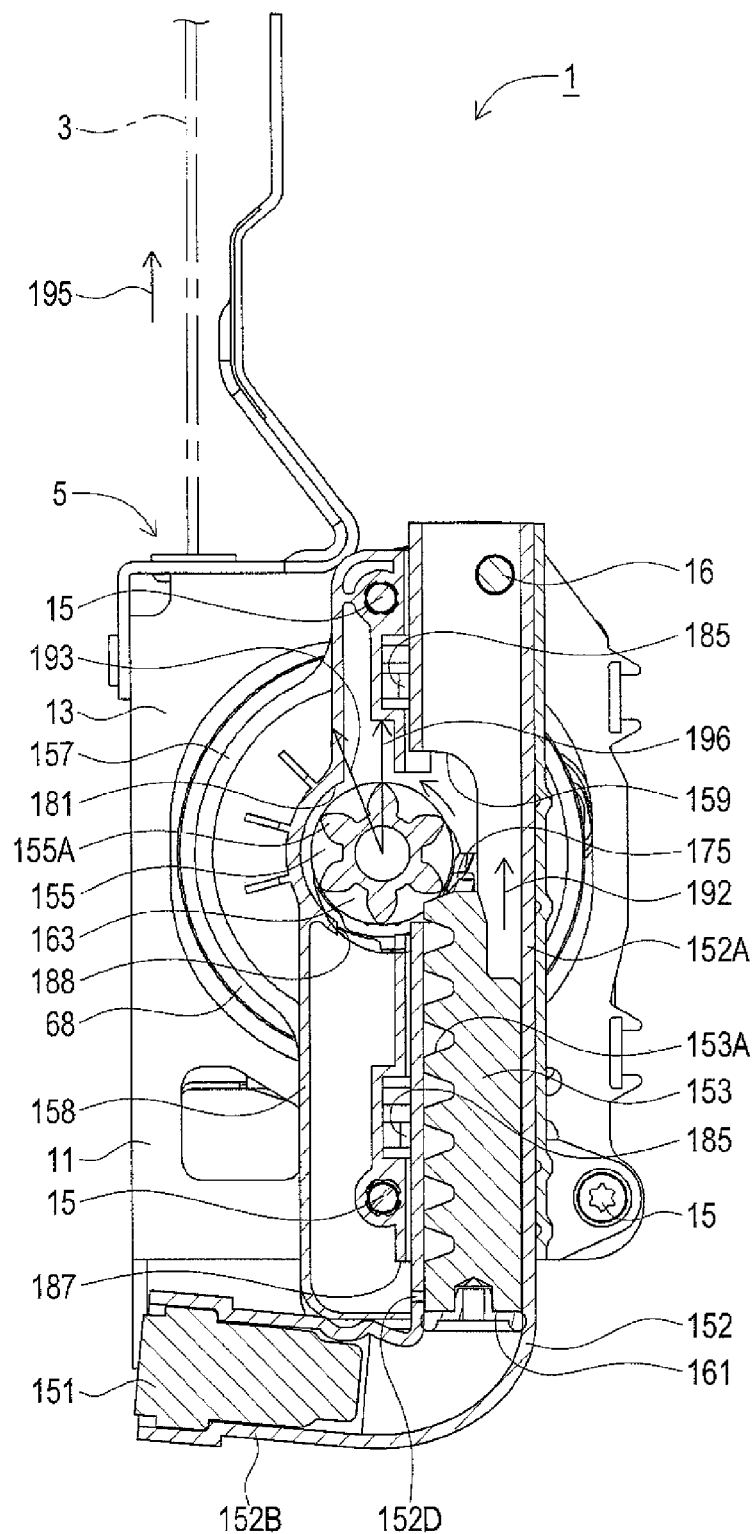
FIG. 15 is a view for illustrating an internal configuration of the pretensioner unit.
Figure 16:
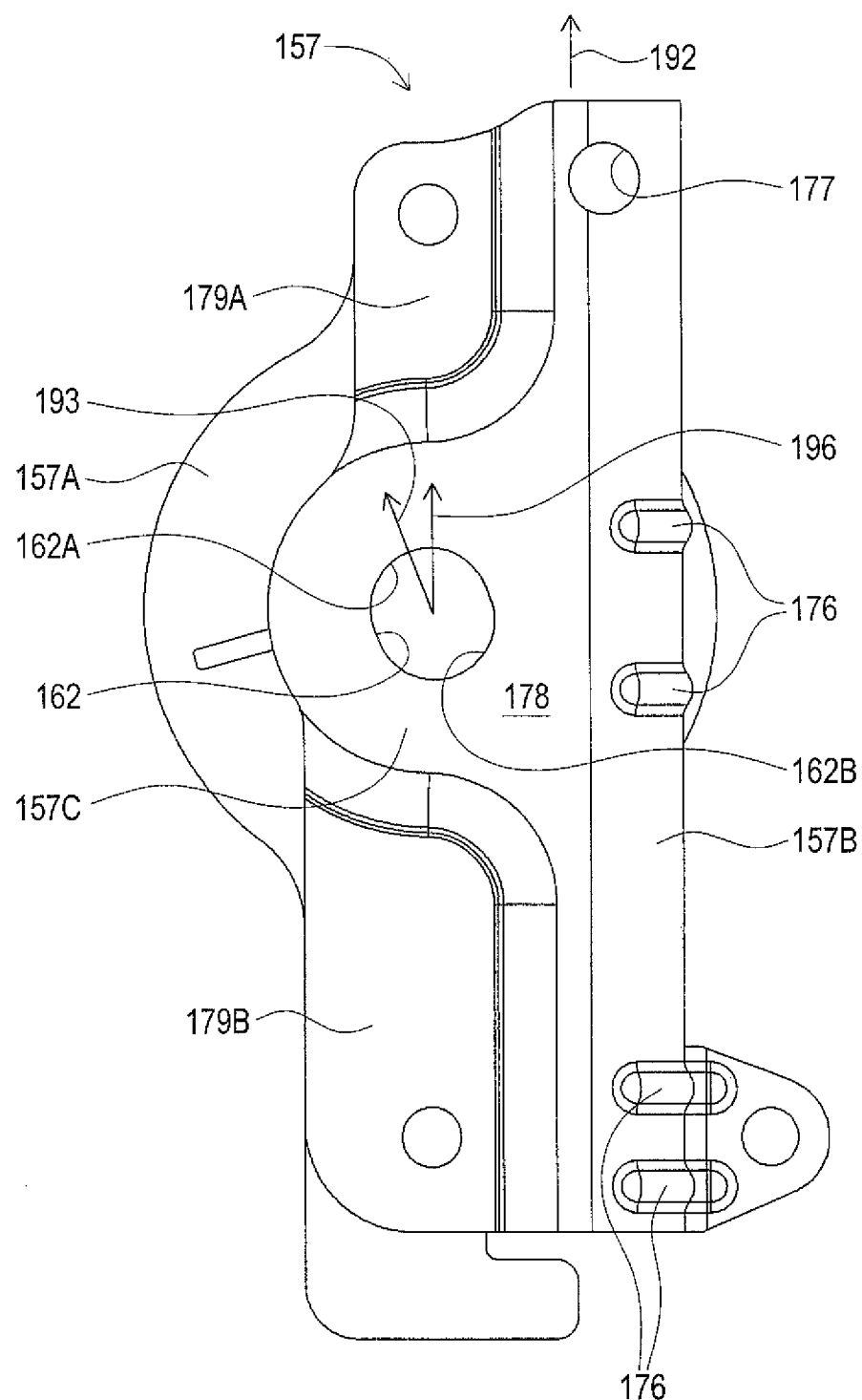
FIG. 16 is a side view of a holding plate.
Figure 17:
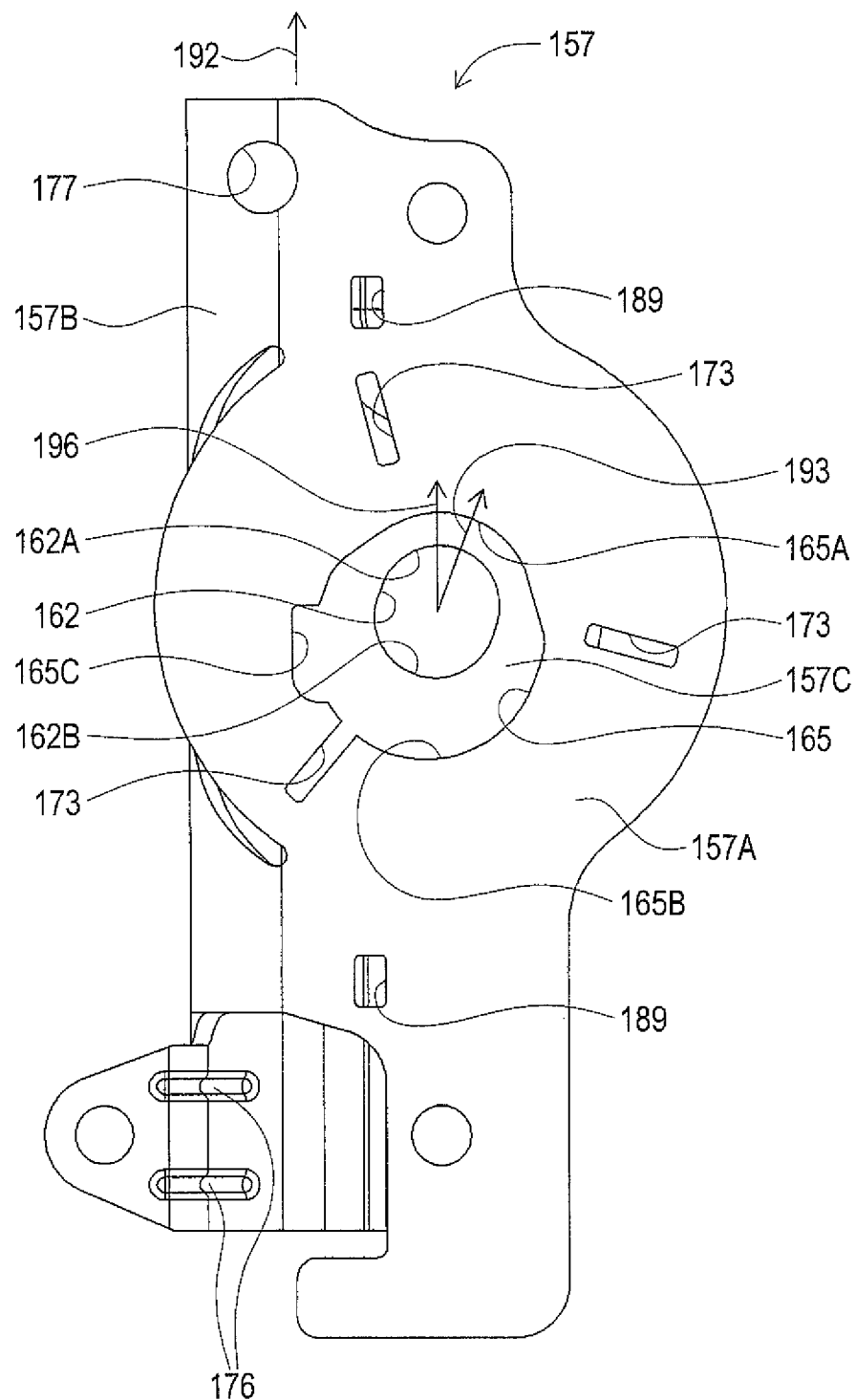
FIG. 17 is another side view of the holding plate.
Figure 18:
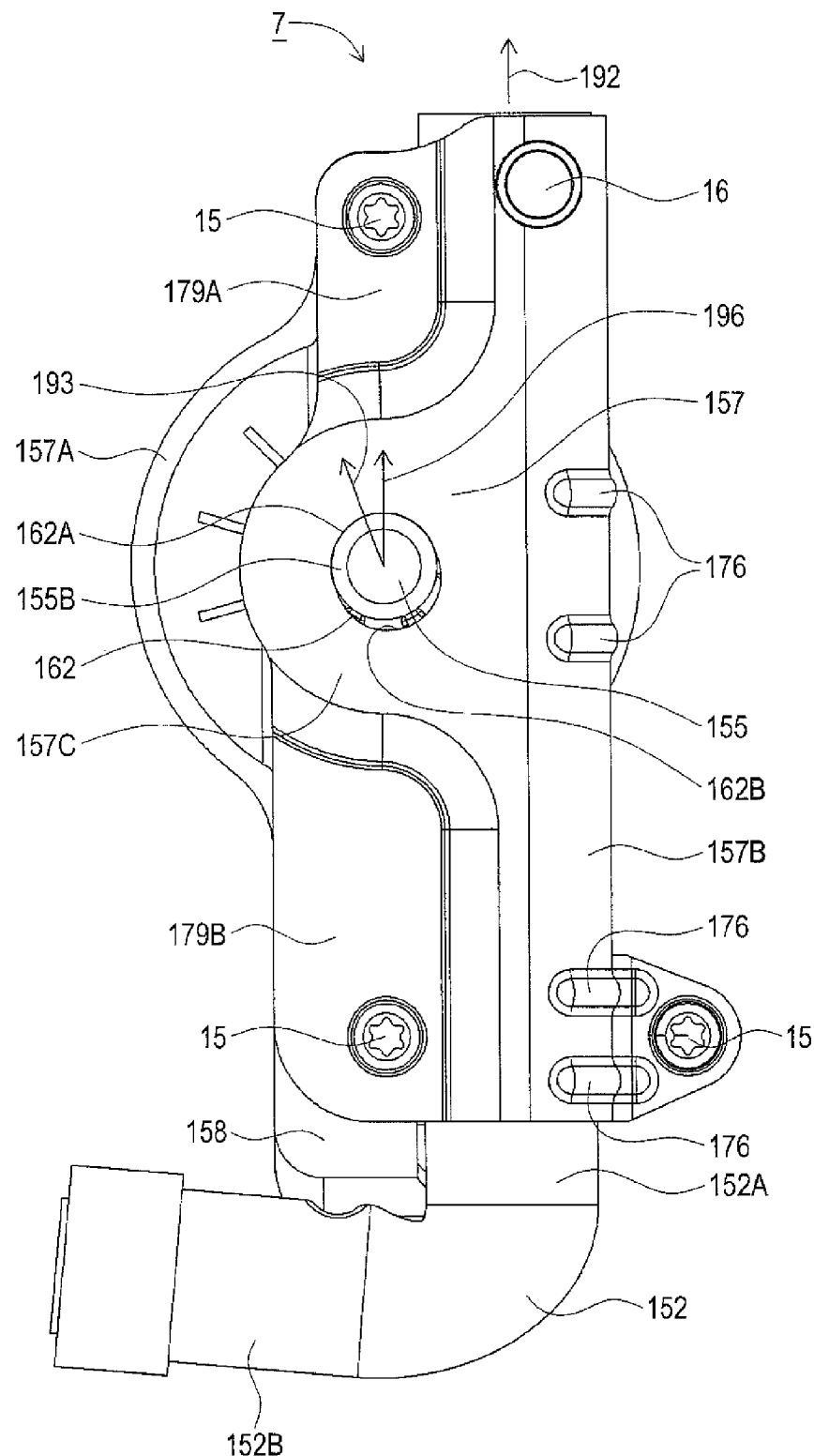
FIG. 18 is a side view for illustrating a pinion gear body in a supported state.
Figure 19:
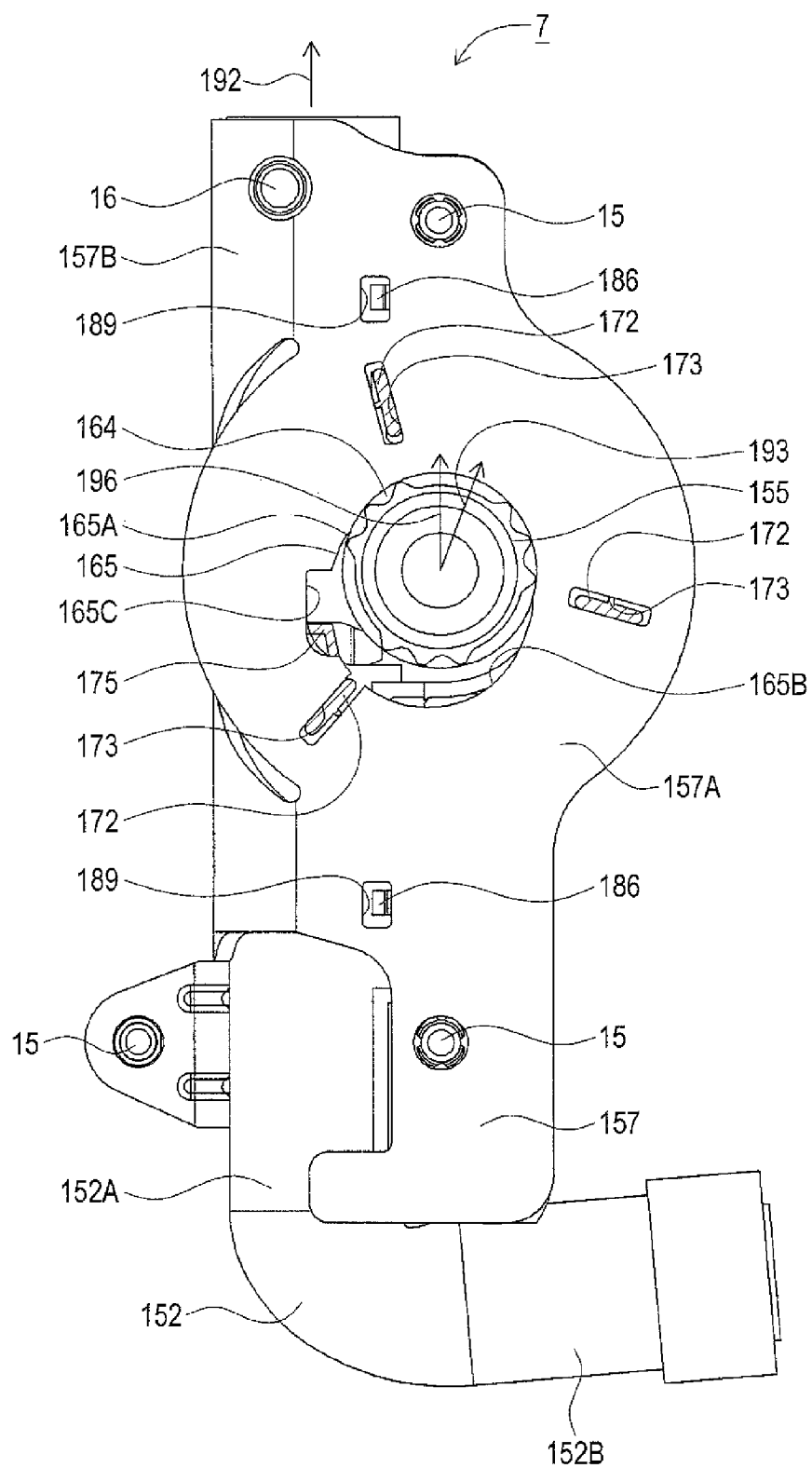
FIG. 19 is another side view for illustrating the pinion gear body in the supported state.
Figure 20:
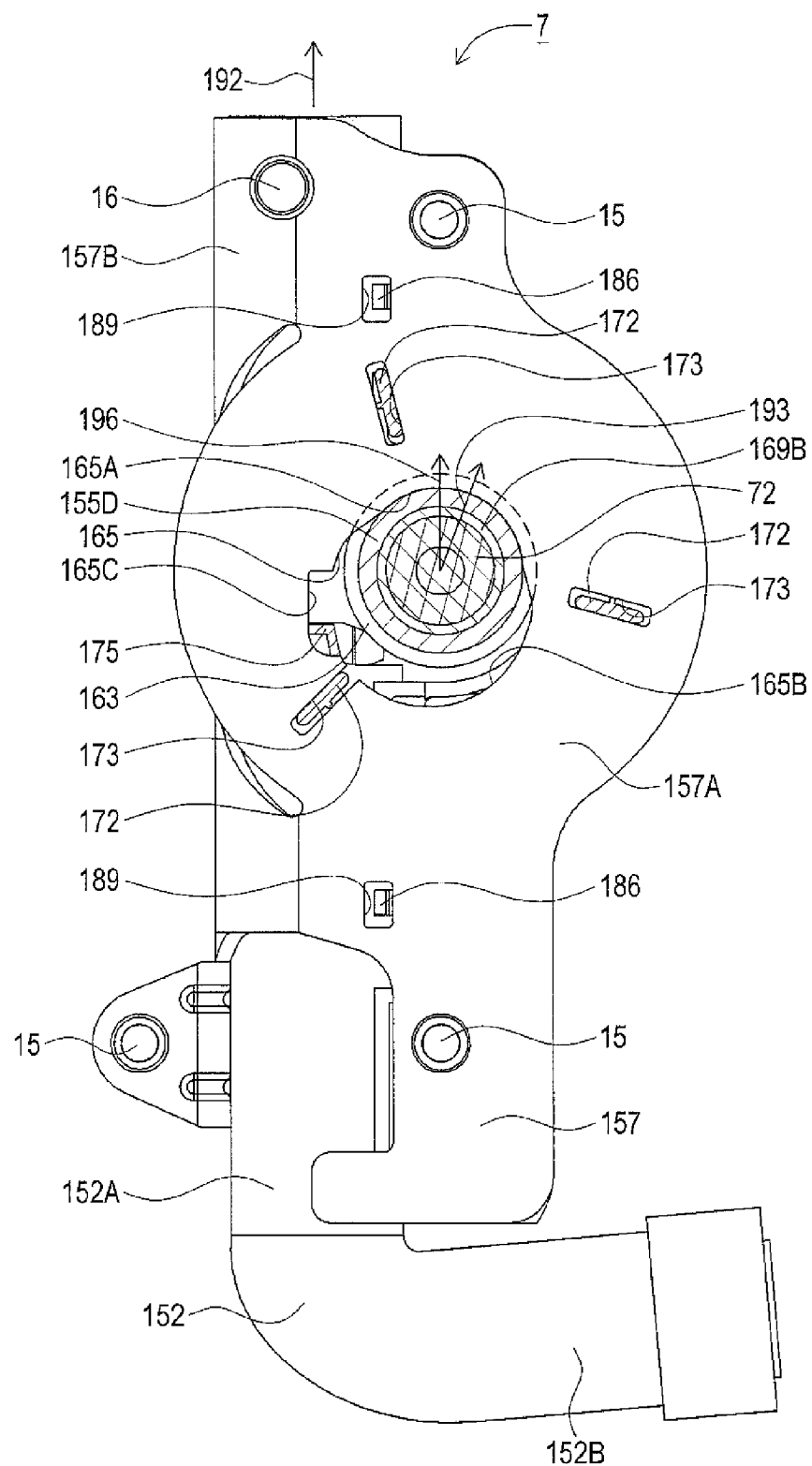
FIG. 20 is still another side view for illustrating the pinion gear body in the supported state.

Next, a schematic configuration of the pretensioner unit 7 will be described referring to FIG. 3, FIG. 4 and FIG. 12 through FIG. 20. FIG. 12 and FIG. 13 each are an exploded perspective view of the pretensioner unit 7. FIG. 14 is an enlarged cross sectional view taken along a line indicated by arrows X1-X1 in FIG. 2 and seen in the direction of the arrows. FIG. 15 is a view for illustrating an internal configuration of the pretensioner unit 7. FIG. 16 and FIG. 17 each are a side view of the holding plate 157. FIG. 18 and FIG. 19 each are a side view for illustrating a pinion gear 155 in a supported state. FIG. 20 is a partial cutaway sectional view for illustrating the pinion gear 155 of which boss portion 155D abuts on a semicircular arc hole portion 165A of an inner shaft receiving hole 165.

The pretensioner unit 7 is configured to securely restrain a vehicle occupant, through rotating the take-up drum 65 in the webbing take-up direction to remove the slack of the webbing 3, in an emergency such as vehicle collision.

As shown in FIG. 3, FIG. 4 and FIG. 12 through FIG. 15, the pretensioner unit 7 is comprised of a gas generating member 151, a pipe cylinder 152, a piston 153, the pinion gear 155, a clutch mechanism 156, a holding plate 157 and a base block 158.

This gas generating member 151 includes a gas generating agent such as explosive powder which is ignited in response to an ignition signal transmitted from a control portion, which is not shown, generating gas as a result of combustion of the gas generating agent.

The pipe cylinder 152 is formed as a substantially L shaped cylindrical member, with a gas introducing portion 152E connected on one end of a piston guiding cylindrical portion 152A having a linear shape. The gas introducing portion 152B is configured to house the gas generating member 151. Accordingly, the gas generated at the gas generating member 151 is introduced inside the piston guiding cylindrical portion 152A from the gas introducing portion 152B. Further, an opening portion 159 is formed in the middle portion in longitudinal direction on one side portion of the piston guiding cylindrical portion 152A, and part of pinion gear teeth 155A of the pinion gear 155 is arranged therein.

The pipe cylinder 152 is inserted toward a back side of the holding plate 157 having a substantially U-shape in cross section from its lower side so that the pipe cylinder 152 is elastically held at the back side of the holding plate 157 by a base plate portion 157A to be fixed to the side wall portion 13 of the housing 11, a back plate portion 157B at the back side, having a semicircular arc shape in cross section, and a cover plate portion 157C at the outer side. The pipe cylinder 152 is fixedly attached on the outer surface of the side wall portion 13 by the screws 15 in a state of being pressed toward back side of the holding plate 157 by the base block 158 which is inserted from an open side of the holding plate 157 and positioned near the pipe cylinder 152 at the back side of the holding plate 157.

Further, a pair of through holes 152C is formed on the upper end portion of the piston guiding cylindrical portion 152A, arranged facing each other. The stopper pin 16 is inserted into the pair of through holes 152C. The stopper pin 16 attaches the pretensioner unit 7 on the side wall portion 13, and serves as a stopper for the piston 153, and also as a stopper and a rotation preventer for the pipe cylinder 152.

The piston 153 is made of a steel material or the like and has an overall lengthy shape, with a substantially rectangular shape in cross section that enables insertion thereof from the top end portion of the piston guiding cylindrical portion 152A. On a surface of the pinion gear 155 side of the piston 153, there is formed a rack 153A configured to engage with the pinion gear teeth 155A of the pinion gear 155. Further, on the end face of the gas generating member 151 side of the piston 153 is formed into a circular end face 153B corresponding to the cross sectional shape of the piston guiding cylindrical portion 152A. A sealing plate 161 formed of a rubber material or the like is attached on the circular end face 153B.

Before activation of the pretensioner unit 7, namely in a normal waiting state in which the gas is not generated by the gas generating member 151, the piston 153 is inserted toward a back side of the piston guiding cylindrical portion 152A and settled at a position which makes the rack 153A disengage from the pinion gear teeth 155A. At the back side end portion of the piston guiding cylindrical portion 152A, a gas releasing hole 152D is formed so as to face the bottom end portion of the base block 158, the gas releasing hole 152D in a normal state being sealed by a gas generating member 151 side outer end surface portion of the piston 153.

The pinion gear 155 is a columnar member made of a steel material or the like. The pinion gear 155 is provided with the pinion gear teeth 155A on an outer peripheral portion thereof engageable with the rack 153A. The pinion gear 155 also has a support portion 155B formed in a cylindrical shape, extending outward from the cover plate portion 157C side end of the pinion gear teeth 155A with reference to rotation axis direction. The support portion 155B has outer diameter the same as diameter of a circle consisting of tooth bottom of the pinion gear teeth 155A so that the support portion 155B is rotatably fitted into an outer shaft receiving hole 162 formed in a substantially center part of the cover plate portion 157C. The support portion 155B has length to slightly project outward from the outer shaft receiving hole 162 when fitted into the outer shaft receiving hole 162.

At a base plate portion 157A side end portion of the pinion gear teeth 155A with reference to the axis center direction thereof, there is formed a flange portion 163 in a flange-like shape having outer diameter slightly larger than tooth tip diameter of the pinion gear teeth 155A. A boss portion 155D is formed so as to project from the flange portion 163 toward the take-up drum unit 6 with reference to the axis center direction thereof, the boss portion 155D having a substantially cylindrical shape of which outer diameter is slightly smaller than outer diameter of the flange portion 163. The boss portion 155D and the flange portion 163 form a step having a predetermined height (height roughly the same as plate thickness of the base plate portion 157A, for instance).

At the base end portion of the boss portion 155D, there is provided a flange portion 164 in a flange-like shape having outer diameter roughly the same as that of the flange portion 163 extending radially outward along entire outer peripheral surface of the boss portion 155D so as to form a clearance roughly the same as plate thickness of the base plate portion 157A with reference to the flange portion 163. On the take-up drum unit 6 side outer peripheral surface of the boss portion 155D over the flange portion 164 with reference to the axis center of the take-up drum unit 6, three sets of three splines are formed thereon at equal center angle of 120 degrees. The sets of three splines form outer diameter slightly smaller than outer diameter of the flange portion 164.

As shown in FIG. 12, FIG. 13, FIG. 16 and FIG. 17, of the holding plate 157 substantially U-shaped in cross section, the long-plate-shaped base plate portion 157A has a substantially round shaped area at longitudinal center portion thereof so as to almost cover the flange portion 68 of the take-up drum 65. At the longitudinal center portion of the base plate portion 157A, there is formed an inner shaft receiving hole 165 which allows insertion of the pinion gear teeth 155A on the pinion gear 155 and the flange portion 163.

As shown in FIG. 17, at a substantially upper half part of the inner shaft receiving hole 165, there is formed a semicircular arc hole portion 165A of which inner diameter is roughly the same as outer diameter of the boss portion 155D of the pinion gear 155. That is, the inner shaft receiving hole 165 includes the semicircular arc hole portion 165A at its specific side to which the piston 153 moves upon activation of the pretensioner unit 7. Further, center axis of the semicircular arc hole portion 165A is positioned on the rotation axis of the take-up drum unit 6 when the pretensioner unit 7 is attached on the side wall portion 13 of the housing 11.

At substantially lower half part extending below the semicircular arc hole portion 165A in the inner shaft receiving hole 165, there is formed an enlarged hole portion 165B in a substantially semicircular arc shape of which inner diameter is larger than outer diameter of the pinion gear teeth 155A and that of the flange portion 163 both formed on the pinion gear 155. Further, at a back plate portion 157B side edge of the enlarged hole portion 165B, there is formed a cutout portion 165C in vertically long rectangular shaped so as to allow insertion of a piston positioning pin 175 arranged upright on the pawl guide 168 of the clutch mechanism 156, to be described later.

As shown in FIG. 12, FIG. 13, FIG. 16 and FIG. 17, the back plate portion 157B having a substantially U-shape in cross section is formed so as to continuously extend from the base plate portion 157A side edge portion. The back plate portion 157B has groove of which width is roughly the same as outer diameter of the piston guiding cylindrical portion 152A of the pipe cylinder 152. Further, the corner on the base plate portion 157A continuously extending to the lower end portion of the back plate portion 157B is cut out toward the back plate portion 157B and bent outward at right angle so as to be coplanar with the base plate portion 157A, whereat a through hole for allowing insertion of the screw 15 is formed.

At each of the longitudinal center and lower end parts of the back plate portion 157B, there are formed a pair of reinforcement grooves 176 depressed outward so as to be orthogonal to the longitudinal direction. Further, the back plate portion 157B has side surface portions facing each other. At the upper parts of the side surface portions at which a pair of through holes 152C of the pipe cylinder 152 are positioned, there are formed a pair of through holes 177 so as to allow insertion of the stopper pin 16 via the pair of through holes 152C.

The cover plate portion 157C is formed so as to continuously extend from a side edge portion, outside in the rotational axis direction of the take-up drum 6, of the back plate portion 157B and present in parallel with the base plate portion 157A. The cover plate portion 157C has a long rectangular shape in front view and width roughly the same as width at the upper and lower end portions of the base plate portion 157A. In the center part of the cover plate portion 157C, there is formed an outer shaft receiving hole 162 so as to allow insertion of the support portion 155B of the pinion gear 155.

As shown in FIG. 16 and FIG. 17, on the substantially upper half part of the outer shaft receiving hole 162, there is formed a semicircular arc hole portion 162A having a substantially semicircular arc shape of which inner diameter is roughly the same as outer diameter of the support portion 155B of the pinion gear 155. That is, the semicircular arc hole portion 162A of the outer shaft receiving hole 162 is formed at a side to which the piston 153 moves when the pretensioner unit 7 is activated. Further, center axis of the semicircular arc hole portion 162A is positioned on the center axis of the semicircular arc hole portion 165A of the inner shaft receiving hole 165. Accordingly, the center axis of the semicircular arc hole portion 162A is positioned co-axially with rotation axis of the take-up drum unit 6 when the pretensioner unit 7 is attached on the side wall portion 13 of the housing 11.

Further, at a substantially lower half part of the outer shaft receiving hole 162 connected with the semicircular arc hole portion 162A, there is formed an enlarged hole portion 162B in a substantially semi-elliptical shape obtained by enlarging radially outward by predetermined distance (3 mm, for instance) a semicircle having inner diameter roughly the same as outer diameter of the support portion 155B of the pinion gear 155.

Further, at the center part of the cover plate portion 157C facing the inner shaft receiving hole 165, there is formed a plate portion 178 in a substantially semicircular shape of which diameter is larger than outer diameter of the pinion gear teeth 155A on the pinion gear 155. Further, at the upper part and lower part of the plate portion 178, there are respectively formed concave portions 179A and 179B depressing inwardly with respect to rotation axis of the pinion gear 155 by predetermined depth so as press the pinion gear 155 side outer peripheral surface of the piston guiding cylindrical portion 152A which is inserted toward the back plate portion 157B of the holding plate 157.

The concave portions 179A and 179B each are configured to depress inwardly with respect to rotation axis direction of the pinion gear 155 by predetermined depth at full width extending from the peripheral edge portion of the plate portion 178 to the upper and lower end portions thereof. The concave portions 179A and 179B each are formed in a plate like shape of which bottom face portion is parallel to the base plate portion 157A.

Accordingly, as shown in FIG. 18 and FIG. 19, by inserting the piston guiding cylindrical portion 152A in the clearance surrounded by the concave portions 179A and 179B and the back plate portion 157B of the holding plate 157, the position of the pipe cylinder 152 is set with reference to direction perpendicular to longitudinal direction of the piston guiding cylindrical portion 152A. Further, each of the concave portions 179A and 179B is provided stepwise with respect to level of the plate portion 178 along periphery of the substantially semicircular shaped plate portion 178 which has the outer shaft receiving hole 162 at the center part thereof. Thereby, each of the concave portions 179A and 179B serves as reinforcement member for avoiding deformation of the outer shaft receiving hole 162 and its vicinity when the pretensioner unit 7 is activated.

Regarding attachment of the pinion gear 155 to the holding plate 157, as shown in FIG. 12 through FIG. 14, FIG. 18 and FIG. 19, the pinion gear teeth 155A and the flange portion 163 are inserted in the enlarged hole portion 165B of the inner shaft receiving hole 165 formed in the base plate portion 157A of the holding plate 157. After that, the support portion 155B is inserted in the enlarged hole portion 162B of the outer shaft receiving hole 162 formed in the cover plate portion 157C.

After that, the outer peripheral surface of the support portion 155B of the pinion gear 155 is made to abut on the semicircular arc hole portion 162A of the outer shaft receiving hole 162 while the semicircular arc hole portion 165A of the inner shaft receiving hole 165 is inserted between the flange portion 163 and the flange portion 164 of the pinion gear 155 so as to make the semicircular arc hole portion 165A abut on the outer peripheral surface of the boss portion 155D. Thereby, the pinion gear 155 is rotatably placed between the base plate portion 157A and the cover plate portion 157C of the holding plate 157 in a state of being set at position which prevents the pinion gear 155 from moving in rotation axis direction.

As shown in FIG. 12 and FIG. 13, the clutch mechanism 156 includes: a pawl base 166 made of a steel material or the like; three clutch pawls 167 made of a steel material or the like; a substantially ring-like pawl guide 168 made of a synthetic resin such as polyacetal and made to abut on the base plate portion 157A side of the pawl base 166; and a substantially ring-like bearing 169 made of a synthetic resin such as polyacetal, made to abut on the take-up drum 65 side of the pawl base 166 and configured to hold the pawl base 166 and the clutch pawls 167 between the baring 169 and the pawl guide 168.

A center portion of the pawl base 166 has an engaging hole 171 having three sets of three spline grooves at center angle of approximately 120 degrees so that spline is press-fitted for fitting of the boss portion 155D of the pinion gear 155. Regarding the pinion gear 155 inserted between the outer shaft receiving hole 162 and the inner shaft receiving hole 165 of the holding plate 157, the boss portion 155D projecting from the inner shaft receiving hole 165 is press-fitted in the engaging hole 171 of the pawl base 166 holding the pawl guide 168 therebetween. Thereby, the pawl base 166 is attached in a relatively non-rotatable manner with reference to the pinion gear 155. That is, the pawl base 166 and the pinion gear 155 are configured to rotate integrally.

At the center part of the bearing 169, there is formed a through hole 169A having inner diameter which is roughly the same as outer diameter of the boss 72 of the take-up drum 65. Further, a cylindrical-shaped shaft receiving portion 169B is formed so as continuously project from the pawl base 166 side peripheral edge portion of the through hole 169A, the shaft receiving portion 169B having inner diameter roughly the same as inner diameter of the through hole 169A and having outer diameter roughly the same as inner diameter of the boss portion 155D of the pinion gear 155.

The cylindrical shaped shaft receiving portion 169B arranged upright on the center part of the bearing 169 is press-fitted in the cylindrical shaped boss portion 155D in a state that the boss portion 155D of the pinion gear 155 is press-fitted in the engaging hole 171 of the pawl base 166. Thereby, the bearing 169 made of a synthetic material such as polyacetal or the like is attached.

As shown in FIG. 14, in the bearing 169, there is rotatably press-fitted the boss 72 arranged upright on the pretensioner unit 7 side end surface portion of the take-up drum 65. Each of the clutch pawls 167 is supported in an accommodated position on the pawl base 166. The accommodated position is a position in which the entire clutch pawls 167 are accommodated within the outer peripheral portion of the pawl base 166.

The pawl guide 168 is a substantially ring-like member, and arranged at a position facing the pawl base 166 and each clutch pawl 167. On the base plate portion 157A side of the pawl guide 168, three long positioning projections 172 are arranged along radial direction at center angle of roughly 120 degrees. The positioning projections 172 are respectively inserted in positioning holes 173 formed at the peripheral portion of the inner shaft receiving hole 165 formed in the base plate portion 157A. In a waiting state, the pawl guide 168 is fixed to the base plate 157A in a non-rotatable manner.

Thereby, the clutch mechanism 156 and the pinion gear 155 are fixedly mounted on the base plate portion 157A while the pinion gear teeth 155A of the pinion gear 155 is always set at the position shown in FIG. 15 and fixed thereat. Further, a long piston positioning pin 175 is substantially L-shaped in cross section and arranged upright on the base plate portion 157A side of the pawl guide 168. The piston positioning pin 175 is inserted in the cutout portion 165C of the inner shaft receiving hole 165 and made to abut on an upper end surface of the piston 153 152A, i.e., the end portion to which the piston 153 moves.

As shown in FIG. 14 and FIG. 15, when the pawl guide 168 is fixed to the base plate portion 157A in a non-rotatable manner; rotation axis of the pinion gear 155 coincides with that of the take-up drum unit 6. At the same time, the outer peripheral surface of the support portion 155B of the pinion gear 155 is made to abut on the semicircular arc hole portion 162A of the outer shaft receiving hole 162 in the cover plate portion 157C and the outer peripheral surface of the boss portion 155D is made to abut on the semicircular arc hole portion 165A of the inner shaft receiving hole 165 in the base plate portion 157A so as to rotatably support the pinion gear 155. Further, a part of the pinion gear teeth 155A is arranged so as to present in the opening portion 159 of the piston guiding cylindrical portion 152A.

On a pawl base 166 side surface of the pawl guide 168, there are arranged position changing projecting portions 168A for the respective clutch pawls 167. When the pawl base 166 and the pawl guide 168 are relatively rotated by the activation of the pretensioner unit 7, the clutch pawls 167 respectively abut on the position changing projecting portions 168A so that the position is changed from an accommodated position to a locking position. The locking position is a position in which the tip portions of the clutch pawls 167 project outward from the outer peripheral end portion of the pawl base 166 and that of the pawl guide 168.

Further, when the position of the clutch pawls 167 is changed to the locking position, the clutch pawls 167 get engaged with the take-up drum 65. Specifically, when the clutch pawls 167 project to the outside of the outer peripheral end portion of the pawl base 166 and that of the pawl guide 168, the clutch pawls 167 are engageable with the internal gear 69 formed on the inner peripheral surface of the flange portion 68 of the take-up drum 65.

Then, the position of the clutch pawls 167 is changed to the locking position, the tip portion of each clutch pawl 167 gets engaged with the internal gear 69, so that the pawl base 166 rotates the take-up drum 65. Incidentally, the engagement of the clutch pawl 167 and the internal gear 69 has an engagement structure that allows the take-up drum 65 to rotate in one direction, namely, in a webbing-take-up direction.

Further, once engaged, the clutch pawls 167 each catch the internal gear 69 accompanying with deformation. Consequently, when the take-up drum 65 rotates in a webbing-pull-out direction after engagement, the pinion gear 155 is rotated in a direction opposite to the activation of the pretensioner unit 7 through the clutch mechanism 156, and the piston 153 is pushed back in the direction opposite to the activation direction. When the piston 153 is pushed back up to the point to release the engagement between the rack 153A of the piston 153 and the pinion gear teeth 155A of the pinion gear 155, the pinion gear 155 is released from the piston 153, so as to allow the take-up drum 65 to freely rotate with reference to the piston 153.

As shown in FIG. 12 through FIG. 15, the base block 158 is formed of synthetic resin material such as polyacetal or the like. The base block 158 is formed in a substantially rectangular parallelepiped shape so as to face, at full length, the piston guiding cylindrical portion 152A of the pipe cylinder 152 and inserted in a clearance between the base plate portion 157A and the cover plate portion 157C of the holding plate 157.

Further, a vertical directional center part of the base block 158 is a part facing the pinion gear 155 and formed so as to have thickness the same as rotation axis directional width of the pinion gear teeth 155A. The vertical directional center part of the base block 158 serves as a gear housing portion 181 which has inner diameter slightly larger than outer diameter of the pinion gear teeth 155A and gets concaved inward with reference to the pipe cylinder 152 like a substantially semicircle in side view. Further, thickness of the base block 158, namely, length between side surfaces of the base block 158 respectively face the concave portions 179A and 179B of the cover plate portion 157C, is made roughly the same as distance between the concave portions 179A, 179B and the base plate portion 157A.

Further, in a side surface portion of the base block 158 positioned so as to face the pipe cylinder 152, there are formed concave portions 182 and 183 each getting concaved by predetermined depth and spreading at full width of the base block 158. The concave portion 182 is provided at a substantially center part between an upper end of the gear housing portion 181 and an upper end of the base block 158 and the concave portion 183 is provided at a substantially center part between a lower end of the gear housing portion 181 and a loser end of the base block 158. Further, an elastic pressing piece 185 is provided for each of the concave portions 182 and 183 so as to project toward the pipe cylinder 152 from a side edge portion, at a base plate portion 157A side, on a bottom surface portion of each of the concave portions 182 and 183. Each elastic pressing piece 185 is configured to project diagonally forward with reference to the side edge portion of each of concave portions 182 and 183 so as to be elastically deformable toward the bottom surface portion of each of them.

Further, an elastic engagement piece 186 is provided for each of the concave portions 182 and 183 so as to project toward the pipe cylinder 152 from a side edge portion, at the base plate portion 157A side, on the bottom surface portion of each of the concave portions 182 and 183. Each elastic engagement piece 186 is configured to project in parallel with the base plate portion 157A so as to be elastically deformable toward the cover plate portion 157C. Further, a part below the gear housing portion 181 of the base block 158 is formed in a substantially box shape of which base plate portion 157A side part is open. A horizontally long rectangular shaped through hole 187 is formed at a lower end portion of the base block 158 at its pipe cylinder 152 side surface portion. Further, a cutout portion 188 having predetermined width is formed at a side edge portion, at a base plate portion 157A side, of the gear housing portion 181.

When the base block 158 is inserted from the open side of the holding plate 157 toward the pipe cylinder 152 at the back side of the holding plate 157, the respective elastic engagement pieces 186 get engaged with engagement holes 189 formed in the base plate portion 157, as shown in FIG. 19. Further, as shown in FIG. 15, the respective elastic pressing pieces 185 are held by the base plate portion 157A and the cover plate portion 157C between there in a state of abutting on the piston guiding cylindrical portion 152A of the pipe cylinder 152 and elastically deformed frontward so as to depress the pipe cylinder 152 toward back side of the holding plate 157.

Further, a gas releasing hole 152D formed at a lower end portion of the piston guiding cylindrical portion 152A and a through hole 187 formed at a lower end portion of the base block 158 are disposed so as to face each other. Via the through hole 187, the gas releasing hole 152D is connected with an opening portion defined by the base plate portion 157A and the cutout portion 188 formed in the gear housing portion 181. The base block 158 in a state of being held by the holding plate 157 is fixed to outer surface of the side wall portion 13 by the screws 15 inserted in the through holes 191 formed at an upper side of the concave portion 182 and a lower side of the concave portion 183 along thickness direction thereof.

Next, the operation of the pretensioner unit 7 configured, as in the above, to be activated to take up the webbing 3 is discussed referring to FIG. 14 through FIG. 20.

As illustrated in FIG. 15, when the gas generating member 151 of the pretensioner unit 7 is activated at vehicle collision or the like, the piston 153 breaks the piston positioning pin 175 and moves toward the tip portion of the piston guiding cylindrical portion 152A (direction of arrow 192) due to the pressure of the generated gas, and rotates the pinion gear 155 having the pinion gear teeth 155A in an engaging state with the rack 153A (rotates in the counterclockwise direction in FIG. 15).

As shown in FIG. 15, when the pinion gear teeth 155A get engaged with the rack 153A, the pinion gear 155 is pressed diagonally upward (direction of arrow 193 tilting diagonally upward by approximately 20 degrees with reference to moving direction of the piston 153, for instance) so as to slightly depart from the piston guiding cylindrical portion 152A of the pipe cylinder 152 with reference to the moving direction of the piston 153 (direction of arrow 192).

Therefore, as shown in FIG. 16 through FIG. 20, the support portion 155B and the boss portion 155D of the pinion gear 155 are also pressed diagonally upward (direction of arrow 193 tilting diagonally upward by approximately 20 degrees with reference to moving direction of the piston 153, for instance) so as to slightly depart from the piston guiding cylindrical portion 152A of the pipe cylinder 152.

Therefore, the pinion gear 155 smoothly rotates while outer peripheral surface of the support portion 155B and that of the boss portion 155D are respectively pressed by the semicircular arc hole portion 162A of the outer shaft receiving hole 162 in the cover plate portion 157C and the semicircular arc hole portion 165A of the inner shaft receiving hole 165 in the base plate portion 157A. Further, since center of the semicircular arc hole portion 162A of the outer shaft receiving hole 162 and that of the semicircular arc hole portion 165A of the inner shaft receiving hole 165 are positioned on the rotation axis of the take-up drum unit 6, the pinion gear 155 is rotatably supported in co-axial with the rotation axis of the take-up drum unit 6.

Thus, linkage of the cover plate portion 157C, the base plate portion 157A and the back plate portion 157C makes up the holding plate 157 having a U-shape in cross section so that the support portion 155B and the boss portion 155D of the pinion gear 155 are rotatably supported by the semicircular arc hole portion 162A of the outer shaft receiving hole 162 in the cover plate portion 157C and the semicircular arc hole portion 165A of the inner shaft receiving hole 165 in the base plate 157A. Thereby, dislocation of the cover plate portion 157C with reference to the base plate portion 157A at the time of activation of the pretensioner unit 7 and misalignment of center axis of the outer shaft receiving hole 162 and that of the inner shaft receiving hole 165 due to uplift of the shaft can be avoided by adopting the simple configuration and the pinion gear 155 rotates smoothly.

Even if the pipe cylinder 152 is pressed in a direction to make the pipe cylinder 152 depart from the pinion gear 155 via the piston 153 by engagement of the pinion gear teeth 155A and the rack 153A at the time of activation of the pretensioner unit 7, movement or deformation of the pipe cylinder 152 is avoided by pressing the pipe cylinder 152 by the back plate portion 157B in linkage of the cover plate portion 157C and the base plate portion 157A and engagement of the pinion gear teeth 155A and the rack 153A is kept by adopting the simple configuration.

Further, as shown in FIG. 14, the pinion gear 155 is rotated and driven while the semicircular arc hole portion 165A of the inner shaft receiving hole 165 in the base plate portion 157A inserted between the flange portions 163 and 164 is made to abut on the outer peripheral surface of the boss portion 155D. Thereby, the pinion gear 155 is rotated and driven by the piston 153 while movement of the pinion gear 155 in rotation axis direction is restricted by the flange portions 163 and 164.

Further, at vehicle collision or the like, the inertial mass 52 of the vehicle acceleration sensor 28 moves on the bottom face portion of the sensor holder 51 to rotate the sensor lever 53 vertically upward. Thereby, as discussed above, the lock claw 53A of the sensor lever 53 rotates the pilot lever 112 vertically upward. Then the engagement claw portion 112A of the pilot lever 112 abuts on a locking gear tooth 107A formed on the outer circumference portion of the locking gear 107.

Here, the engagement of the engagement claw portion 112A of the pilot lever 112 and a locking gear tooth 107A has an engagement structure that activates in one direction, namely, in a direction preventing the rotation of the take-up drum 65 in the webbing-pull-out direction. Accordingly, when the pretensioner unit 7 is activated, even if the engagement claw portion 112A of the pilot lever 112 abuts on a locking gear tooth 107A, the take-up drum 65 is still smoothly rotatable in the webbing-take-up direction.

Then, as illustrated in FIG. 15, as the pinion gear 155 rotates, the pawl base 166 rotates together with the pinion gear 155. At this time, the pawl base 166 relatively rotates with reference to the pawl guide 168 till the positioning projections 172 are broken; so that the position changing projecting portions 168A formed on the pawl guide 168 respectively abut on the clutch pawls 167 and the clutch pawls 167 are changed to the locking position.

As a result, the tip portion of each clutch pawl 167 engages with the internal gear 69 of the take-up drum 65 and force for the piston 153 to move to tip end side of the piston guiding cylindrical portion 152A is transmitted to the take-up drum 65 via the pinion gear 155, the pawl base 166, the clutch pawls 167 and the internal gear 69. Thereby, the take-up drum 65 is rotatably driven in the webbing-take-up direction, and the webbing 3 is taken up by the take-up drum 65.

Next, the operation to pull out the webbing 3 which follows activation of the pretensioner unit 7 at the time of vehicle collision or the like is discussed referring to FIG. 14 through FIG. 20.

As shown in FIG. 15, at vehicle collision or the like, if the webbing 3 is pulled out (direction of arrow 195 in FIG. 15) successively after the activation of the pretensioner unit 7 and the take-up drum 65 is rotated in the webbing pull-out direction, the engagement claw portion 112A of the pilot lever 112 engages with the locking gear tooth 107A formed on the outer circumference portion of the locking gear 107 and the clutch 111 is rotated in the webbing pull-out direction. Accordingly, the pawl 23 guided by the guiding hole 142 of the clutch 111 is made to engage with the ratchet gear portion 35A of the ratchet gear 35.

Accordingly, when the webbing 3 is pulled out successively after the activation of the pretensioner unit 7 at vehicle collision, etc., the engagement of the pawl 23 and the ratchet gear portion 35A serves to stop rotation of the ratchet gear 35 of the take-up drum unit 6 in the webbing-pull-out direction. Incidentally, the pawl 23 and the ratchet gear portion 35A has an engagement structure that works in one direction, namely, in the direction to prevent the take-up drum 65 from rotating in the webbing-pull-out direction.

Further, when the webbing 3 is pulled out (direction of arrow 195 in FIG. 15) successively after the activation of the pretensioner unit 7 at the vehicle collision, etc., and the take-up drum 65 is rotated in the webbing pull-out direction, the pinion gear 155 is pressed in upward direction (direction of arrow 196 in FIG. 15) in parallel with the webbing pull-out direction, via the bearing 169, as shown in FIG. 15.

Therefore, as shown in FIG. 16 through FIG. 20, the support portion 155B and the boss portion 155D of the pinion gear 155 are pressed in the upward direction (direction of arrow 196), as well. Consequently, the outer peripheral surface of the support portion 155B and that of the boss portion 155D in the pinion gear 155 are respectively pressed by the semicircular arc hole portion 162A of the outer shaft receiving hole 162 in the cover plate portion 157C and the semicircular arc hole portion 165A of the inner shaft receiving hole 165 in the base plate portion 157A.

[Energy Absorption]

Next, a significantly large force to pull out the webbing 3 works on the webbing 3 in a case where a vehicle occupant is relatively moved frontward with respect to the vehicle after the activation of the pretensioner unit 7 at vehicle collision, etc., in a state that engagement of the pawl 23 and the ratchet gear portion 35A of the ratchet gear 35 is kept. In a case where the webbing 3 is pulled out with the webbing-pull-out force exceeding predetermined value corresponding to threshold, rotation torque in the webbing-pull-out direction acts on the take-up drum 65.

Since rotation of the ratchet gear 35 is stopped by the pawl 23, rotation in the webbing-pull-out direction is stopped regarding the spline 66B of the torsion bar 66 press-fitted in the spline groove 82A of the ratchet gear 35. Therefore, by the rotation torque acting on the take-up drum 65 in the webbing-pull-out direction, the torsion bar 66 is rotated at the side of the spline 66A which is press-fitted into the shaft hole 65A of the take-up drum 65 so that torsional deformation starts at the shaft portion 66C of the torsion bar 66. The take-up drum 65 is rotated in the webbing-pull-out direction due to the torsional deformation at the shaft portion 66C of the torsion bar 66, whereby impact energy is absorbed in the form of the torsional deformation caused to the torsion bar 66, as "first energy absorption mechanism".

Incidentally, since the pawl 23 and the ratchet gear 35 are in an engaged state when the take-up drum 65 is rotated, relative rotation is caused between the ratchet gear 35 and the take-up drum 65. Consequently, relative rotation is subsequently caused between the wire 67 and the ratchet gear 35 due to rotation of the take-up drum 65. Thereby, the wire 67 of which crooked portion 67A held in the holding-side crooked path 77 of the take-up drum 65 is guided and pulled out accompanying plastic deformation through a deformation-giving crooked path defined by inner periphery of the flange portion 85 of the ratchet gear 35 and outer periphery portion of the convex portion 84. Thereby impact energy is absorbed in the form of pull-out resistance of the wire 67, as "second energy absorption mechanism".

Further, in a case where the take-up drum 65 rotates in the webbing-pull-out direction due to the torsional deformation caused to the shaft portion 66C of the torsion bar 66, the respective clutch pawls 167 of the clutch mechanism 156 firmly get engaged with the internal gear 69 accompanying deformation. Therefore, when the take-up drum 65 rotates in the webbing-pull-out-direction, the pinion gear 155 is also rotated in the webbing-pull-out direction (counterclockwise direction in FIG. 15) via the clutch mechanism 156.

Further, as shown in FIG. 16 through FIG. 20, since the pinion gear 155 is pressed in the upward direction (direction of arrow 196), the pinion gear 155 is smoothly rotated in a state that the outer peripheral surface of the support portion 155B and that of the boss portion 155D are respectively being pressed by the semicircular arc hole portion 162A of the outer shaft receiving hole 162 in the cover plate portion 157C and the semicircular arc hole portion 165A of the inner shaft receiving hole 165 in the base plate portion 157A. Since center of the semicircular arc hole portion 162A of the outer shaft receiving hole 162 and that of the semicircular arc hole portion 165A of the inner shaft receiving hole 165 are positioned on the rotation axis of the take-up drum unit 6, the pinion gear 155 is rotatably supported in co-axial with the rotation axis of the take-up drum unit 6.

As shown in FIG. 14, the pinion gear 155 is rotated and driven in a state that the semicircular arc hole portion 165A of the inner shaft receiving hole 165 in the base plate portion 157A inserted between the flange portions 163 and 164 is made to abut on the outer peripheral surface of the boss portion 155D. Thereby, the pinion gear 155 is rotated and driven via the clutch mechanism 156 in a state that movement of the pinion gear 155 in rotation axis direction is restricted by the flange portions 163 and 164.

As described in the above, the seatbelt retractor 1 directed to the first embodiment, the boss portion 155D projecting from the inner shaft receiving hole 165 of the pinion gear 155 is press-fitted in the engaging hole 171 of the pawl base 166 in a state of holding the pawl guide 168 and the clutch pawls 167. At the same time, by inserting the positioning projections 172 of the pawl guide 168 in the positioning holes 173 of the base plate portion 157A, the boss portion 155D of the pinion gear 155 is fixed in a state of being restricted positionally with reference to radial direction. Further, the semicircular arc hole portion 165A of the inner shaft receiving hole 165 is inserted between the flange portions 163 and 164 of the pinion gear 155.

Thereby, the semicircular arc hole portion 165A of the inner shaft receiving hole 165 inserted between the flange portions 163 and 164 of the pinion gear 155 can serve to avoid dislocation of the pinion gear 155 in the rotation axis direction thereof by adopting the simple configuration.

Further, radial directional movement of the pinion gear 155 is restricted by the boss portion 155D projecting from the inner shaft receiving hole 165 via the pawl base 166 and the pawl guide 168 of the clutch mechanism 156 while position of the pinion gear 155 is restricted so as to be in co-axial with the take-up drum 65. Thereby, by adopting the simple structure, the pinion gear 155 can be arranged in co-axial with the take-up drum 65 without dislocation of the pinion gear 155 in radially outward direction and the number of mechanical parts can be reduced.

Further, when the pretensioner unit 7 is activated and the pinion gear 155 is subsequently rotated and driven by movement of the piston 153, the support portion 155B can be made to abut on the semicircular arc hole portion 162A of the outer shaft receiving hole 162 and the boss portion 155D can be made to abut on the inner peripheral surface of the semicircular arc hole portion 165A of the inner shaft receiving hole 165 reliably, whereby the pinion gear 155 can be rotated smoothly in co-axial with the rotation axis of the take-up drum 65. Further, even if the webbing 3 is pulled out after activation of the pretensioner unit 7, the support portion 155B can be made to abut on the semicircular arc hole portion 162A of the outer shaft receiving hole 162 and the boss portion 155D can be made to abut on the inner peripheral surface of the semicircular arc hole portion 165A of the inner shaft receiving hole 165 reliably, whereby the pinion gear 155 can be rotated smoothly in co-axial with the rotation axis of the take-up drum 65.

Further, since distance between the flange portions 163 and 164 of the pinion gear 155 with reference to the rotation axis direction is roughly the same as plate thickness of the base plate portion 157A in which the inner shaft receiving hole 165 is formed, dislocation of the pinion gear 155 with reference to the rotation axis direction and slip of the pinion gear 155 can be avoided reliably. Further, since the flange portions 163 and 164 of the pinion gear 155 are integrally molded by forging or the like, the thus integrated form means no necessity in preparing the flange portions 163 and 164 as separate parts and the reduction in the number of mechanical parts, and hours for assemblage can be realized.

Further, since each of the flange portions 163 and 164 of the pinion gear 155 is formed into a flange-like shape, low-profile design for each of the flange portions 163 and 164 can be realized easily and axis directional dimension of the pinion gear 155 can be reduced. Thereby, configuration of the pinion gear 155 can be simplified. Further, since the inner shaft receiving hole 165 is made up of the semicircular arc hole portion 165A and the enlarged hole portion 165B, the shape of the inner shaft receiving hole 165 can be simplified and the area for the enlarged hole portion 165B of the inner shaft receiving hole 165 can be enlarged.

Further, the pinion gear 155 is settled down as follows. Firstly, the pinion gear teeth 155A and the flange portion 163 of the pinion gear 155 are inserted in the enlarged hole portion 165B of the inner shaft receiving hole 165, the support portion 155B is subsequently inserted in the enlarged hole portion 162B of the outer shaft receiving hole 162 in the cover plate portion 157C. After that, the semicircular arc hole portion 165A of the inner shaft receiving hole 165 is inserted between the flange portions 163 and 164 so that the support portion 155B is made to abut on the semicircular arc hole portion 162A of the outer shaft receiving hole 162 and the boss portion 155D is made to abut on the semicircular arc hole portion 165A of the inner shaft receiving hole 165.

After that, in this state, the boss portion 155D projecting from the inner shaft receiving hole 165 is press-fitted into the engaging hole 171 of the pawl base 166 so that the pinion gear 155 is rotatably mounted on the holding plate 157 through the clutch mechanism 156. Thereby, a worker can easily attach the pinion gear 155 to the holding plate 157 and operation efficiency can be improved.

Further, load on the pinion gear 155 with reference to the axis direction thereof and load on the pinion gear 155 with reference to the radial direction thereof can be received with the semicircular arc hole portion 162A of the outer shaft receiving hole 162 and the semicircular arc hole portion 165A of the inner shaft receiving hole 165. Thereby, low-profile and weight saving design can be realized for the holding plate 157. Further, since the flange portion 163 of the pinion gear 155 is formed at the take-up drum 65 side end portion of the pinion gear teeth 155A in a flange-like shape, dislocation of the pinion gear teeth 155A in axis direction with reference to the rack 153A when engaging with the rack 153A of the piston 153 can be avoided by adopting the simple configuration and mechanical strength of the pinion gear teeth 155A can be secured easily.

Further, when the clutch mechanism 156 and the pinion gear 155 are fixedly attached to the base plate portion 157A, the long piston positioning pin 175, which is substantially L-shaped in cross section and arranged upright on the base plate portion 157A side of the pawl guide 168, is inserted in the cutout portion 165C of the inner shaft receiving 165 and made to abut on an upper end surface of the piston 153, i.e., the end portion to which the piston 153 moves.

Thereby, when the pretensioner unit 7 is in a resting state, the above configuration can reliably avoid the piston 153 housed in the pipe cylinder 152 from moving with reference to longitudinal direction of the pipe cylinder 152 and avoid the rack 153A of the piston 153 from abutting on the pinion gear teeth 155A of the pinion gear 155. Further, in a case where the piston 153 is pressed and driven by pressure of gas in response to activation of the pretensioner unit 7, the piston positioning pin 175 is broken by the piston 153. Thereby, the pinion gear 155 can be rotated and driven efficiently via the piston 153.

Second Embodiment

Next, a seatbelt retractor 201 directed to the second embodiment will be described by referring to FIG. 21 through FIG. 30. In the following description, the same reference numerals as those of the seatbelt retractor 1 according to the above-described first embodiment depicted in FIG. 1 through FIG. 20 represent the same or equivalent elements as those of the seatbelt retractor 1 according to the above-described first embodiment.

Figure 21:
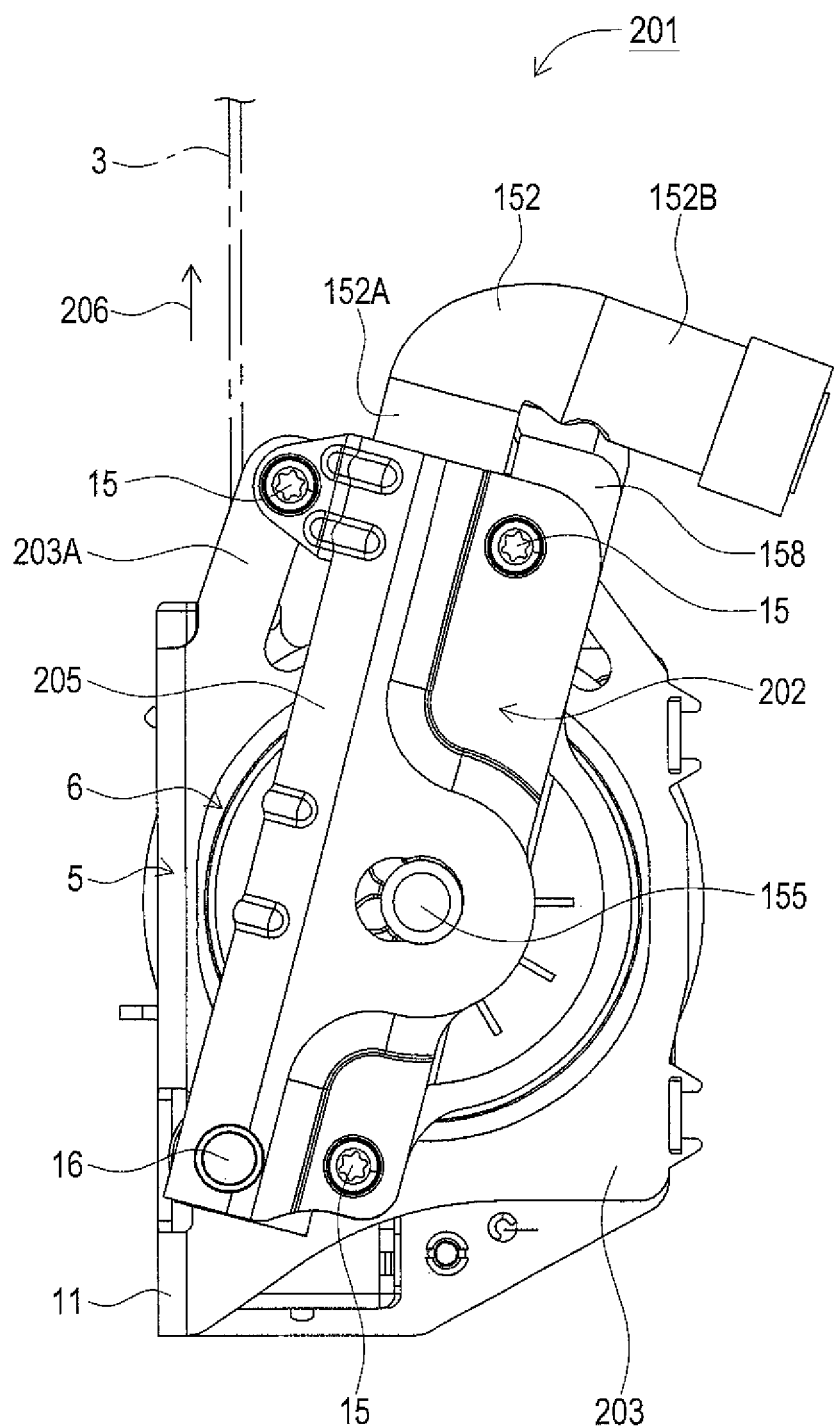
FIG. 21 is a side view of a seatbelt retractor according to a second embodiment.
Figure 22:
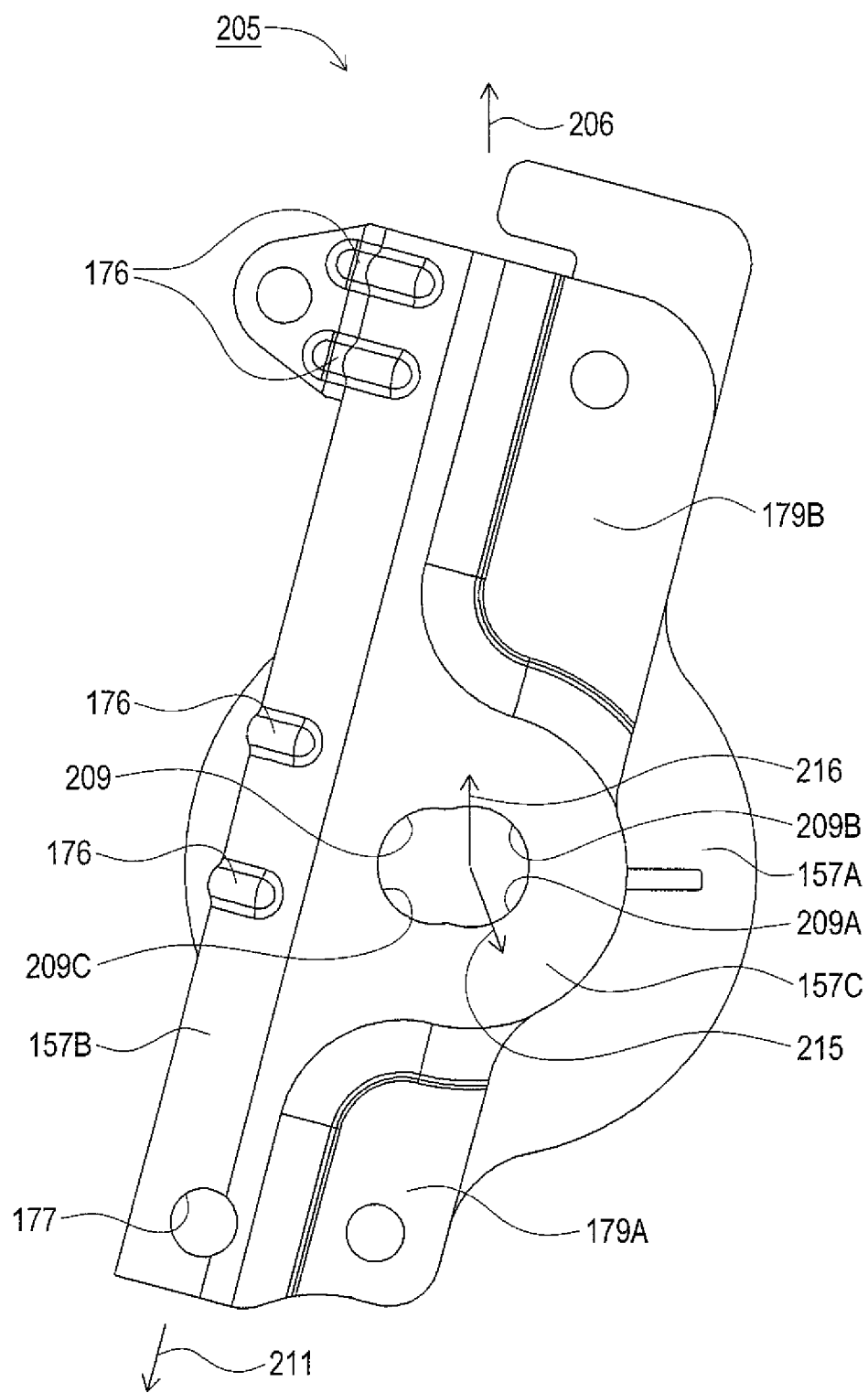
FIG. 22 is a side view of a holding plate shown in FIG. 21.
Figure 23:
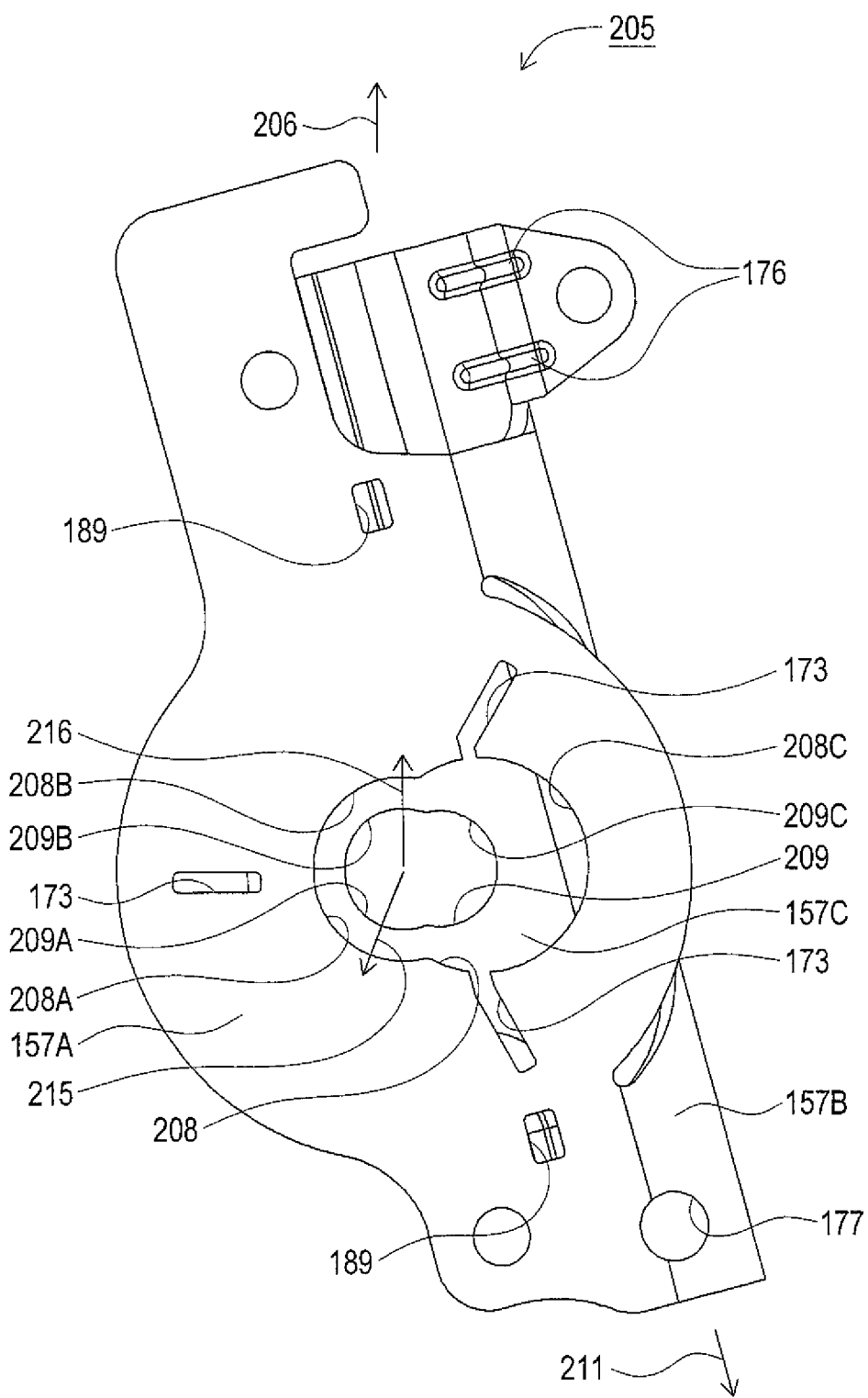
FIG. 23 is another side view of the holding plate shown in FIG. 21.
Figure 24:
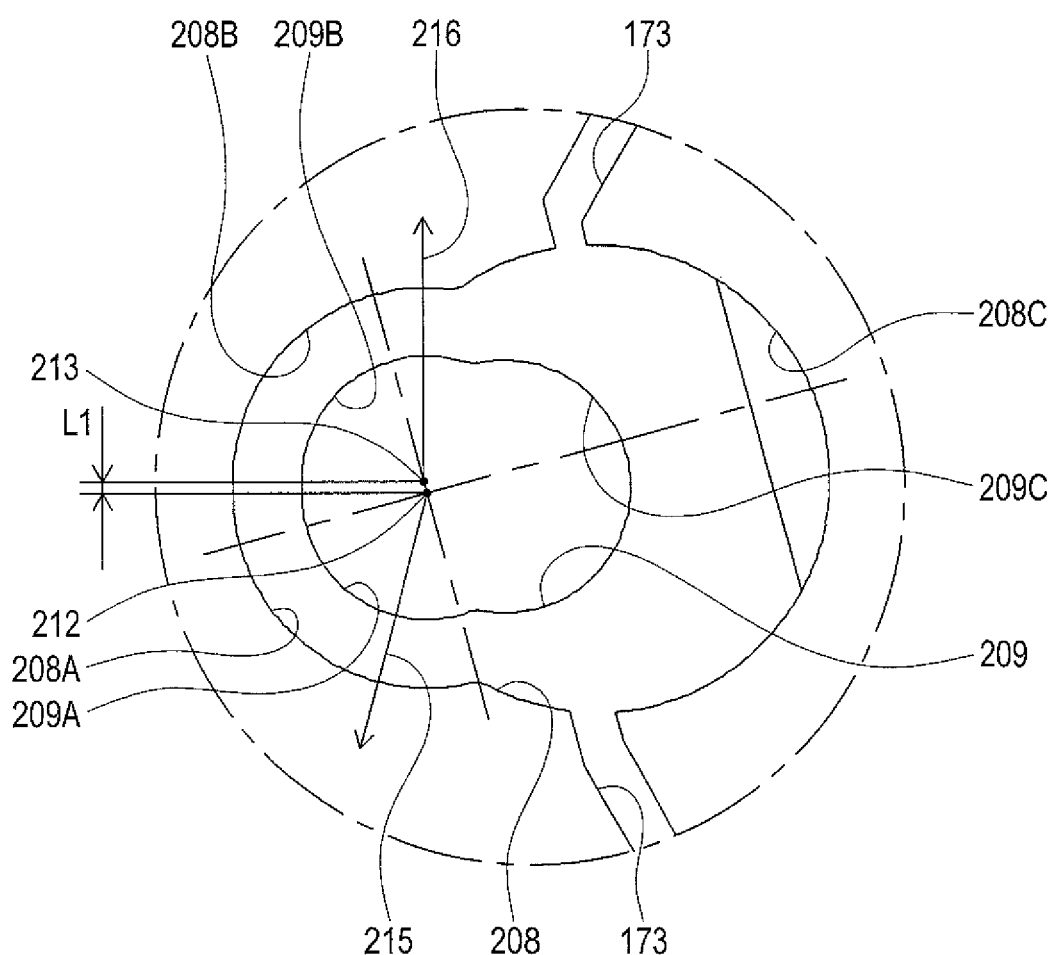
FIG. 24 is an enlarged view of a principal portion of an inner shaft receiving hole.
Figure 25:
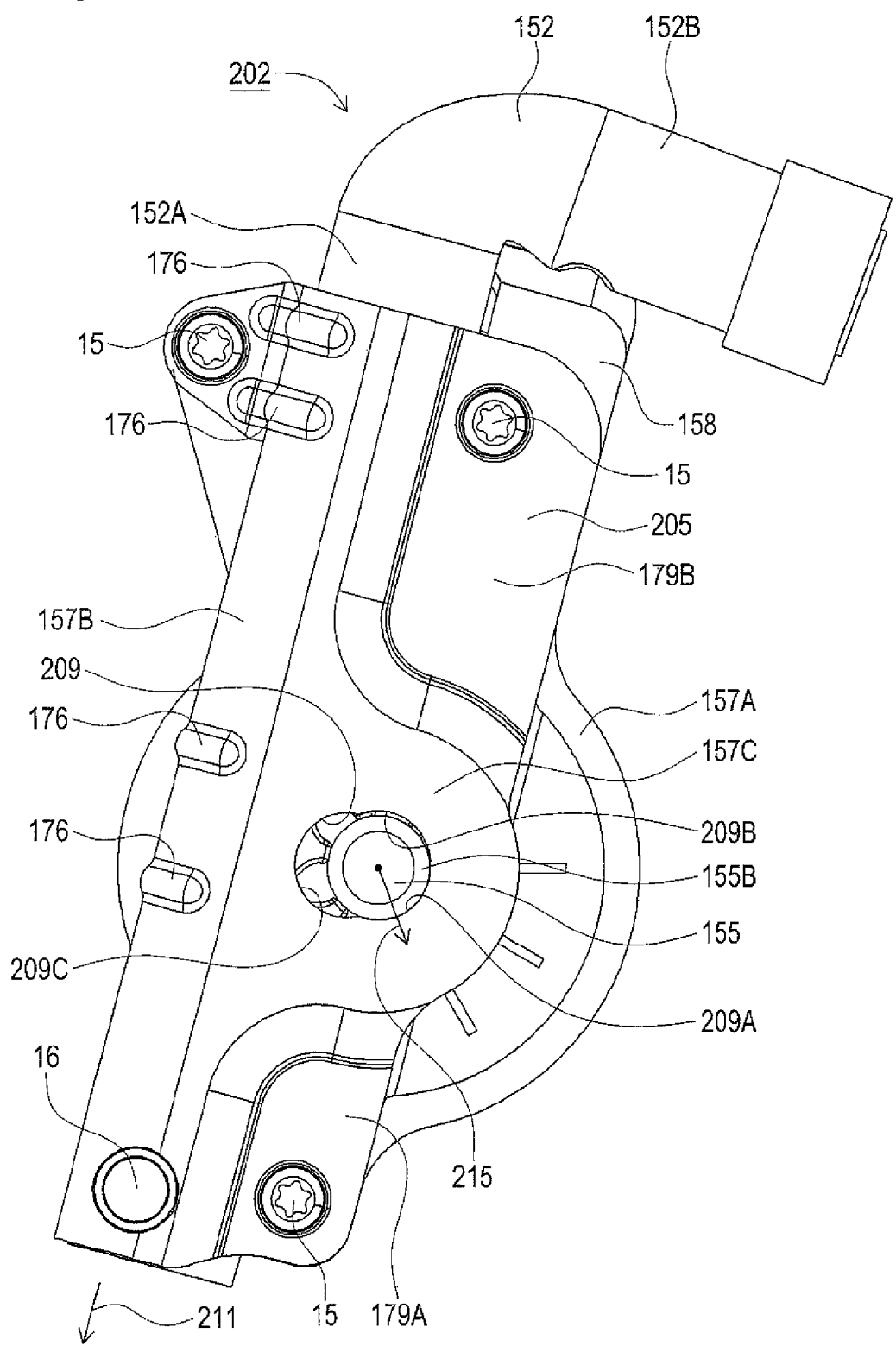
FIG. 25 is a side view for illustrating a supported state of the pinion gear when a pretensioner unit is activated.
Figure 26:
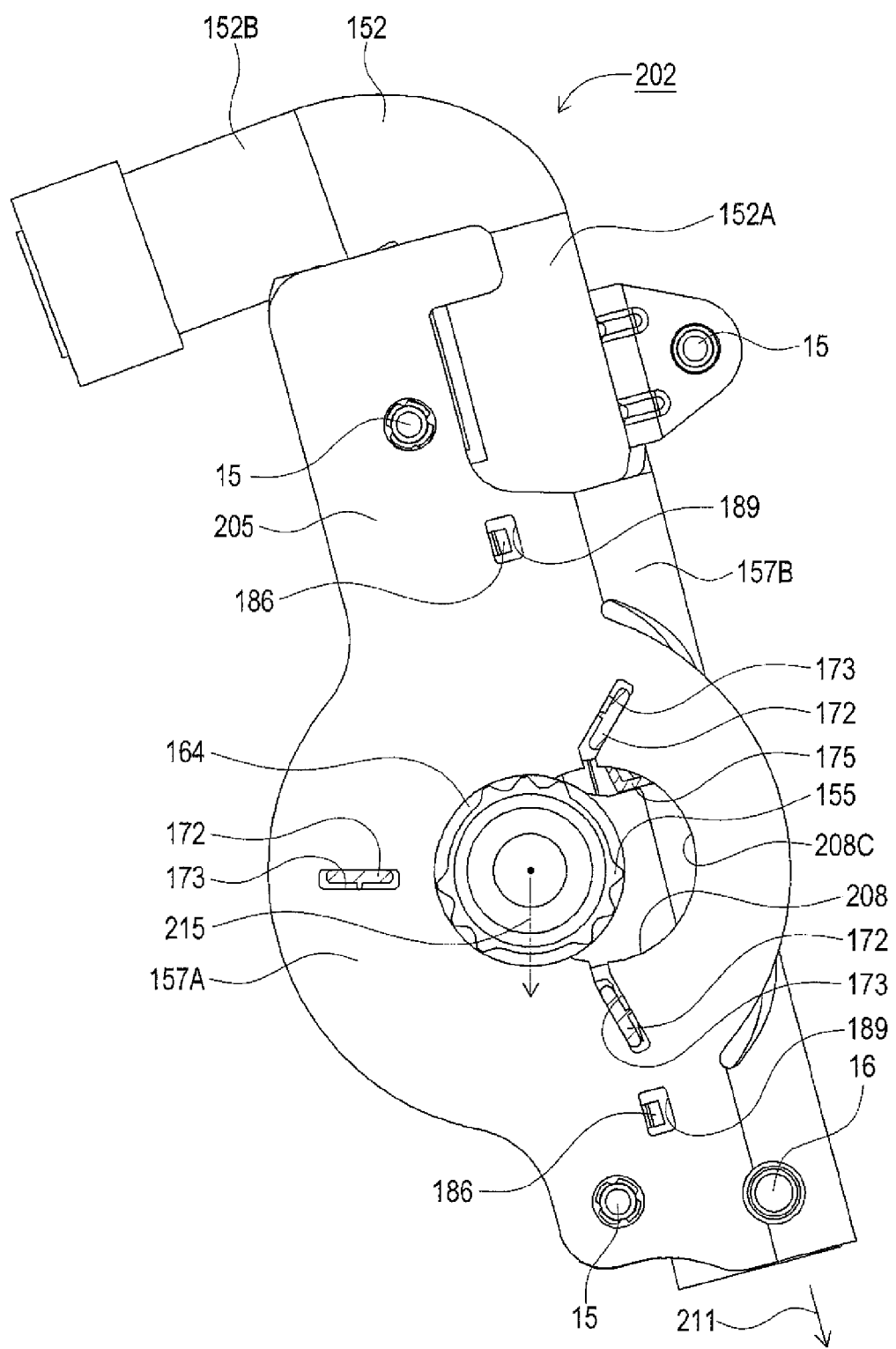
FIG. 26 is another side view for illustrating the supported state of the pinion gear when the pretensioner unit is activated.
Figure 27:
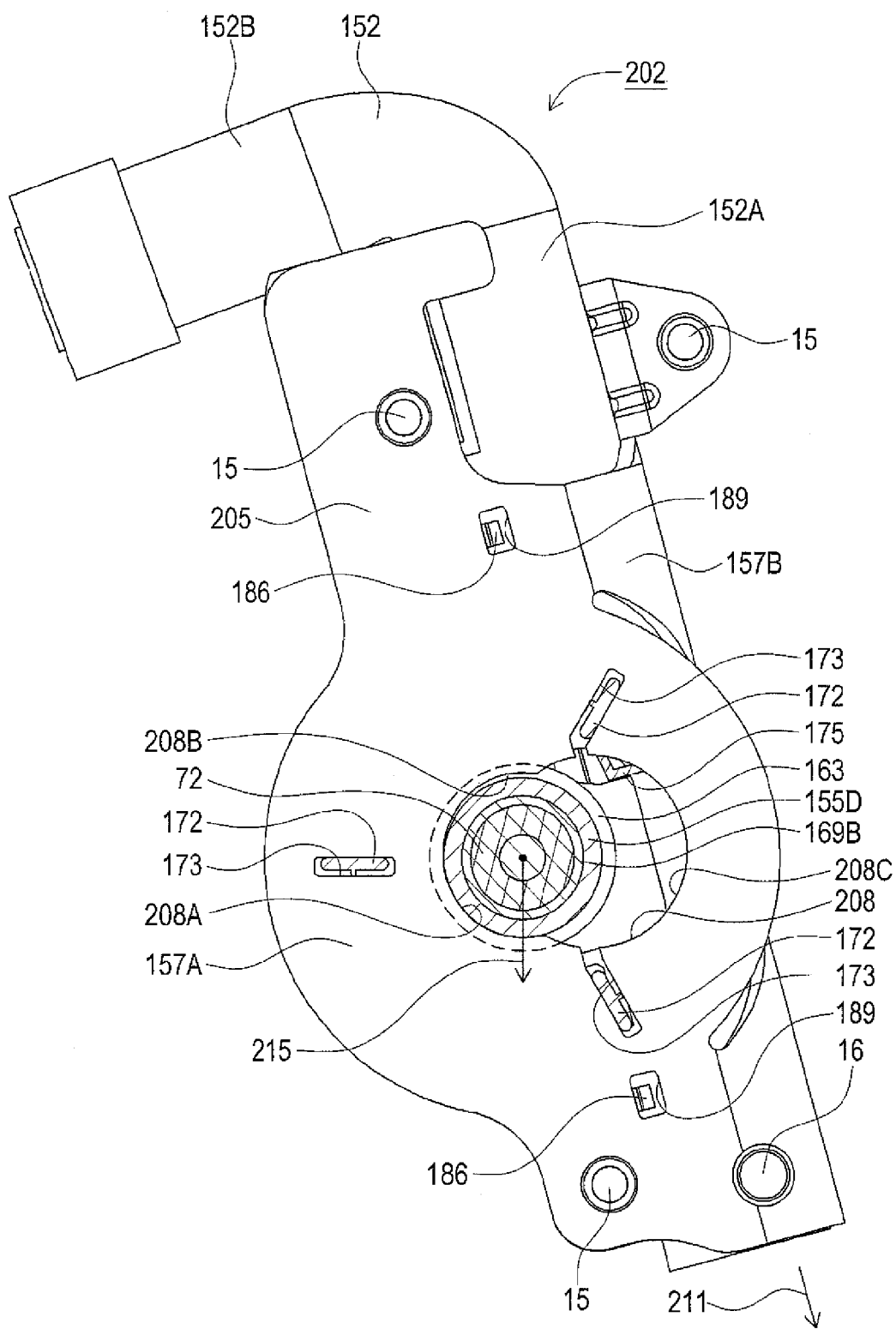
FIG. 27 is another side view for illustrating the supported state of the pinion gear when the pretensioner unit is activated.

FIG. 21 is a side view of a seatbelt retractor 201. FIG. 22 and FIG. 23 each are a side view of a holding plate 205. FIG. 24 is an enlarged section view of a principal portion of an inner shaft receiving hole 208 and an outer shaft receiving hole 209 both shown in FIG. 23. FIG. 25 and FIG. 26 each are a side view for illustrating a supported state of a pinion gear 155 when a pretensioner unit 202 is activated. FIG. 27 is a partially-cutout view of FIG. 26 from which there is left out the flange portion 164 allowing a contact state of a boss portion 155D of the pinion gear 155 and a semicircular arc hole portion 208A of an inner shaft receiving hole 208.

Figure 28:
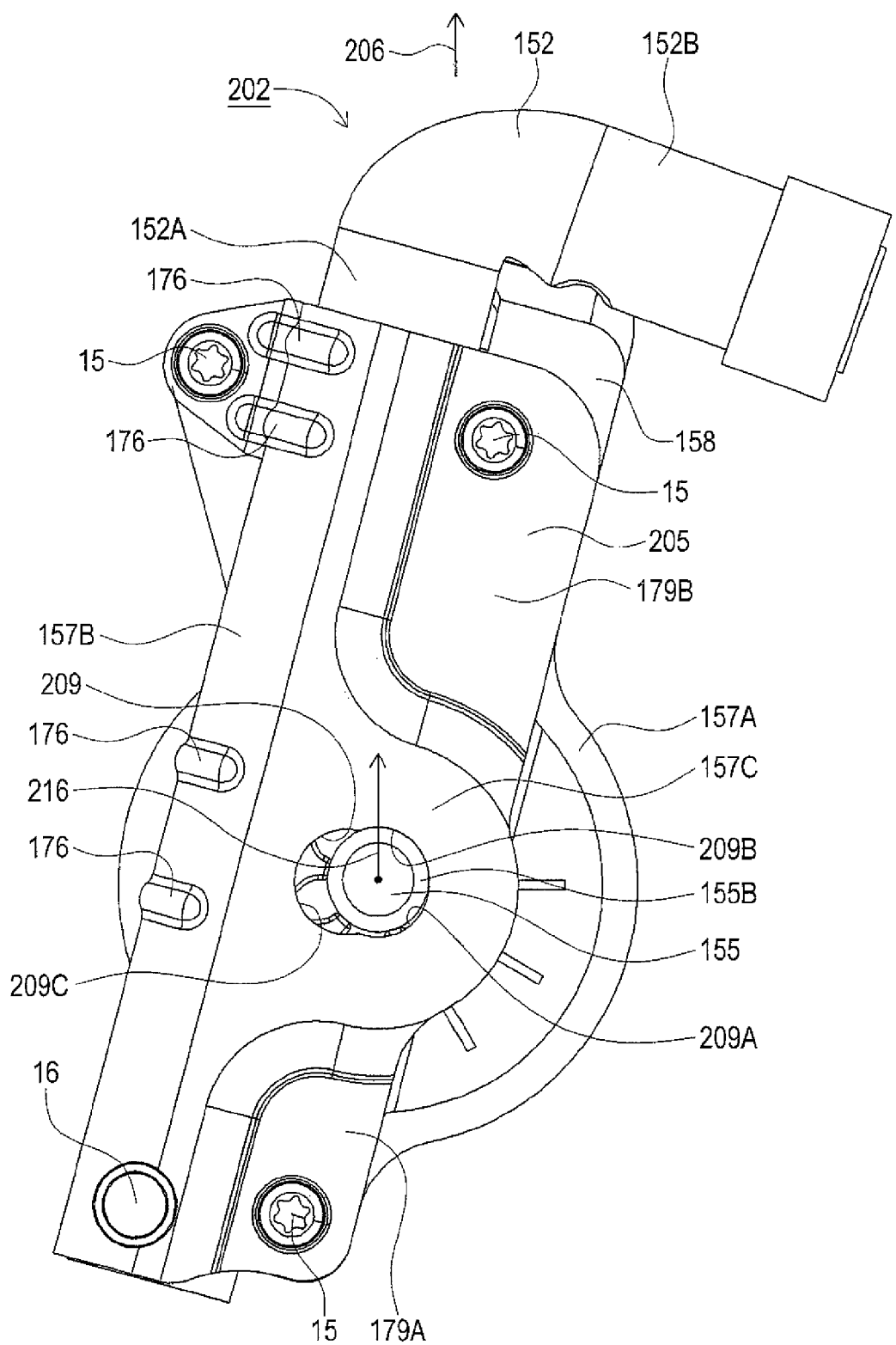
FIG. 28 is a side view for illustrating the supported state of the pinion gear when the webbing is pulled in response to activation of the pretensioner unit.
Figure 29:
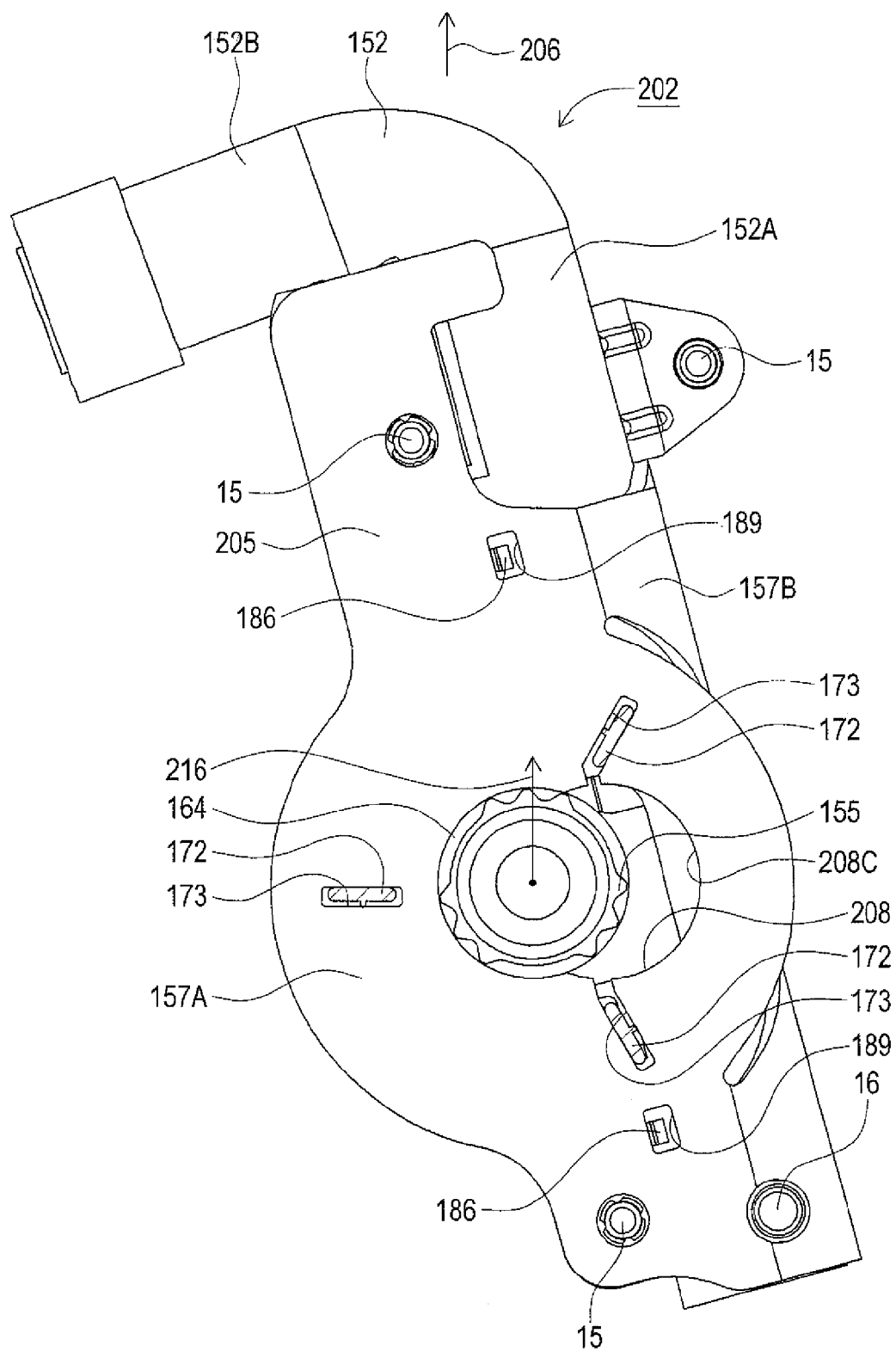
FIG. 29 is another side view for illustrating the supported state of the pinion gear when the webbing is pulled out in response to activation of the pretensioner unit.
Figure 30:
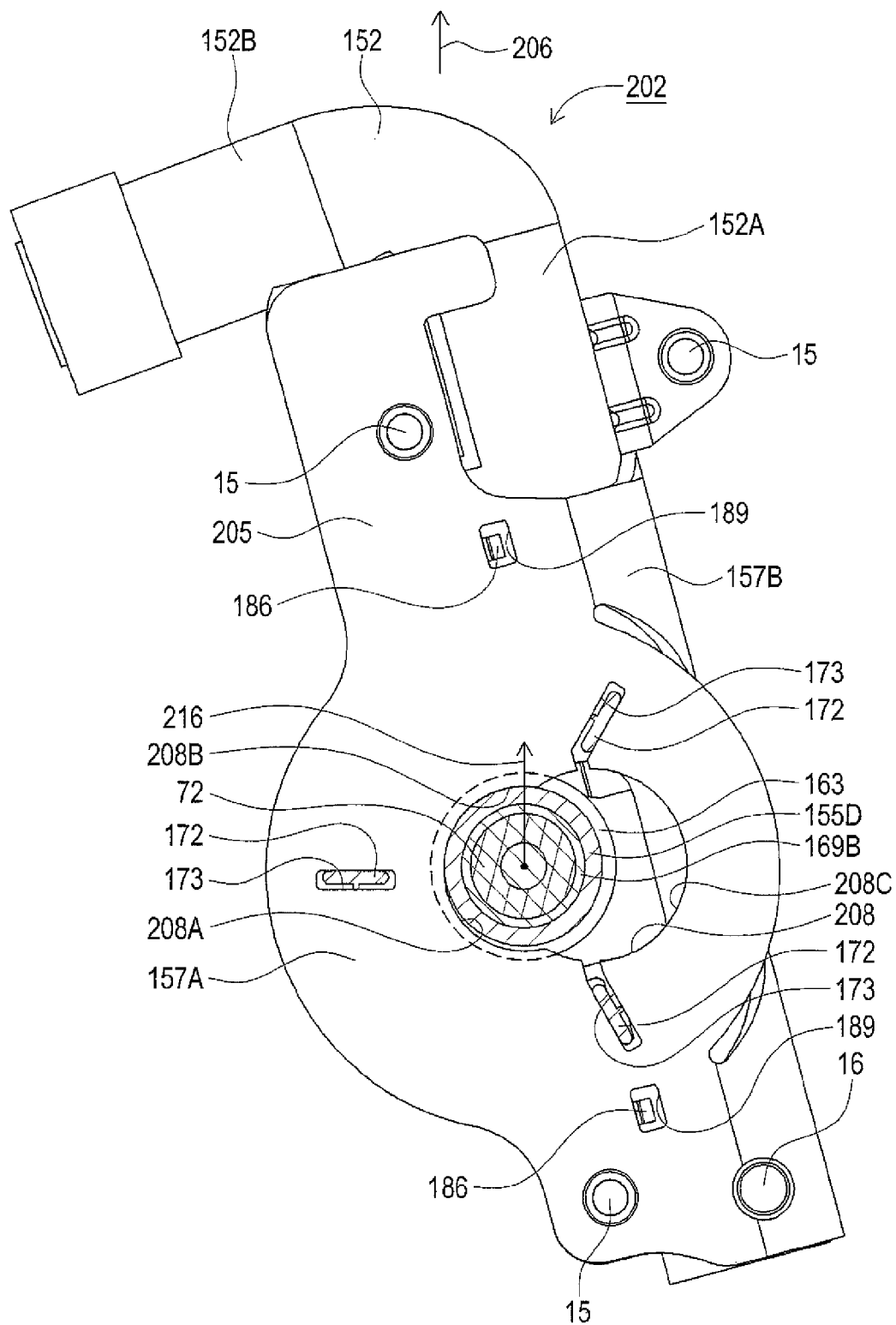
FIG. 30 is still another side view for illustrating the supported state of the pinion gear when the webbing is pulled out in response to activation of the pretensioner unit.

FIG. 28 and FIG. 29 each are a side view for illustrating a supported state of the pinion gear 155 when the webbing 3 is pulled out in response to activation of the pretensioner unit 202. FIG. 30 is a partially-cutout view of FIG. 29 from which there is left out the flange portion 164 allowing a contact state of a boss portion 155D of a pinion gear 155 and a semicircular arc hole portion 208A of an inner shaft receiving hole 208.

The schematic configuration of the seatbelt refractor 201 directed to the second embodiment is roughly the same as that of the seatbelt retractor 1 directed to the first embodiment.

However, as illustrated in FIG. 21, the configuration of the seatbelt retractor 201 directed to the second embodiment differs from the first embodiment in that a pretensioner unit 202 is fixedly attached in place of the pretensioner unit 7 in a slantwise position realized by rotating the pretensioner unit 7 with reference to the rotation axis of the take-up drum unit 6, specifically, a slantwise position realized by rotating the pretensioner unit 7 by about 165 degrees in counterclockwise direction in front view with reference to axis center of the pinion gear 155. Therefore, as illustrated in FIG. 21, the configuration of the seatbelt retractor 201 differs from the first embodiment in that a side wall portion 203 is arranged for the housing 11, in place of the side wall portion 13.

Next, the schematic configuration of the pretensioner unit 202 and that of the housing 11 will described based on FIG. 21 through FIG. 27.

As illustrated in FIG. 21, the configuration of the pretensioner unit 202 is roughly the same as that of the pretensioner unit 7 and comprised of a pipe cylinder 152, a piston 153, a sealing plate 161, a clutch mechanism 156, a base block 158 and a holding plate 205 in the place of the holding plate 157.

Further, the side wall portion 203 of the housing 11 is roughly the same as that of the side wall portion 13 while the side wall portion 203 differs from the side wall portion 13 in that the pretensioner unit 202 is fixedly attached to the side wall portion 203 in a slantwise position realized by rotating the pretensioner unit 7 by about 165 degrees in counterclockwise direction in front view with reference to axis center of the pinion gear 155. Therefore, at a webbing-pull-out direction side edge portion of the side wall portion 203 (upper end edge portion in FIG. 21), there is formed an extending portion 203A so as to extend in the webbing-pull-out direction like a triangle in front view.

As illustrated in FIG. 21, the pretensioner unit 202 is attached to the side wall portion 203 in such manner that a front end side of the pipe cylinder 152 is fixed at lower left corner of the side wall portion 203 by a stopper pin 16 so as to allow the piston 153 to move diagonally downward with reference to the webbing-pull-out direction (direction of arrow 206). The pretensioner unit 202 is screwed to the side wall portion 203 by three screws 15 two of which are at the extending portion 203A extending from the upper end edge portion of the side wall portion 203 and the other one of which is at the lower end of the side wall portion 203.

As illustrated in FIG. 22 through FIG. 24, the configuration of the holding plate 205 having a U-like shape in cross section is roughly the same as that of the holding plate 157 having a U-like shape in cross section, while the holding plate 205 differs from the holding plate 157 in that the holding plate 205 includes an inner shaft receiving hole 208 at a center part of the base plate portion 157A in place of the inner shaft receiving hole 165, so as to allow insertion of the pinion gear teeth 155A and the flange portion 163 of the pinion gear 155. The holding plate 205 further includes an outer shaft receiving hole 209 at a center part of the cover plate portion 157C in place of the outer shaft receiving hole 162, so as to allow insertion of the support portion 155B of the pinion gear 155.

As illustrated in FIG. 23 and FIG. 24, at the back plate portion 157B side half part of the inner shaft receiving hole 208, there is formed an enlarged hole portion 208C in a substantially semicircular arc shape. The enlarged hole portion 208C is configured to extend toward the back plate portion 157B and have inner diameter which is larger than outer diameter of the pinion gear teeth 155A and that of the flange portion 163 both formed on the pinion gear 155.

When positioning projections 172 on the pawl guide 168 of the clutch mechanism 156 are inserted in the positioning holes 173 of the base plate portion 157A for positional setting of the clutch mechanism 156, the piston positioning pin 175 erected on the pawl guide 168 is inserted in the back plate side edge part of the enlarged hole portion 208C (refer to FIG. 26).

Regarding the inner shaft receiving hole 208, at a side opposite to the enlarged hole portion 208C, a semicircular arc hole portion 208A is formed so as to extend from piston moving directional side end (side of arrow 211 in FIG. 23) of the enlarged hole portion 208C. The semicircular arc hole portion 208A is a substantially semicircular arc shape slightly larger than a quarter-circular arc and configured to have inner diameter roughly the same as outer diameter of the boss portion 155D of the pinion gear 155. The semicircular arc hole portion 208A has configuration such that a center axis 212 of the inner periphery is positioned on the rotation axis of the take-up drum unit 6 when the pretensioner unit 202 is attached to the side wall portion 203 of the housing 11.

At the webbing-pull-out directional side (side of arrow 206 in FIG. 23) of the inner shaft receiving hole 208 opposite to the enlarged hole portion 208C, a semicircular arc hole portion 208B is formed so as to be connected with a webbing-pull-out directional side end of the enlarged hole portion 208C and a webbing-pull-out directional side end of the semicircular arc hole portion 208A. The semicircular arc hole portion 208B is a substantially semicircular arc shape slightly larger than a quarter-circular arc.

The semicircular arc hole portion 208B has inner diameter roughly the same as outer diameter of the boss portion 155D of the pinion gear 155. The semicircular arc hole portion 208B has configuration such that a center axis 213 of the inner periphery is apart from the center axis 212 of the semicircular arc hole portion 208A in the webbing-pull-out direction by distance L1 (distance L1 is approximately 0.5 mm, for instance). Thereby, end-to-end distance between the semicircular arc hole portions 208A and 208B at the enlarged hole portion 208C side can be set larger than outer diameter of the boss portion 155D of the pinion gear 155.

The semicircular arc hole portion 208A and the semicircular arc hole portion 208B are smoothly connected in such a manner that portions, whereat ends of the two semicircular arc hole portions depart from each other by distance corresponding to distance between the center axis 212 and the center axis 213, are connected with straight lines in a meaning of tangential line. Thereby, the boss portion 155D can move smoothly in the semicircular arc hole portion 208A and the semicircular arc hole portion 208B while being pressed against the inner peripheral portion of the inner shaft receiving hole 208.

Further, rims of the semicircular arc hole portion 208A and the enlarged hole portion 208C and those of the semicircular arc hole portion 208B and the enlarged hole portion 208C are respectively connected with arc as small as possible (arc of 1.2 mm radius, for instance) so as to make the rims edgy. Thereby; peripheral directional length with respect to inner peripheral portions of the semicircular arc hole portions 208A, 208B can be made as long as possible.

As illustrated in FIG. 22 through FIG. 24, at the back plate portion 157B side half part of the outer shaft receiving hole 209, an enlarged hole portion 209C is formed so as to have a substantially semicircular arc shape and inner diameter roughly the same as outer diameter of the support portion 155B of the pinion gear 155. Further, regarding the outer shaft receiving hole 209, at a side opposite to the enlarged hole portion 209C, a semicircular arc hole portion 209A is formed so as to extend from piston moving directional side end (side of arrow 211 in FIG. 22) of the enlarged hole portion 209C. The semicircular arc hole portion 209A is a substantially semicircular arc shape slightly larger than a quarter-circular arc.

The semicircular arc hole portion 209A has inner diameter roughly the same as outer diameter of the support portion 155B of the pinion gear 155. The semicircular arc hole portion 209A has configuration such that the center axis 212 of the inner periphery is positioned on the rotation axis of the take-up drum unit 6 when the pretensioner unit 202 is attached to the side wall portion 203 of the housing 11. Accordingly, the semicircular arc hole portion 209A of the outer shaft receiving hole 209 and the semicircular arc hole portion 208A of the inner shaft receiving hole 208 are positioned so as to be in co-axial with the center axis 212.

At the webbing-pull-out directional side (side of arrow 206 in FIG. 22) of the outer shaft receiving hole 209 opposite to the enlarged hole portion 209C, a semicircular arc hole portion 209B is formed so as to be connected with a webbing-pull-out directional side end of the enlarged hole portion 209C and a webbing-pull-out directional side end of the semicircular arc hole portion 209A. The semicircular arc hole portion 209B is a substantially semicircular arc shape slightly larger than a quarter-circular arc.

The semicircular arc hole portion 209B has inner diameter roughly the same as outer diameter of the support portion 155B of the pinion gear 155. The semicircular arc hole portion 209B has configuration such that a center axis 213 of the inner periphery is apart from the center axis 212 of the semicircular arc hole portion 209A in the webbing-pull-out direction by distance L1 (distance L1 is approximately 0.5 mm, for instance). Accordingly, the semicircular arc hole portion 209B of the outer shaft receiving hole 209 and the semicircular arc hole portion 208B of the inner shaft receiving hole 208 are positioned so as to be in co-axial with the center axis 213. Further, end-to-end distance between the semicircular arc hole portions 209A and 209B at the enlarged hole portion 209C side can be set larger than outer diameter of the support portion 155B of the pinion gear 155.

The semicircular arc hole portion 209A and the semicircular arc hole portion 209B are smoothly connected in such a manner that portions, whereat ends of the two semicircular arc hole portions depart from each other by distance corresponding to distance between the center axis 212 and the center axis 213, are connected with straight lines in a meaning of tangential line. Thereby, the support portion 155B can move smoothly in the semicircular arc hole portion 209A and the semicircular arc hole portion 209B while being pressed against the inner peripheral portion of the outer shaft receiving hole 209.

Further, rims of the semicircular arc hole portion 209A and the enlarged hole portion 209C and those of the semicircular arc hole portion 209B and the enlarged hole portion 209C are respectively connected with arc as small as possible (arc of 1.2 mm radius, for instance) so as to make the rims edgy. Thereby, peripheral directional length with respect to inner peripheral portions of the semicircular arc hole portions 209A, 2089 can be made as long as possible.

Regarding attachment of the pinion gear 155 to the holding plate 205, as shown in FIG. 25 through FIG. 27, the pinion gear teeth 155A and the flange portion 163 are inserted in the enlarged hole portion 208C of the inner shaft receiving hole 208 formed in the base plate portion 157A of the holding plate 205. After that, the support portion 155B is inserted in the enlarged hole portion 209C of the outer shaft receiving hole 209 formed in the cover plate portion 157C.

After that, the outer peripheral surface of the support portion 155B of the pinion gear 155 is made to abut on the semicircular arc hole portion 209A of the outer shaft receiving hole 209 while the semicircular arc hole portion 208A of the inner shaft receiving hole 208 is inserted between the flange portions 163 and 164 of the pinion gear 155 so as to abut on the outer peripheral surface of the boss portion 155D. Thereby, the pinion gear 155 is rotatably placed between the base plate portion 157A and the cover plate portion 157C of the holding plate 157 in a state of being set at position which prevents the pinion gear 155 from moving in rotation axis direction.

The boss portion 155D projecting from the inner shaft receiving hole 208 is press-fitted in the engaging hole 171 of the pawl base 166 holding the pawl guide 168 therebetween. Thereby, the pawl base 166 is attached in a relatively non-rotatable manner with reference to the pinion gear 155. Further, the positioning projections 172 of the pawl guide 168 are respectively inserted in positioning holes 173 formed at the peripheral portion of the inner shaft receiving hole 208 in the base plate portion 157A. In a waiting state, the pawl guide 168 is fixed to the base plate 157A in a non-rotatable manner.

Subsequently, the cylindrical shaped shaft receiving portion 169B arranged upright on the center part of the bearing 169 is press-fitted in the cylindrical shaped boss portion 155D for attachment of the bearing 169 thereto in a state that each of the clutch pawls 167 is supported in an accommodated position. Further, the long piston positioning pin 175, which is substantially L-shaped in cross section and arranged upright on the base plate portion 157A side of the pawl guide 168, is inserted in the enlarged hole portion 208C of the inner shaft receiving hole 208 and is made to abut on an upper end surface of the piston 153 presenting within the opening portion 159 of the piston guiding cylindrical portion 152A, i.e., the end portion to which the piston 153 moves.

Accordingly, when the pawl guide 168 is fixed to the base plate portion 157A in a non-rotatable manner, rotation axis of the pinion gear 155 coincides with that of the take-up drum unit 6. At the same time, the outer peripheral surface of the support portion 155B of the pinion gear 155 is made to abut on the semicircular arc hole portion 209A of the outer shaft receiving hole 209 in the cover plate portion 157C and the outer peripheral surface of the boss portion 155D is made to abut on the semicircular arc hole portion 208A of the inner shaft receiving hole 208 in the base plate portion 157A so as to rotatably support the pinion gear 155. Further, a part of the pinion gear teeth 155A is arranged so as to present in the opening portion 159 of the piston guiding cylindrical portion 152A.

Next, there will be discussed on the operation of the pinion gear 155 when the pretensioner unit 202 configured as in the above is activated to take up the webbing 3 by referring to FIG. 22 through FIG. 27.

As illustrated in FIG. 22 through FIG. 27, when the gas generating member 151 of the pretensioner unit 202 is activated at vehicle collision or the like, the piston 153 breaks the piston positioning pin 175 and moves toward the tip portion of the piston guiding cylindrical portion 152A (direction of arrow 211) due to the pressure of the generated gas, and rotates the pinion gear 155 having the pinion gear teeth 155A in an engaging state with the rack 153A (rotates in the counterclockwise direction in FIG. 25).

When the pinion gear teeth 155A get engaged with the rack 153A, the pinion gear 155 is pressed diagonally downward (direction of arrow 215 tilting diagonally downward by approximately 20 degrees with reference to moving direction of the piston 153) so as to slightly depart from the piston guiding cylindrical portion 152A of the pipe cylinder 152 with reference to the moving direction of the piston 153 (direction of arrow 211).

Therefore, as shown in FIG. 25 through FIG. 27, the support portion 155B and the boss portion 155D of the pinion gear 155 are also pressed diagonally downward (direction of arrow 215 tilting diagonally downward by approximately 20 degrees with reference to moving direction of the piston 153) so as to slightly depart from the piston guiding cylindrical portion 152A of the pipe cylinder 152.

Therefore, the pinion gear 155 smoothly rotates while outer peripheral surface of the support portion 155B and that of the boss portion 155D are respectively pressed by the semicircular arc hole portion 209A of the outer shaft receiving hole 209 in the cover plate portion 157C and the semicircular arc hole portion 208A of the inner shaft receiving hole 208 in the base plate portion 157A. Further, since center axis 212 for the semicircular arc hole portion 209A of the outer shaft receiving hole 209 and for the semicircular arc hole portion 208A of the inner shaft receiving hole 208 is positioned on the rotation axis of the take-up drum unit 6, the pinion gear 155 is rotatably supported in co-axial with the rotation axis of the take-up drum unit 6.

Further, the pinion gear 155 is rotated and driven while the semicircular arc hole portion 208A of the inner shaft receiving hole 208 in the base plate portion 157A inserted between the flange portions 163 and 164 is made to abut on the outer peripheral surface of the boss portion 155D. Thereby, the pinion gear 155 is rotated and driven by the piston 153 in co-axial with the rotation axis of the take-up drum unit 6 while movement in rotation axis direction is restricted by the flange portions 163 and 164.

Next, there will be discussed on operation of the pinion gear 155 when the webbing 3 is pulled out after activation of the pretensioner unit 202 at the time of vehicle collision or the like, referring to FIG. 22 through FIG. 24 and FIG. 28 through FIG. 30.

At vehicle collision or the like, if the webbing 3 is pulled out successively after the activation of the pretensioner unit 202, engagement of the pawl 23 and the latchet gear portion 35A stops the latchet gear 35 of the take-up drum unit 6 from rotating in the webbing-pull-out direction.

Further, as shown in FIG. 22 through FIG. 24 and FIG. 28 through FIG. 30, when the webbing 3 is pulled out (direction of arrow 206 in FIG. 21 and FIG. 28) successively after the activation of the pretensioner unit 7 at the vehicle collision, etc., and the take-up drum 65 is rotated in the webbing pull-out direction, the pinion gear 155 is pressed in upward direction (direction of arrow 216 in FIG. 22 through FIG. 24 and FIG. 28 through FIG. 30) in parallel with the webbing pull-out direction, via the bearing 169.

Therefore, the support portion 155B and the boss portion 155D of the pinion gear 155 are pressed in the upward direction (direction of arrow 216), as well. Consequently, the outer peripheral surface of the support portion 155B and that of the boss portion 155D of the pinion gear 155 are respectively pressed by the semicircular arc hole portion 209B of the outer shaft receiving hole 209 in the cover plate portion 157C and the semicircular arc hole portion 208B in the inner shaft receiving hole 208 in the base plate portion 157A.

Further, in a case where the take-up drum 65 rotates in the webbing-pull-out direction accompanying torsional deformation at the shaft portion 66C of the torsion bar 66 due to rotation torque acting on the take-up drum 65 in the webbing-pull-out direction, the respective clutch pawls 167 of the clutch mechanism 156 firmly get engaged with the internal gear 69 accompanying deformation. Therefore, when the take-up drum 65 rotates in the webbing-pull-out direction, the pinion gear 155 is also rotated in the webbing-pull-out direction (counterclockwise direction in FIG. 29) via the clutch mechanism 156.

Further, as shown in FIG. 28 through FIG. 30, since the pinion gear 155 is pressed in the upward direction (direction of arrow 216), the pinion gear 155 is smoothly rotated in a state that the outer peripheral surface of the support portion 155B and that of the boss portion 155D are respectively being pressed by the semicircular arc hole portion 209B of the outer shaft receiving hole 209 in the cover plate portion 157C and the semicircular arc hole portion 208B of the inner shaft receiving hole 208 of the base plate portion 157A. Further, since the distance L1, which is distance between the rotation axis of the take-up drum unit 6 and the center axis 213 common to the semicircular arc hole portion 209B of the outer shaft receiving hole 209 and the semicircular arc hole portion 208B of the inner shaft receiving hole 208, is short (distance L1 is approximately 0.5 mm, for instance), the pinion gear 155 is rotatably supported in almost co-axially with the rotation axis of the take-up drum unit 6.

Further, as shown in FIG. 29 and FIG. 30, the pinion gear 155 is rotated and driven while the semicircular arc hole portion 208B of the inner shaft receiving hole 208 in the base plate portion 157A inserted between the flange portions 163 and 164 is made to abut on the outer peripheral surface of the boss portion 155D. Thereby, the pinion gear 155 is rotated and driven via the clutch mechanism 156 in almost co-axial with the rotation axis of the take-up drum unit 6 while movement of the pinion gear 155 in rotation axis direction thereof is restricted by the flange portions 163 and 164.

As described in the above, the seatbelt retractor 201 directed to the second embodiment, the boss portion 155D projecting from the inner shaft receiving hole 208 of the pinion gear 155 is press-fitted in the engaging hole 171 of the pawl base 166 in a state of being held by the pawl guide 168 and the clutch pawls 167. At the same time, the positioning projections 172 of the pawl guide 168 are press-fitted in the positioning holes 173 of the base plate portion 157A, whereby the boss portion 155D of the pinion gear 155 is fixed in a state of being restricted positionally with reference to radial direction. Further, the semicircular arc hole portions 208A and 208B of the inner shaft receiving hole 208 are inserted between the flange portions 163 and 164 of the pinion gear 155.

Thereby, the semicircular arc hole portions 208A and 208B of the inner shaft receiving hole 208 inserted between the flange portions 163 and 164 of the pinion gear 155 can serve to avoid dislocation of the pinion gear 155 in the rotation axis direction thereof by adopting the simple configuration.

Further, radial directional movement of the pinion gear 155 is restricted by the boss portion 155D projecting from the inner shaft receiving hole 208 via the pawl base 166 and the pawl guide 168 of the clutch mechanism 156 while position of the pinion gear 155 is restricted so as to be in co-axial with the take-up drum 65. Thereby, by adopting the simple structure, the pinion gear 155 can be arranged to be co-axial with the take-up drum 65 without dislocation of the pinion gear 155 in radially outward direction and the number of mechanical parts can be reduced.

Further, when the pretensioner unit 202 is activated and the pinion gear 155 is subsequently rotated and driven by movement of the piston 153, the support portion 155B can be made to abut on the semicircular arc hole portion 209A of the outer shaft receiving hole 209 and the boss portion 155D can be made to abut on the inner peripheral surface on the semicircular arc hole portion 208A of the inner shaft receiving hole 208 reliably, whereby the pinion gear 155 can be rotated smoothly in co-axial with the rotation axis of the take-up drum 65.

Further, even if the webbing 3 is pulled out after activation of the pretensioner unit 202, the support portion 155B can be made to abut on the semicircular arc hole portion 209B of the outer shaft receiving hole 209, the semicircular arc hole portion 209B being formed so as to extend in the webbing-pull-out direction from the semicircular arc hole portion 209A, and the boss portion 155D can be made to abut on the inner peripheral surface of the semicircular arc hole portion 208B of the inner shaft receiving hole 208 reliably, the semicircular arc hole portion 208B being formed so as to extend in the webbing-pull-out direction from the semicircular arc hole portion 208A. Thereby, the pinion gear 155 can be rotated smoothly in almost co-axial with the rotation axis of the take-up drum 65.

Further, since distance between the flange portions 163 and 164 of the pinion gear 155 with reference to the rotation axis direction is roughly the same as plate thickness of the base plate portion 157A in which the inner shaft receiving hole 208 is formed, dislocation of the pinion gear 155 with reference to the rotation axis direction and slip of the pinion gear 155 can be avoided reliably. Further, since the flange portions 163 and 164 of the pinion gear 155 are integrally molded by forging or the like, this configuration means no necessity in preparing the flange portions 163 and 164 as separate parts, and the reduction in the number of mechanical parts and hours for assemblage can be realized Further, since each of the flange portions 163 and 164 of the pinion gear 155 is formed in a flange-like shape, low-profile design for each of the flange portions 163 and 164 can be realized easily and axis directional dimension of the pinion gear 155 can be reduced. Thereby, comprehensive configuration of the pinion gear 155 can be simplified. Further, since the inner shaft receiving hole 208 is made up of the semicircular arc hole portion 208A, the semicircular arc hole portion 208B formed so as to extend from the semicircular arc hole portion 208A and the enlarged hole portion 208C formed so as to extend toward the back plate portion 157B, the shape of the inner shaft receiving hole 208 can be simplified and the area for the enlarged hole portion 208C of the inner shaft receiving hole 208 can be enlarged.

Further, the pinion gear 155 is settled down as follows. Firstly, the pinion gear teeth 155A and the flange portion 163 are inserted in the enlarged hole portion 208C of the inner shaft receiving hole 208, the support portion 155B is subsequently inserted in the enlarged hole portion 209C of the outer shaft receiving hole 209 in the cover plate portion 157C. After that, the semicircular arc hole portion 208A of the inner shaft receiving hole 208 is inserted between the flange portions 163 and 164 so that the support portion 155B is made to abut on the semicircular arc hole portion 209A of the outer shaft receiving hole 209 and the boss portion 155D is made to abut on the semicircular arc hole portion 208A of the inner shaft receiving hole 208.

After that, in this state, the boss portion 155D projecting from the inner shaft receiving hole 208 is press-fitted into the engaging hole 171 of the pawl base 166 so that the pinion gear 155 is rotatably arranged in the holding plate 205 through the clutch mechanism 156. Thereby, a worker can easily attach the pinion gear 155 to the holding plate 205 and operation efficiency can be improved.

Further, load on the pinion gear 155 with reference to the axis direction thereof and load on the pinion gear 155 with reference to the radial direction thereof can be received with the semicircular arc hole portions 208A and 208B of the inner shaft receiving hole 208 and the semicircular arc hole portions 209A and 209B of the outer shaft receiving hole 209. Thereby, low-profile and weight saving design can be realized for holding plate 205. Father, since the flange portion 163 of the pinion gear 155 is formed at the take-up drum 65 side end portion of the pinion gear teeth 155A in a flange-like shape, dislocation of the pinion gear teeth 155A in axis direction with reference to the rack 153A when engaging with the rack 153A of the piston 153 can be avoided by adopting the simple configuration and mechanical strength of the pinion gear teeth 155A can be secured easily.

Further, when the clutch mechanism 156 and the pinion gear 155 are fixedly attached to the base plate portion 157A, the long piston positioning pin 175, which is substantially L-shaped in cross section and arranged upright on the base plate portion 157A side of the pawl guide 168, is inserted in the enlarged hole portion 208C of the inner shaft receiving 208 and made to abut on an upper end surface of the piston 153, i.e., the end portion to which the piston 153 moves.

Thereby, when the pretensioner unit 7 is in a resting state, the above configuration can reliably avoid the piston 153 housed in the pipe cylinder 152 from moving with reference to longitudinal direction of the pipe cylinder 152 and avoid the rack 153A of the piston 153 from abutting on the pinion gear teeth 155A of the pinion gear 155. Further, in a case where the piston 153 is pressed and driven by pressure of gas in response to activation of the pretensioner unit 7, the piston positioning pin 175 is broken by the piston 153. Thereby, the pinion gear 155 can be rotated and driven efficiently via the piston 153.

The present invention is not limited to the above-described first and second embodiments, but various improvements and alternations can be made thereto without departing from the spirit of the present invention.

Other Embodiment 1

(A) For instance, when the pinion gear 155 is fixedly attached to the holding plate 157 via the clutch mechanism 156 with respect to the seatbelt retractor 1 directed to the first embodiment, there may be formed two narrow clearances (for instance, each narrow clearance may be approximately 0.1 mm); one of which may be formed between the outer peripheral surface of the support portion 155B of the pinion gear 155 and the inner peripheral surface of the semicircular arc hole portion 162A of the outer shaft receiving hole 162 and other one of which may be formed between the outer peripheral surface of the boss portion 155D and the inner peripheral surface of the semicircular arc hole portion 165A of the inner shaft receiving hole 165. Thereby, even when the pinion gear 155 slips, the narrow clearances can avoid the support portion 155B and the boss portion 155D of the pinion gear 155 from abutting on the inner peripheral surface of the semicircular arc hole portion 162A and that of the semicircular arc hole portion 162, respectively, and avoid occurrence of abnormal noise.

Other Embodiment 2

(B) For instance, when the pinion gear 155 is fixedly attached to the holding plate 205 via the clutch mechanism 156 with respect to the seatbelt retractor 201 directed to the second embodiment, there may be formed two narrow clearances (for instance, each narrow clearance may be approximately 0.1 mm); one of which may be formed between the outer peripheral surface of the support portion 155B of the pinion gear 155 and the inner peripheral surface of the semicircular arc hole portion 209A of the outer shaft receiving hole 209 and other one of which may be formed between the outer peripheral surface of the boss portion 155D and the inner peripheral surface of the semicircular arc hole portion 208A of the inner shaft receiving hole 208. Thereby, even when the pinion gear 155 slips, the narrow clearances can avoid the support portion 155B and the boss portion 155D of the pinion gear 155 from abutting on the inner peripheral surface of the semicircular arc hole portion 209A and that of the semicircular arc hole portion 208A, respectively, and avoid occurrence of abnormal noise.

Other Embodiment 3

(C) For instance, regarding the seatbelt retractor 1 directed to the first embodiment, the holding plate 157 may be comprised of the base plate portion 157A only and the back plate portion 157B and the cover plate 157C may be prepared separately so that the back plate portion 157E and the cover plate 157 constitute a cover member. The pipe cylinder 152 and the base block 158 may be fixed onto the outside, in a direction of the rotational axis of the take-up drum unit 6, of the base plate portion 157A and the cover member may be fixedly attached to the side wall portion 13 of the housing 11 at outside thereof by the screws 15 and the stopper pin 16 so as to cover the pipe cylinder 152 and the base block 158.

In that case, the pinion gear 155 may be attached to the inner shaft receiving hole 165 in such a manner that the flange portion 164 and the pinion gear teeth 155A of the pinion gear 155 are inserted in the enlarged hole portion 165B of the inner shaft receiving hole 165 from the outside, in a direction of the rotational axis, of the base plate portion 157A with the semicircular arc hole portion 165A of the inner shaft receiving hole 165 being inserted between the flange portions 163 and 164.

Thereby, the outer shaft receiving hole 162 can be formed in a substantially circular shape having inner diameter roughly the same as outer diameter of the support portion 155B of the pinion gear 155 and the thus configured outer shaft receiving hole 162 can easily restrict radial directional movement of the pinion gear 155 and bring the Other Embodiment 3 the working effect of the seatbelt retractor 1 directed to the first embodiment.

Other Embodiment 4

(D) For instance, the seatbelt retractor 1 directed to the first embodiment may employ the pinion gear 155 which does not have the support portion 155B and the cover plate portion 157C which does not have the outer shaft receiving hole 162 so that the cover plate portion 157C does not serve to press the pinion gear 155 with reference to the rotation axis direction. In that case, by adopting simple structure such as the semicircular arc hole portion 165A of the inner shaft receiving hole 165 in the base plate portion 157A in a state of being inserted between the flange portions 163 and 164 of the pinion gear 155, dislocation of the pinion gear 155 in the rotation axis direction can be avoided. Concurrently, by adopting simple configuration such as the semicircular arc hole portion 165A, the pinion gear 155 can be supported in a rotatable manner.

Other Embodiment 5

(E) For instance, regarding the seatbelt retractor 201 directed to the second embodiment, the holding plate 205 may be comprised of the base plate portion 157A only and the back plate portion 157B and the cover plate 157C may be prepared separately so that the back plate portion 157B and the cover plate 157 constitute a cover member. The pipe cylinder 152 and the base block 158 may be fixed onto the outside, in a direction of the rotational axis of the take-up drum unit 6, of the base plate portion 157A and the cover member may be fixedly attached to the side wall portion 203 of the housing 11 at outside thereof by the screws 15 and the stopper pin 16 so as to cover the pipe cylinder 152 and the base block 158.

In that case, the pinion gear 155 may be attached to the inner shaft receiving hole 208 in such a manner that the flange portion 164 and the pinion gear teeth 155A of the pinion gear 155 are inserted in the enlarged hole portion 208B of the inner shaft receiving hole 208 from the outside, in a direction of the rotational axis, of the base plate portion 157A with the semicircular arc hole portion 208A of the inner shaft receiving hole 165 being inserted between the flange portions 163 and 164.

Thereby, by connecting the back plate portion side end edge portions semicircular arc hole portion 209A and those of the semicircular arc hole portion 209B together, the outer shaft receiving hole 209 can be formed in a substantially circular shape having inner diameter roughly the same as outer diameter of the support portion 155B of the pinion gear 155 and the thus configured outer shaft receiving hole 162 can easily restrict radial directional movement of the pinion gear 155 and bring the Other Embodiment 5 the working effect of the seatbelt retractor 201 directed to the second embodiment.

Other Embodiment 6

(F) For instance, regarding the seatbelt retractor 201 directed to the second embodiment may employ the pinion gear 155 which does not have the support portion 155B and the cover plate portion 157C which does not have the outer shaft receiving hole 209 so that the cover plate portion 157C does not serve to press the pinion gear 155 with reference to the rotation axis direction. In that case, by adopting simple structure such as the semicircular arc hole portion 208A of the inner shaft receiving hole 208 in the base plate portion 157A in a state of being inserted between the flange portions 163 and 164 of the pinion gear, dislocation of the pinion gear 155 in the rotation axis direction can be avoided. Concurrently, by adopting simple configuration such as the semicircular arc hole portions 208A and 208BA, the pinion gear 155 can be supported in a rotatable manner.

Other Embodiment 7

(G) For instance, regarding the seatbelt retractor 1 directed to the first embodiment and the seatbelt retractor 201 directed to the second embodiment, the pinion gear 155 may include the flange portion 163 but not the flange portion 164. Thus, when the pinion gear 155 of the seatbelt retractor 1 is positionally restricted so as to be co-axial with the take-up drum 65 via the clutch mechanism 156, at least a part of the flange portion 163 faces an edge portion of the semicircular arc hole portion 165A of the inner shaft receiving hole 165 at the side of the outer shaft receiving hole 162 with reference to the rotation axis direction. Accordingly, such mechanical positioning can serve to avoid the pinion gear 155 from dislocation toward the take-up drum 65 with reference to the rotation axis direction thereof by adopting the simple configuration.

Further, regarding the seatbelt retractor 201, when the pinion gear 155 of the seatbelt retractor 201 is positionally restricted so as to be co-axial with the take-up drum 65 via the clutch mechanism 156, at least a part of the flange portion 163 faces edge portions of the semicircular arc hole portions 208A and 208B of the inner shaft receiving hole 208 at the side of the outer shaft receiving hole 209 with reference to the rotation axis direction. Accordingly, such mechanical positioning can serve to avoid the pinion gear 155 from dislocation toward the take-up drum 65 with reference to the rotation axis direction thereof by adopting the simple configuration.

Further, regarding the pinion gear 155 of each of the seatbelt retractors 1 and 201, radial direction movement of the boss portion 155D projecting from the inner shaft receiving hole 165 is restricted and position thereof is restricted so as to be in co-axial with the take-up drum 65 by the clutch mechanism 156. Thereby, such mechanical positioning can serve to avoid the pinion gear 155 from dislocation radially outward and set the pinion gear 155 in co-axial with the take-up drum 65.

The invention claimed is:

1. A seatbelt retractor comprising:
    a housing;
    a take-up drum rotatably housed in the housing and configured to take-up and store a webbing; and
    a pretensioner mechanism configured to rotate the take-up drum in a webbing-take-up direction for taking up the webbing when vehicle collision occurs,
    wherein the pretensioner mechanism includes:
        a driven body configured to rotate co-axially with a rotation axis of the take-up drum when vehicle collision occurs;
        a driving device configured to rotate the driven body in the webbing-take-up direction;
        a holding plate arranged at an outer side of the housing and perpendicular to the rotation axis of the take-up drum, the holding plate including a shaft receiving hole which rotatably supports a boss portion of the driven body shaped in a cylindrical shape and formed at a take-up drum side; and
        a restricting member arranged at a take-up drum side surface of the holding plate and configured to restrict movement of the boss portion in a radial direction so that the boss portion projecting from the shaft receiving hole is positioned co-axial with the take-up drum,
    wherein the boss portion which faces an inner peripheral surface of the shaft receiving hole includes a pair of radially projecting portions provided on its both sides with reference to a rotation axis direction of the take-up drum and configured to project radially outward at full periphery of the boss portion, and
    wherein, position of the boss portion is restricted so as to be co-axial with the take-up drum by the restricting member, the pair of radially projecting portions of the boss portion project radially outward over the shaft receiving hole so that at least a peripheral edge portion of the shaft receiving hole is inserted in a clearance defined by the pair of radially projecting portions projecting radially outward over the shaft receiving hole to avoid movement of the driven body in the rotation axis direction.

2. The seatbelt retractor according to claim 1, wherein the pair of radially projecting portions are formed such that distance between the pair of radially projecting portions with reference to the rotation axis direction is approximate to thickness of the peripheral edge portion of the shaft receiving hole.

3. The seatbelt retractor according to claim 1, wherein the pair of radially projecting portions are formed by integral molding.

4. The seatbelt retractor according to claim 1, wherein the pair of radially projecting portions are formed in a flange-like shape so as to project radially outward from the outer peripheral surface of the boss portion.

5. The seatbelt retractor according to claim 1, wherein the shaft receiving hole includes:
   a first semicircular arc hole portion formed in a substantially semicircular arc shape at a part of the inner peripheral portion whereat the boss portion is pressed when the driven body is rotated and driven by the driving device; and
   an enlarged hole portion formed so as to extend from the first semicircular arc hole portion and allow insertion of at least one of the pair of radially projecting portions therein, and
wherein the first semicircular arc hole portion is inserted in a clearance between the pair of radially projecting portions when position of the boss portion is restricted so as to be co-axial with the take-up drum by the restricting member.

6. The seatbelt retractor according to claim 5, wherein the shaft receiving hole includes a second semicircular arc hole portion formed in a substantially semicircular arc shape at a part of the inner peripheral portion whereat the boss portion is pressed when the driven body is pressed radially outward via the take-up drum by a load that the webbing is pulled out.

7. The seatbelt retractor according to claim 5, wherein the restricting member includes:
   an engaging hole coupled with the boss portion in a non-rotatable manner by allowing press-fitting of the boss portion therein; and
   a positioning projection arranged so as to project toward the holding plate,
wherein the holding plate includes a positioning hole configured to allow insertion of the positioning projection of the restricting member, and
wherein, when the positioning projection is inserted in the positioning hole from a take-up drum side and the restricting member is positionally set with reference to the holding plate and fixed to the holding plate, the boss portion press-fitted and coupled with the engaging hole is positionally restricted in a state of securing a clearance with respect to the inner peripheral portion of the first semicircular arc hole portion and movement of the boss portion toward the enlarged hole portion is restricted.

8. The seatbelt retractor according to claim 1, wherein the pretensioner mechanism includes a coupling mechanism arranged at a take-up drum side of the holding plate and configured to couple the driven body and the take-up drum together when the driven body is rotated and driven by the driving device, and wherein the coupling mechanism includes the restricting member.

9. The seatbelt retractor according to claim 1, wherein the pretensioner mechanism includes a cover member arranged at an opposite side of the holding plate with reference to the take-up drum in the rotation axis direction so as to hold the driven body between the holding plate and the cover member,
wherein the driven body includes a shaft portion arranged on an opposite side thereof with reference to the boss portion, and
wherein the cover member includes a cover side shaft receiving hole configured to rotatably support the shaft portion.

10. The seatbelt retractor according to claim 1, wherein the driving device includes:
   a gas generating member configured to generate gas;
   a cylinder formed in a long cylindrical shape and mounted on the holding plate with the gas generating member being attached to one end portion thereof; and
   a piston accommodated in the cylinder in a movable manner, pressed and driven by pressure of the gas and equipped with a rack at side surface portion thereof facing the driven body along a longitudinal direction,
wherein the driven body includes pinion gear teeth formed on an entire circumference of the outer peripheral surface thereof, configured to face the piston which moves when pushed and driven by pressure of the gas and to get engaged with the rack, and
wherein, one of the pair of radially projecting portions, which faces an opposite side surface of the holding plate with reference to the take-up drum, is formed in a flange-like shape at a take-up drum side of the pinion gear teeth.

11. A seatbelt retractor comprising:
a housing;
a take-up drum rotatably housed in the housing and configured to take-up and store a webbing; and
a pretensioner mechanism configured to rotate the take-up drum in a webbing-take-up direction for taking up the webbing when vehicle collision occurs,
wherein the pretensioner mechanism includes:
   a driven body configured to rotate co-axially with a rotation axis of the take-up drum when vehicle collision occurs;
   a driving device configured to rotate the driven body in the webbing-take-up direction;
   a holding plate formed into a substantially U-shape in cross section and having two opposite wall portions which are arranged perpendicular to the rotation axis of the take-up drum and arranged at an outer side of the housing,
   the holding plate including a first shaft receiving hole which rotatably supports a boss portion of the driven body shaped in a cylindrical shape and formed at a take-up drum side and a second shaft receiving hole which rotatably supports a shaft portion of the driven body formed at an opposite side of the driven body with reference to the boss portion, the first shaft receiving hole and the second shaft receiving hole being formed at each wall portion of the holding plate; and
   a restricting member arranged at a take-up drum side surface of the wall portion of the holding plate in which the first shaft receiving hole is formed and configured to restrict movement of the boss portion in a radial direction so that the boss portion projecting from the first shaft receiving hole is positioned co-axial with the take-up drum, wherein the boss portion faces an inner peripheral surface of the first shaft receiving hole and includes a first projecting portion projecting radially outward along an entire periphery at one edge thereof opposing the second shaft receiving hole, wherein the first shaft receiving hole includes:
- a first semicircular arc hole portion formed in a substantially semicircular arc shape at a part of the inner peripheral portion whereat the boss portion is pressed when the driven body is rotated and driven by the driving device; and
- a first enlarged hole portion formed so as to extend from the first semicircular arc hole portion and allow insertion of the first projecting portion therein, and wherein, position of the boss portion is restricted so as to be co-axial with the take-up drum by the restricting member, the first projecting portion projects radially outward over the first semicircular arc hole portion of the first shaft receiving hole so that the first projecting portion at least faces a peripheral edge portion of the first semicircular arc hole portion at a side opposing the second shaft receiving hole to avoid movement of a driven body in the rotation axis direction of the take-up drum.

12. The seatbelt retractor according to claim 11,
wherein the first shaft receiving hole includes a second semicircular arc hole portion formed in a substantially semicircular arc shape at a part of the inner peripheral portion whereat the boss portion is pressed when the driven body is pressed radially outward via the take-up drum by a load that the webbing is pulled out.

13. The seatbelt retractor according to claim 11,
wherein the second shaft receiving hole includes:
- a third semicircular arc hole portion formed in a substantially semicircular arc shape at a part of the inner peripheral portion of the second shaft receiving hole whereat the shaft portion is pressed when the driven body is rotated and driven by the driving device; and
- a second enlarged hole portion formed so as to extend from the third semicircular arc hole portion and allow insertion of the shaft portion therein in a state of securing a clearance between the shaft portion and the third semicircular arc hole portion.

14. The seatbelt retractor according to claim 13,
wherein the second shaft receiving hole includes a fourth semicircular arc hole portion formed in a substantially semicircular arc shape at a part of the inner peripheral portion of the second shaft receiving hole whereat the shaft portion is pressed when the driven body is pressed radially outward via the take-up drum due to a load for pulling out the webbing.

15. The seatbelt retractor according to claim 11,
wherein the restricting member includes:
- an engaging hole coupled with the boss portion in a non-rotatable manner by allowing press-fitting of the boss portion therein; and
- a positioning projection arranged so as to project toward the side wall portion having the first shaft receiving hole of the holding plate, wherein the wall portion having the first shaft receiving hole of the holding plate includes a positioning hole configured to allow insertion of the positioning projection of the restricting member, and wherein, when the positioning projection is inserted in the positioning hole from a take-up drum side and the restricting member is positionally set with reference to the wall portion having the first shaft receiving hole of the holding plate fixed thereto, the boss portion press-fitted and coupled with the engaging hole is positionally restricted in a state of securing a clearance with respect to the inner peripheral portion of the first semicircular arc hole portion and movement of the boss portion toward the first enlarged hole portion is restricted.

16. The seatbelt retractor according to claim 11,
wherein the pretensioner mechanism includes a coupling mechanism arranged at a take-up drum side of the wall portion having the first shaft receiving hole of the holding plate and configured to couple the driven body and the take-up drum together when the driven body is rotated and driven by the driving device, and wherein the coupling mechanism includes the restricting member.

17. The seatbelt retractor according to claim 11,
wherein the boss portion faces the inner peripheral surface of the first shaft receiving hole and includes a second projecting portion projecting radially outward along an entire periphery at one edge thereof opposing the take-up drum, wherein position of the boss portion is restricted to be co-axial with the take-up drum by the restricting member and the first projecting portion and the second projecting portion project radially outward over the first semicircular arc hole portion of the first shaft receiving hole so that at least a peripheral edge portion of the first semicircular arc hole portion is inserted in a clearance defined by the respective projecting portions.

18. The seatbelt retractor according to claim 11,
wherein the driving device includes:
- a gas generating member configured to generate gas;
- a cylinder formed in a long cylindrical shape and mounted inside of the holding plate formed in a substantially U-shape in cross section, with the gas generating member being attached to one end portion of the cylinder; and
- a piston accommodated in the cylinder in a movable manner, pressed and driven by pressure of the gas and configured to rotate the driven body in a webbing-pull-out direction when pressed and driven;

wherein the piston includes a rack at side surface portion thereof facing the driven body along a longitudinal direction, wherein the driven body includes pinion gear teeth formed on an entire circumference of the outer peripheral surface thereof, configured to face the piston which moves when pushed and driven so as to get engaged with the rack, wherein the restricting member includes a piston positioning pin erected toward the second shaft receiving hole with reference to the rotation axis direction of the take-up drum so that the piston positioning pin is inserted in the first enlarged hole portion and gets in contact with a moving directional side end surface portion of the piston when the restricting member is arranged at the take-up drum side surface of the wall portion having the first shaft receiving hole of the holding plate, and wherein the piston positioning pin is broken when the piston is pressed and driven by pressure of the gas.

\* \* \* \* \*